(12) United States Patent
Yoon et al.

(10) Patent No.: US 11,228,653 B2
(45) Date of Patent: Jan. 18, 2022

(54) TERMINAL, CLOUD APPARATUS, DRIVING METHOD OF TERMINAL, METHOD FOR PROCESSING COOPERATIVE DATA, COMPUTER READABLE RECORDING MEDIUM

(71) Applicant: SAMSUNG ELECTRONICS CO., LTD., Suwon-si (KR)

(72) Inventors: Young Yoon, Seoul (KR); Dae-hyun Ban, Seoul (KR); Sung-won Han, Seoul (KR); Hong-uk Woo, Seoul (KR); Eun-ho Heo, Seoul (KR); Sang-ho Shin, Seoul (KR); Jung-kyuen Lee, Seongnam-si (KR); Dong-hyeok An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 616 days.

(21) Appl. No.: 14/917,641

(22) PCT Filed: May 15, 2015

(86) PCT No.: PCT/KR2015/004885
§ 371 (c)(1),
(2) Date: Mar. 9, 2016

(87) PCT Pub. No.: WO2015/174777
PCT Pub. Date: Nov. 19, 2015

(65) Prior Publication Data
US 2016/0226985 A1 Aug. 4, 2016

Related U.S. Application Data

(60) Provisional application No. 61/993,407, filed on May 15, 2014.

(30) Foreign Application Priority Data

Sep. 22, 2014 (KR) .................. 10-2014-0126104
Feb. 13, 2015 (KR) .................. 10-2015-0022418
Apr. 22, 2015 (KR) .................. 10-2015-0056893

(51) Int. Cl.
H04L 29/08 (2006.01)
H04L 12/26 (2006.01)
G06F 21/62 (2013.01)

(52) U.S. Cl.
CPC .......... *H04L 67/22* (2013.01); *G06F 21/6254* (2013.01); *H04L 67/2861* (2013.01); *H04L 67/36* (2013.01)

(58) Field of Classification Search
CPC .............. G06F 21/6254; G06F 16/285; G06F 16/9535; G06F 16/435; G06F 16/337;
(Continued)

(56) References Cited

U.S. PATENT DOCUMENTS 8,560,465 B2 10/2013 Jeong et al.
8,600,981 B1 12/2013 Chau et al.
(Continued)

FOREIGN PATENT DOCUMENTS

CN 102440009 A 5/2012
CN 103177129 A 6/2013
(Continued)

OTHER PUBLICATIONS

Stopczynski, Arkadiusz, et al. "Privacy in sensor-driven human data collection: A guide for practitioners." arXiv preprint arXiv: 1403. 5299 (2014). (Year: 2014).*
(Continued)

*Primary Examiner* — Philip J Chea
*Assistant Examiner* — Ruth Solomon
(74) *Attorney, Agent, or Firm* — Sughrue Mion, PLLC

(57) ABSTRACT

A terminal, a cloud apparatus, a method of analyzing, by a terminal, activities of a user, and a method of analyzing, by a cloud apparatus, activities of a user. The terminal includes a communication interface that communicates with an external apparatus over a network; a controller that obtains data
(Continued)

used to predict activities of a user and anonymize a portion of the obtained data, and transmit the anonymized data and a remaining portion of the data, which is not anonymized, to the external apparatus through the communication interface; and a display that displays notification information related to the activities of the user based on activity prediction data received from the external apparatus, the activity prediction data being generated based on an analysis of the transmitted data.

13 Claims, 52 Drawing Sheets

(58) Field of Classification Search
CPC ............... G06F 21/6227; G06F 21/316; G06F 11/3438; G06F 11/3447; H04L 67/22; H04L 67/02; H04L 67/141; H04L 67/025; H04L 67/34; H04L 67/2861; H04L 67/303; H04L 67/325; H04L 51/046; H04L 47/78; H04L 41/5087; H04L 41/5096; H04L 43/04; H04L 63/102; H04L 63/1425; H04L 67/36; H04L 43/045; G06Q 50/01; G06Q 30/0269; G06Q 30/0255; G06Q 30/0631; G06Q 20/322; G06Q 10/0639
See application file for complete search history.

(56) References Cited

U.S. PATENT DOCUMENTS

| | | | | |
|---|---|---|---|---|
| 8,621,653 | B2* | 12/2013 | Khosravy | G06Q 50/10 726/28 |
| 8,655,307 | B1* | 2/2014 | Walker | H04W 52/0212 455/405 |
| 9,363,238 | B2* | 6/2016 | Turner | G06F 21/6254 |
| 10,123,063 | B1* | 11/2018 | Brown | H04N 21/2408 |
| 2009/0265430 | A1 | 10/2009 | Bechtel et al. | |
| 2010/0262573 | A1* | 10/2010 | Abbott | G06F 1/163 706/47 |
| 2010/0293049 | A1* | 11/2010 | Maher | G06F 17/30699 705/14.46 |
| 2010/0318576 | A1 | 12/2010 | Kim | |
| 2011/0314482 | A1* | 12/2011 | Cupala | G06F 17/30899 719/328 |
| 2012/0117090 | A1 | 5/2012 | Lee et al. | |
| 2012/0117097 | A1 | 5/2012 | Lam et al. | |
| 2012/0215834 | A1* | 8/2012 | Chen | G06F 17/30905 709/203 |
| 2013/0054611 | A1 | 2/2013 | Lee | |
| 2013/0152215 | A1* | 6/2013 | Khosravy | G06Q 50/10 726/28 |
| 2013/0159408 | A1* | 6/2013 | Winn | G06Q 10/10 709/204 |
| 2013/0239220 | A1* | 9/2013 | Gjonej | G06F 21/6245 726/26 |
| 2013/0326007 | A1* | 12/2013 | Turner | G06F 21/6254 709/217 |
| 2013/0332987 | A1* | 12/2013 | Tenneti | G06F 21/10 726/1 |
| 2014/0032468 | A1 | 1/2014 | Anandaraj | |
| 2014/0074763 | A1 | 3/2014 | Jeong et al. | |
| 2014/0287723 | A1* | 9/2014 | LaFever | H04W 12/02 455/411 |
| 2014/0359078 | A1* | 12/2014 | Liu | H04L 65/80 709/219 |
| 2015/0079932 | A1* | 3/2015 | Zelinka | G06F 21/64 455/411 |
| 2015/0128284 | A1* | 5/2015 | LaFever | H04L 67/02 726/26 |
| 2015/0213288 | A1* | 7/2015 | Bilodeau | G06F 21/6245 726/26 |
| 2015/0254462 | A1* | 9/2015 | Takahashi | G06F 21/60 726/26 |
| 2017/0324805 | A1* | 11/2017 | Charaniya | G06F 16/29 |

FOREIGN PATENT DOCUMENTS

| | | |
|---|---|---|
| JP | 201413458 A | 1/2014 |
| KR | 1020100132868 A | 12/2010 |
| KR | 101318985 B1 | 11/2013 |
| WO | 2010/103163 A1 | 9/2010 |

OTHER PUBLICATIONS

Communication (PCT/ISA/220, 210, and 237) dated Aug. 10, 2015, issued by the International Searching Authority in counterpart International Application No. PCT/KR2015/004885.
Communication dated Oct. 26, 2017, issued by the European Patent Office in counterpart European Patent Application No. 15792566.0.
Communication dated Jul. 1, 2019 issued by the State Intellectual Property Office of P.R. China in counterpart Chinese Application No. 201580026559.4.
Communication dated May 8, 2020 issued by the State Intellectual Property Office of P.R. China in English counterpart Chinese Application No. 201580026559.4.
Communication dated Aug. 7, 2020, issued by the Taiwan Patent Office in counterpart Taiwan Application No. 105101939.
Communication dated Sep. 14, 2020, from the State Intellectual Property Office of People's Republic of China in counterpart Application No. 201580026559.4.
Communication dated May 20, 2021 issued by the Korean Intellectual Property Office in counterpart English Korean Application No. 10-2015-0056893.
Communication dated Sep. 13, 2021, issued by the Korean Patent Office in counterpart Korean English Patent Application No. 10-2015-0056893.

* cited by examiner (c)　　　　　　　　(d)

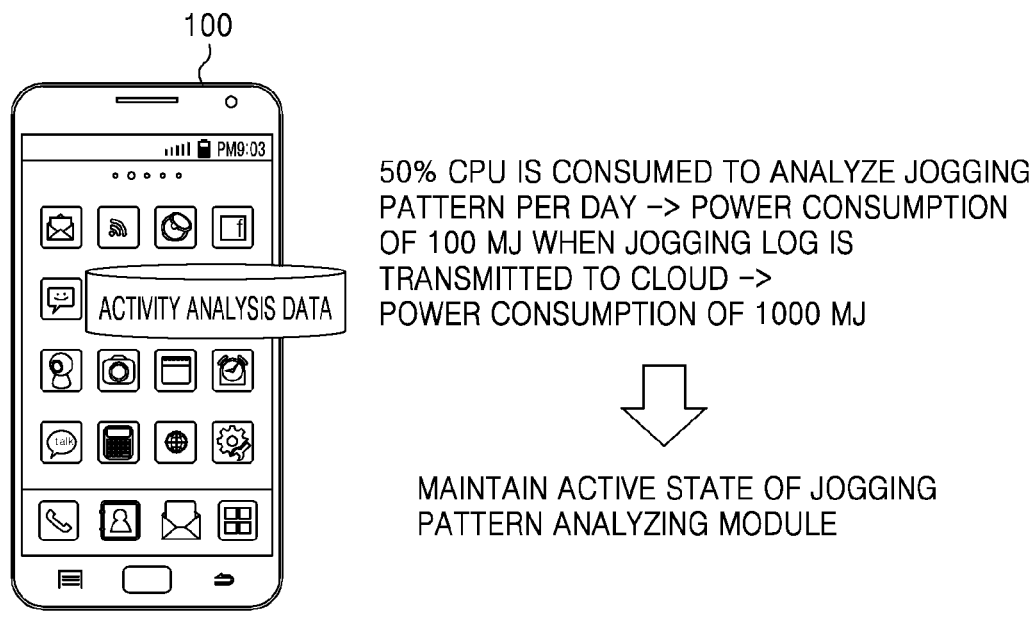

50% CPU IS CONSUMED TO ANALYZE JOGGING PATTERN PER DAY -> POWER CONSUMPTION OF 100 MJ WHEN JOGGING LOG IS TRANSMITTED TO CLOUD -> POWER CONSUMPTION OF 1000 MJ

MAINTAIN ACTIVE STATE OF JOGGING PATTERN ANALYZING MODULE (a)

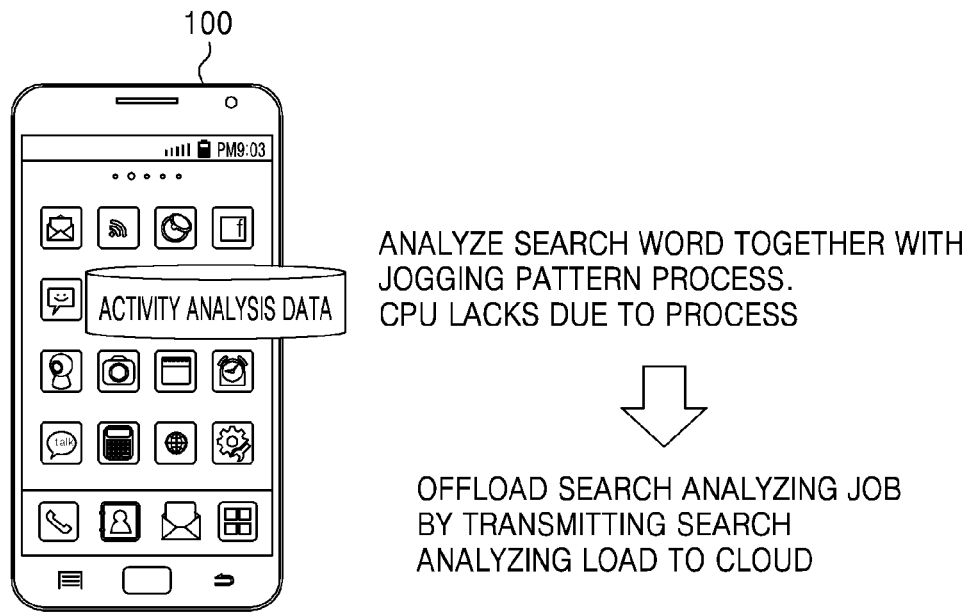

ANALYZE SEARCH WORD TOGETHER WITH JOGGING PATTERN PROCESS. CPU LACKS DUE TO PROCESS

OFFLOAD SEARCH ANALYZING JOB BY TRANSMITTING SEARCH ANALYZING LOAD TO CLOUD (b)

FIG. 25A

| HANBAN YOON GENERAL MANAGER WHO WORKS FOR SAMSUNG ELECTRONICS ··· HE IS 38 YEARS OLD ··· MANY··· | A YOON WHO WORKS FOR A COMPANY··· HE IS IN HIS LATE 30S··· MANY··· |
|---|---|
| (a) | (b) |

FIG. 25B
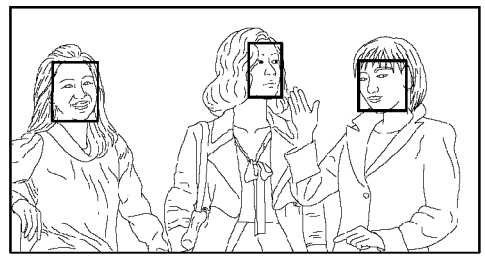
(a)
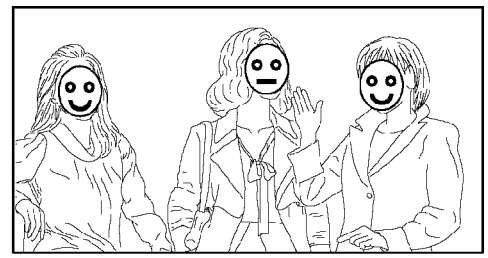
(b)

FIG. 28
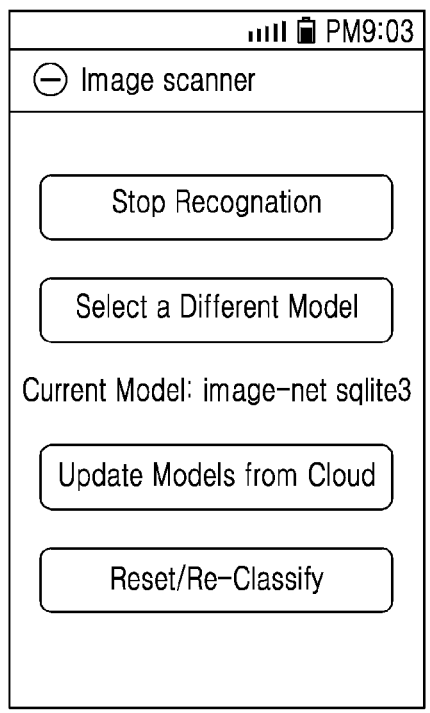
(a)
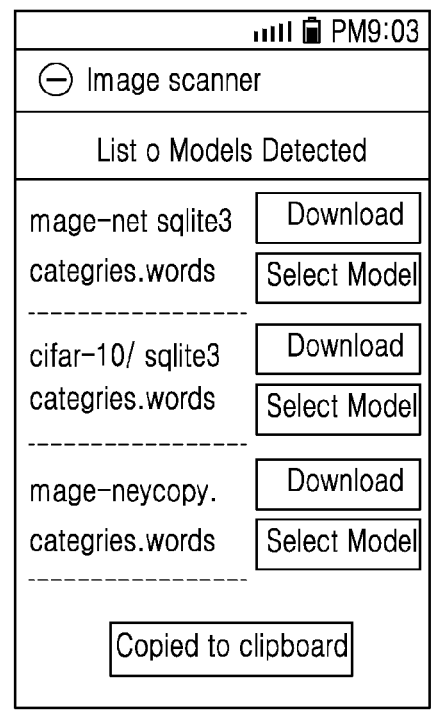
(b)

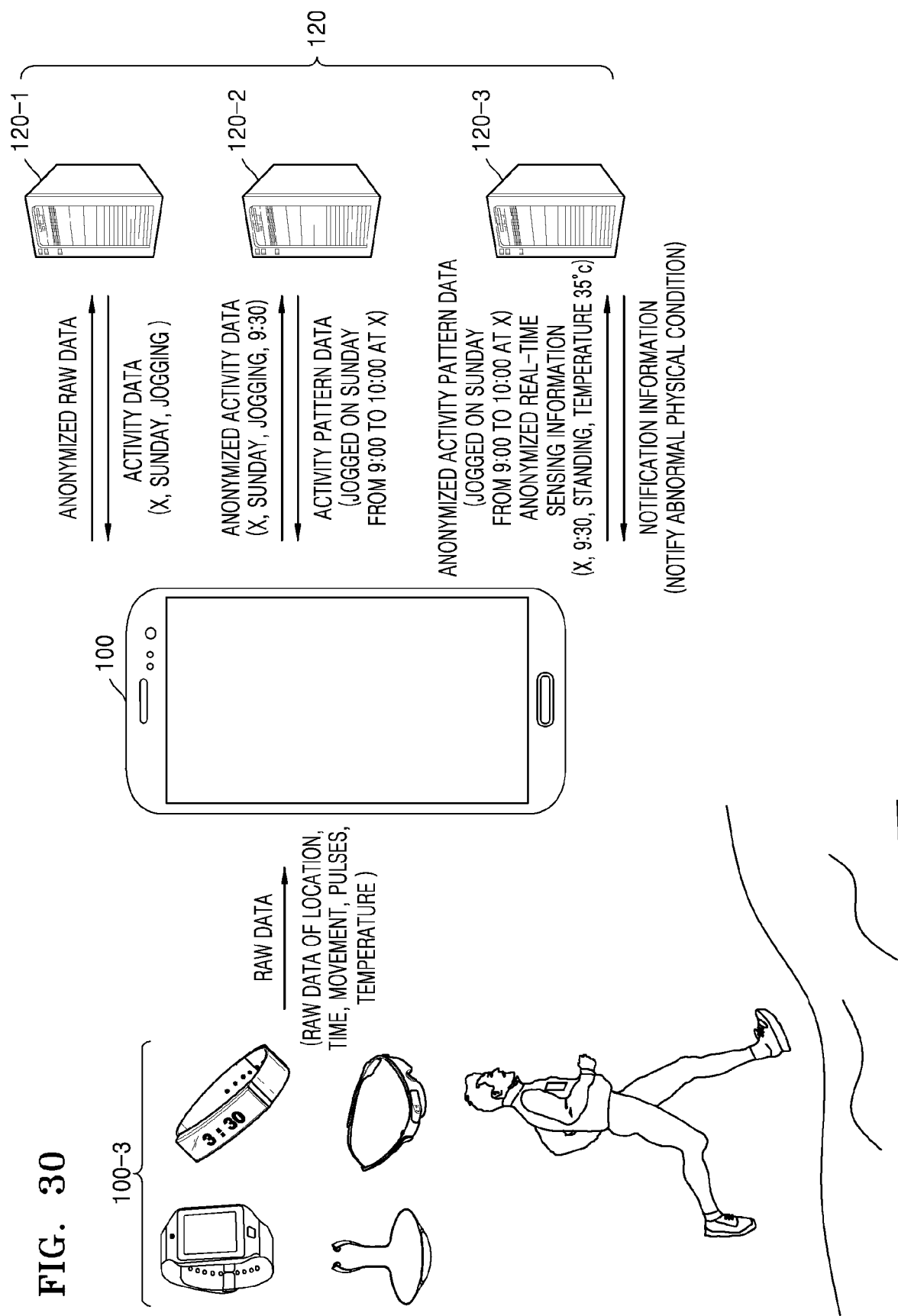

TERMINAL, CLOUD APPARATUS, DRIVING METHOD OF TERMINAL, METHOD FOR PROCESSING COOPERATIVE DATA, COMPUTER READABLE RECORDING MEDIUM

CROSS-REFERENCE TO RELATED APPLICATIONS

This application claims the benefit of priority from U.S. Provisional Patent Application No. 61/993,407 filed on May 15, 2014 in the United States Patent and Trademark Office, and claims priority from International Application No. PCT/KR2015/004885 filed on May 15, 2015, and from Korean Patent Applications No. 10-2014-0126104 filed on Sep. 22, 2014; No. 10-2015-0022418 filed on Feb. 13, 2015; and No. 10-2015-0056893 filed on Apr. 22, 2015, in the Korean Patent Office. The disclosures of each of the Applications are herein incorporated by reference in their entirety.

TECHNICAL FIELD

The present disclosure relates to a terminal, a cloud apparatus, a method of driving a terminal, a method of cooperatively processing data, and a computer-readable recording medium, and more particularly, to a terminal, a cloud apparatus, a method of driving a terminal, a method of cooperatively processing data, and a computer-readable recording medium, in which a plurality of apparatuses cooperatively process personalized data adaptively in order to provide a certain service.

BACKGROUND

As cloud computing for using various services, such as storing data, using a network, and using content, through a server on the Internet is becoming more widely used, cases in which a user stores and uses important content and personal information on the Internet are increasing.

Generally, a cloud is understood to be a data storing method wherein anyone may set up a cloud account to upload data, and easily use the data anywhere by using a software environment without being hindered by fixed hardware, like a cloud floating in an Internet environment. Types of services provided by the cloud vary. The services may be classified into software as a service (SaaS), platform as a service (PaaS), hardware as a service (HaaS), and infrastructure as a service (IaaS) according to service characteristics, but such services are conceptually the same except for slight differences according to providers.

SaaS denotes a service of lending an application to a user, and PaaS denotes a service of lending a platform. HaaS denotes a service of receiving hardware from a provider when certain hardware is required. Lastly, IaaS is a service specifically mostly used by companies, and denotes a service enabling a company to use resources when occasion demands, by setting up a server, storage, and a network to form virtual environments.

However, in a situation in which data generated by information protocol (IT) (or Internet of things (IoT)) devices is greatly increasing according to an increase in connectivity between the IT (or IoT) devices, a method of analyzing data by only using a general centralized cloud is not suitable in terms of operating expenses, performance, and privacy. For example, a related art cloud service performs an operation of providing a service by analyzing activities of a user and use of a terminal, but the analyzing is performed based on a cloud, and thus personal information may be excessively exposed, thereby invading privacy.

Also, according to existing solutions, resource utilization is not adaptive since resources are statically distributed between a terminal, such as a mobile phone, and a cloud apparatus, or data is offloaded only in one direction, from a terminal to a cloud apparatus or from a cloud apparatus to a terminal. For example, an amount of data usage of an individual may flexibly increase, and when providing of a service to a plurality of users depends upon cloud analysis, expandability of a system should be considered if machine data is later included in an IT environment.

BRIEF DESCRIPTION OF THE DRAWINGS

FIG. 16 illustrates a scenario related to an analysis job distribution adjustment according to the situations of the service and the apparatus of FIG. 15B;

FIGS. 25A-25B and 26A-26C are diagrams for describing processes of anonymizing some of data while transmitting the data from a terminal to a cloud apparatus or to a neighboring terminal;

FIG. 28 is a diagram for describing which recognition level a user is to perform by using a terminal for image recognition;

FIG. 30 is a diagram illustrating an example of a terminal according to an exemplary embodiment distributing and processing data for a health care service, with a cloud apparatus.

SUMMARY

Figure 1A:
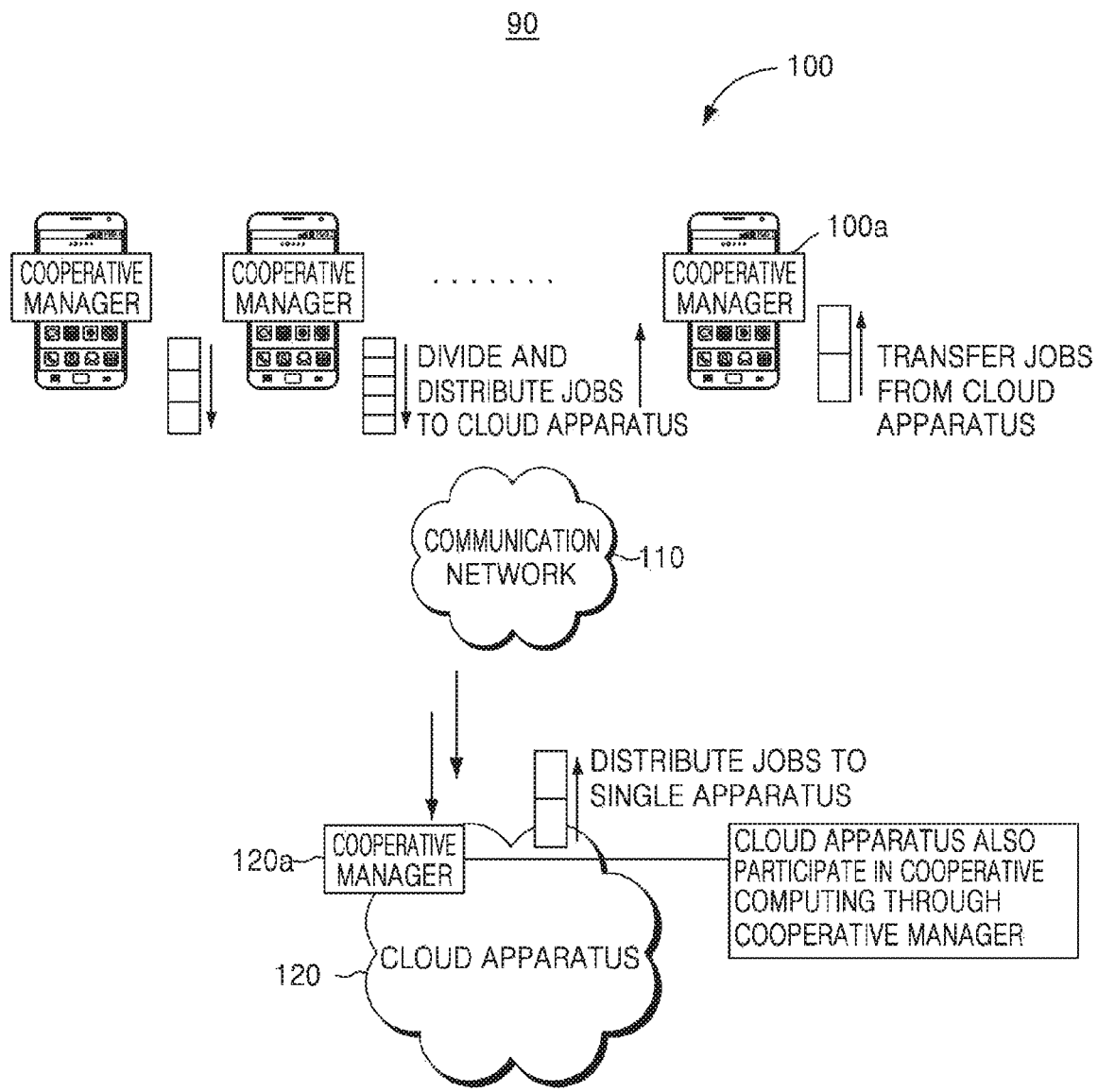
FIG. 1A is a diagram of a cloud service system according to a first exemplary embodiment.

According to an aspect of an exemplary embodiment, there is provided a terminal comprising a communication interface configured to communicate with an external apparatus over a network; a controller configured to obtain data used to predict activities of a user and anonymize a portion of the obtained data, and transmit the anonymized data and a remaining portion of the data, which is not anonymized, to the external apparatus through the communication interface; and a display configured to display notification information related to the activities of the user based on activity prediction data received from the external apparatus, the activity prediction data being generated based on an analysis of the transmitted data.

The data used to predict the activities of the user may be at least one of raw data obtained from the terminal, activity data derived from the raw data, and activity pattern data derived from the activity data.

The controller may classify the data used to predict the activities of the user according to a plurality of layers, and when the data used to predict the activities of the user is classified according to the plurality of layers, the controller may set an analyzing subject for analyzing the data according to the plurality of layers to at least one of the terminal and the external apparatus.

The controller may determine whether a program for analyzing data is installed in the external apparatus and, when it is determined that a program for analyzing the data is not installed in the external apparatus, the controller may transmit the program for analyzing the data to the external apparatus.

The display may further display a user interface (UI) screen for setting conditions with respect to an operation status of the terminal and a network status of the network, and the controller may analyze the activities of the user based on the conditions set through the UI screen.

The controller may classify the data used to predict the activities of the user according to a plurality of layers, and, when the data is classified according to the plurality of layers, the display may further display a UI screen comprising at least one of a first region indicating a data analyzable subject for generating data belonging to an upper layer based on a share setting of data belonging to a lower layer, a second region indicating an analysis operable level of the data analyzable subject, and a third region indicating an exposure risk of data belonging to another layer, different from the upper layer and the lower layer, based on the share setting of the data belonging to the lower layer.

According to another aspect of an exemplary embodiment, there is provided a cloud apparatus comprising a communication interface configured to communicate with a terminal; a storage configured to receive and store, as data used to predict activities of a user using the terminal, a portion of the data, which is anonymized, and a remaining portion of the data, which is not anonymized, from the terminal through the communication interface; and a controller configured to generate activity prediction data that predicts the activities of the user by using the received data, and transmit the derived activity prediction data to the terminal through the communication interface.

The data used to predict the activities of the user may be at least one of raw data obtained from the terminal, activity data derived from the raw data, and activity pattern data derived from the activity data.

The received data may be classified according to a plurality of layers, and the storage may receive, from the terminal, and store, cooperation level information for each of the layers, the cooperation level information indicating whether data classified according to the layer is sharable.

The received data may be classified according to a plurality of layers, and the storage may receive, from the terminal, and store, information for determining at least one of the terminal, a neighboring terminal located around the terminal, and the cloud apparatus as a data analyzing subject according to the plurality of layers.

According to another aspect of an exemplary embodiment, there is provided a method comprising obtaining data used to predict the activities of the user; anonymizing a portion of the obtained data; providing the anonymized data and a remaining portion of the data, which is not anonymized, to the external apparatus; receiving activity prediction data from the external apparatus, the activity prediction data generated according to an analysis of the provided data; and displaying notification information related to the activities of the user based on the received activity prediction data.

The data used to predict the activities of the user may be at least one of raw data obtained from the terminal, activity data derived from the raw data, and activity pattern data derived from the activity data.

The data may be classified according to a plurality of layers, and the method may further comprise, when the data is classified according to the plurality of layers, setting an analyzing subject for analyzing the data classified according to the plurality of layers to at least one of the terminal and the external apparatus.

The data may be classified according to a plurality of layers, and the method may further comprise, when it is determined that a program for analyzing the data is not installed in the external apparatus, transmitting the program for analyzing the data to the external apparatus.

According to another aspect of an exemplary embodiment, there is provided a method comprising receiving, as data used to predict activities of a user using a terminal, a portion of the data, which is anonymized, and a remaining portion of the data, which is not anonymized; generating activity prediction data that predicts the activities of the user by using the received data; and transmitting the generated activity prediction data to the terminal.

According to another aspect of an exemplary embodiment, there is provided a system comprising a cloud apparatus; and a terminal comprising a communication interface configured to communicate with the cloud apparatus over a network; a controller configured to obtain data used to predict activities of a user, to process the data into a plurality of hierarchical layers, and to set sharing restrictions for the data according to the hierarchical layer of the data; and a display configured to display a user interface (UI) screen for setting the sharing restrictions, and to display notification information related to the activities of the user, wherein the controller distributes at least a portion of the data to the cloud apparatus for processing, based on the set sharing restrictions for the data.

The sharing restrictions may indicate, for each hierarchical layer of the data, whether the data of the hierarchical layer is sharable with the cloud apparatus.

The controller may set a job level for the terminal and the cloud apparatus for each hierarchical layer, and the portion of the data distributed to the cloud apparatus may be determined according to the job level for the cloud apparatus for the hierarchical layer including the portion of the data.

The plurality of hierarchical layers may comprise raw log data, activity recognition data, pattern recognition data, and prediction result data, and the activity recognition data may be generated based on the raw log data, the pattern recognition data may be generated based on the activity recognition data, and the prediction result data may be generated based on the pattern recognition data.

According to another aspect of an exemplary embodiment, there is provided a terminal-cloud distribution system comprising a terminal comprising a communication interface; and a controller configured to obtain data used to predict activities of a user, to process the obtained data into a plurality of hierarchical layers, and to set sharing restrictions on the data according to the hierarchical layer of the data; a cloud apparatus comprising a communication interface configured to communicate with the communication interface of the terminal over a network; and a controller configured to process data into according to the plurality of hierarchical layers; and a cooperative manager configured to distribute the data between the terminal and the cloud apparatus according to the hierarchical layer and the set sharing restrictions.

The plurality of hierarchical layers may comprise raw log data, activity recognition data, pattern recognition data, and prediction result data, and the activity recognition data may be generated based on the raw log data, the pattern recognition data may be generated based on the activity recognition data, and the prediction result data may be generated based on the pattern recognition data.

DETAILED DESCRIPTION OF EXEMPLARY EMBODIMENTS

Hereinafter, exemplary embodiments will be described in detail with reference to accompanying drawings.

FIG. 1A is a diagram of a data cooperative process service system according to a first exemplary embodiment.

As shown in FIG. 1A, a data cooperative process service system 90 according to a first exemplary embodiment includes a terminal 100, a communication network 110, and at least one cloud apparatus (or a service providing apparatus) 120.

The terminal 100 may be a terminal 100-1', a terminal 100-1", a terminal 100-1''', or a terminal 100-1'''' described later. Also, the cloud apparatus 120 may be a cloud apparatus 120', a cloud apparatus 120", a cloud apparatus 120''', or a cloud apparatus 120'''' described later.

Here, the terminal 100 may include a mobile apparatus, such as a smart phone, a mobile phone, a laptop, a tablet personal computer (PC), a personal digital assistant (PDA), or a wearable device, which performs wired/wireless communication. For example, in some exemplary embodiments, the terminal 100 may include a terminal that only performs Internet access and a basic arithmetic function by having minimum hardware and software resources applied under a cloud computing environment. In other exemplary embodiments, the terminal 100 may include an apparatus, such as a television (TV) or a set-top box. The terminal 100 may use a multimedia service, as well as a basic communication service, such as voice and data communication. The terminal 100 may transmit and receive multimedia content, such as a video or an image, and reproduce multimedia content in the terminal 100.

The terminal 100 according to an exemplary embodiment may interwork with the cloud apparatus 120, thereby cooperating with the cloud apparatus 120 to perform an operation to provide a data cooperative process service. Also, accordingly, the terminal 100 may analyze data used for a personalized data cooperative process service. Here, the personalized data cooperative process service may be a service provided to a user of the terminal 100 and the cloud apparatus 120 cooperate with each other, and for example, services may be differently provided according to users even if a cloud service is of the same type. Also, cooperation may denote that a task, i.e., a job, is cooperatively (or collaboratively) processed. The task may be predetermined. Also, when it is assumed that a plurality of pieces of hierarchical information may be generated by using user-related data used in a cloud service, such as application usage information, a web browsing history, and a global positioning system (GPS) information, and various types of sensing information, such as biometric information, the user may not want to share certain hierarchical information with an external apparatus, i.e., the cloud apparatus 120. In this case, while the terminal 100 and the cloud apparatus 120 cooperatively generate and use hierarchical information so as to provide the data cooperative process service, data related to hierarchical information, which the user does not want to share, may not be provided from the terminal 100 to the cloud apparatus 120. According to such processes, privacy of the user may be protected. Here, the hierarchical information may include tier level information, such as activity recognition, activity pattern recognition, and activity prediction, an indicator indicating each layer of attribute level information, such as web browser usage and application selection, and web browser information, etc. of a user location, etc., and substantial data related to the indicator.

The indicator is information indicating whether transmitted data is related to activity recognition or activity pattern recognition. Also, the hierarchical information may include, as will be described later with reference to Table 1, raw data, activity data, activity pattern data, and activity prediction data, but is not limited thereto.

The terminal 100 may set whether to share the hierarchical information based on setting information assigned by the user from, for example, a screen of the terminal 100. Also, based on the setting of whether to share certain information, the terminal 100 may perform distributed processing on data of the hierarchical information and determine a distributed processing target. Also, the terminal 100 may adaptively perform distributed processing on data based on a job distribution restriction from among the setting information (or service restriction level information) assigned by the user. As the distributed processing is adaptively performed on the data, a cooperative form may be flexibly changed. According to an exemplary embodiment, the terminal 100 may process data about activities of the user (for example, action of the user, content reproduction, and application usage). For example, the terminal 100 may recommend content to the user by analyzing a genre of content liked by the user or a place at which the user often reproduces the content based on a history of using content.

In order to perform operations for providing the data cooperative process service, the terminal 100 may include a data analyzing module of low power consumption so as to process some of big data processing jobs processed by the cloud apparatus 120. Also, the cloud apparatus 120 may process some of data processing jobs of the terminal 100. At this time, certain data that is a target of a data processing job may be hidden through, for example, a sandboxing function, and access to hidden data from the outside may be restricted. In other words, the terminal 100 may protect detailed personal information from analyzing subjects, such as the cloud apparatus 120, by hiding data. Here, the data analyzing module may include engines for respectively obtaining a plurality of pieces of layer information, for example, information of activity recognition, activity pattern recognition, and activity prediction. Here, an engine may denote a program (or a process) that performs core and essential functions in computer fields. Engines may be logically hierarchized. In a schematized diagram (see, e.g., FIG. 4 described further below), an engine (for example, an activity recognizing engine) below may generate activity recognition results used by an engine (for example, a pattern recognizing engine) above. In other words, the activity recognition results may be an output of the activity recognizing engine and an input of the pattern recognizing engine. A performing subject of an analogizing engine of a cooperative agent portion (see, e.g., FIG. 4, 400) may be determined and even a performing schedule may be set. This may be based on user restrictions. Also, the user restrictions may be used to determine which information is to be shared by a personal information protecting module and whether to share or hide information.

Also, the terminal 100 and the cloud apparatus 120 may automatically share each other's state of using resources in real-time. Also, the terminal 100 may flexibly determine analysis workloads of the terminal 100 and the cloud apparatus 120 based on the states of using resources of the terminal 100 and the cloud apparatus 120. Also, the terminal 100 may distribute jobs for the data cooperative process service to the cloud apparatus 120 based on the determined analysis workloads. Such operations may be performed by a type of program called, for example, a cooperative manager 100a. In other words, the cooperative manager 100a may be an intelligent engine performing a function of arbitrating cooperation. According to an exemplary embodiment, the cooperative manager 100a may be referred to as an autonomous adaptation agent (AAA) 100a. The cooperative manager 100a, such as an AAA, may denote a program itself according to an exemplary embodiment, or may collectively denote a volatile memory and a cooperation-related program stored in the volatile memory. Alternatively, the cooperative manager 100a may include not only hardware in which a program is configured in terms of hardware, but also hardware in which only some modules of a program are configured in terms of hardware. Here, analysis may include not only a batch-type job of data, but also a series of jobs analyzing and processing complex events performed in real-time. An event may be information about a state of using resources that are shared in real-time. Also, the terminal 100 may execute policies for determining units of workload distribution and for determining a distribution schedule according to a machine learning method, and may automatically and continuously apply the machine learning method to learn and adjust the policies.

In addition, the user may have adjustment authority to adjust an information sharing level (for example, a service restriction level or a cooperation level), and the terminal 100 may perform personal information protection and job distribution according to the adjustment authority of the user. Since an analysis result of the cloud apparatus 120 may be better than an analysis result of the terminal 100, the terminal 100 may distribute jobs for analyzing and processing data by considering computing capacity and resources of the terminal 100 and the cloud apparatus 120. For example, processing procedures of information for the personalized data cooperation process service according to an exemplary embodiment may be classified into four tiers. For example, a first tier may be a tier of collecting raw data including sensing data detected from a sensor, and log data about using an application and about an email, a second tier may be a tier of generating activity data indicating activities of the user by analyzing the raw data of the first tier, a third tier may be a tier of generating activity pattern data of the user by analyzing the activity data of the user, and a fourth tier may be a tier of predicting activities of the user by using the activity pattern data of the user and generating service response information to be provided to the user based on the predicted activities of the user. A service developer may develop a service application such that the user may set a sharing level regarding data to be analyzed so as to provide service of the service application while installing the service application. Also, the sharing level of data may be flexibly changed according to a status of the terminal 100, a status of the cloud apparatus 120, and a network status between the terminal 100 and the cloud apparatus 120. Also, some or all of the data to be analyzed for the service may be protected via a method, such as sandboxing.

Data generated or used during the processing procedures of information for the above-described service may be organized according to each tier according to, for example, Table 1 below.

TABLE 1

| Layer | Layer Description | Data Type | Detailed Example |
| --- | --- | --- | --- |
| Fourth Tier | Predict activities of user and derive service response information | Activity Prediction | Leave office after two hours, jog after three hours |

TABLE 1-continued

| Layer | Layer Description | Data Type | Detailed Example |
|---|---|---|---|
| Third Tier | Analyze activities of user and log pattern by using data of second tier | Activity Pattern Data | Eat → exercise → sleep |
| Second Tier | Analyze activities of user occurred in terminal by using data of first tier | Activity Data | Walk, commute, eat, chat, listen to music, etc. |
| First Tier | Obtain, by terminal, sensing information and log information | Raw Data | Sensing value information (ex: GPS information, biometric information), on/off information of time, date, day of week sensors, application usage information, etc. |

Referring to [Table 1], the first tier from among the plurality of layers may be a tier of collecting all raw data collectable by the terminal 100. The second tier may be a tier of recognizing actions of the user, for example, whether the user is walking and eating, by analyzing data of the first tier, wherein data generated in the second tier may be activity data analyzed based on the raw data. The third tier may be a tier of generating activity data indicating that the user is acting in an order of eating, exercising, and sleeping by analyzing data of the second tier. The fourth tier may be a tier of predicting actions of the user by analyzing data of the third tier and generating activity prediction data indicating predicted activities. In the fourth tier, service response information may be generated based on the activity prediction data. For example, the terminal 100 may cooperate with the cloud apparatus 120 to analyze activity data of the user for seven days, and recognize that the user has an activity pattern of usually jogging after eating. Also, the terminal 100 may predict activities of the user based on the activity pattern of the user.

Moreover, when it is difficult for the terminal 100 to distribute and perform jobs for the data cooperation process service with the cloud apparatus 120, the terminal 100 may notify the user that it is difficult to distribute and perform the data cooperation process service. Also, the terminal 100 may re-distribute the jobs for the data cooperation process service to the cloud apparatus 120. For example, the terminal 100 may adaptively re-distribute the jobs for the data cooperation process service according to network statuses, battery remains, central processing unit (CPU) shares, and memory shares of the terminal 100 and the cloud apparatus 120.

The communication network 110 includes both wired and wireless communication networks. Here, a wired network includes an Internet network, such as a cable network or a public switched telephone network (PSTN), and a wireless communication network includes a code division multiple access (CDMA), wideband CDMA (WCDMA), global system for mobile communication (GSM), evolved packet core (EPC), long term evolution (LTE), or a wireless broadband Internet (WiBro) network. However, the communication network 110 according to an exemplary embodiment is not limited thereto, and may be used, as an access network of a next-generation mobile communication system that will be realized later, in a cloud computing network under, for example, a cloud computing environment. For example, when the communication network 110 is a wired/wireless communication network, an access point in the communication network 110 may access an exchange office of a telephone company, but when the communication network 110 is a wireless communication network, the access point may access a serving GPRS support node (SGSN) or a gateway GPRS support node (GGSN) operated by a mobile carrier to process data, or access any one of various relays, such as base station transmission (BTS), NodeB, and e-NodeB, to process data.

The communication network 110 may include an access point. The access point includes a small base station, such as a femto or pico base station mostly provided in a building. Here, the femto or pico base station is distinguished based on the maximum number of accessible terminals 100 according to classification of small base stations. The access point includes a location area network module for performing local area communication, such as Zigbee or Wi-Fi, with the terminal 100. The access point may use TCP/IP or real-time streaming protocol (RTSP) for wireless communication. Here, the local area communication may be performed in any one of various standards, such as radio frequency (RF) such as Bluetooth, Zigbee, infrared data association (IrDA), ultra high frequency (UHF), and very high frequency (VHF), and ultra wideband (UWV) communication, as well as Wi-Fi. Accordingly, the access point may extract a location of a data packet, assign an optimal communication path with respect to the extracted location, and transmit the data packet to a next apparatus, such as the terminal 100, along the assigned communication path. The access point may share several lines in a general network environment, and for example, may include a router, a repeater, and a relay.

The cloud apparatus 120 is an apparatus that stores and manages computing resources, such as software existing in an intangible form, and for example, may receive, store, and manage application-related information processed by providing a certain application (or a program) to the terminal 100 upon a request from the terminal 100, or may drive an application therein upon a request of the terminal 100 and then process application-related information requested by the terminal 100 and store and manage processing results.

Also, the cloud apparatus 120 according to an exemplary embodiment may share, as a service providing apparatus, service restriction level information about a sharing level of data for the data cooperation process service, with the terminal 100. The cloud apparatus 120 may cooperate with the terminal 100 to process data provided by the terminal 100, based on the service restriction level information. Here, the service restriction level information may be setting information set by the user with respect to a data sharing level to process cooperative data. The service restriction level information may be additional information instead of substantial analysis data. For example, the user may set data sharing such that details of a text message are restricted from being shared by the cloud apparatus 120 whereas information about a history of transmission and reception of text messages is allowed to be shared by the cloud apparatus 120. In this case, a setting value regarding the data sharing set by the user may be included in the service restriction level information.

Meanwhile, in the above, it has been described that the terminal 100 distributes jobs to the cloud apparatus 120 and sets a data sharing level with the cloud apparatus 120, but the present disclosure is not limited thereto. The cloud apparatus 120 may distribute jobs to the terminal 100 and set a data sharing level with the terminal 100. In this case, like the terminal 100, the cloud apparatus 120 may include a cooperative manager 120a. The cloud apparatus 120 may obtain hierarchical information about the user of the terminal 100 by analyzing data provided by the terminal 100. In this case, the cloud apparatus 120 may receive some or all of information of a certain layer from among personalized information, based on a security level set by the user. The cloud apparatus 120 may analyze data received from the terminal 100 according to various conditions, such as a data processing subject set by the terminal 100, an analyzable level, and resource usage restrictions. Accordingly, the cloud apparatus 120 may include a data analyzing module for self-processing data, and the cooperative manager 120a that processes information related to schedule policy, etc. for analysis cooperation. The data analyzing module and the cooperative manager 120a may be similar to the data analyzing module and the cooperative manager 100a of the terminal 100. Performance of the data analyzing module of the cloud apparatus 120 may be excellent compared to that of the data analyzing module of the terminal 100. For example, the data analyzing module of the cloud apparatus 120 may operate faster and be able to handle more data than the data analyzing module of the terminal 100.

An intelligent engine called the cooperative manager 120a of the cloud apparatus 120 may interwork with the intelligent engine called the cooperative manager 100a of the terminal 100 such that the cloud apparatus 120 and the terminal 100 may share states of using resources in real-time while distributing and performing jobs of analyzing data. For example, when the cooperative manager 120a of the cloud apparatus 120 and the cooperative manager 100a of the terminal 100 cooperate, i.e., interact, with each other to distribute jobs for analyzing data, the data analyzing module of the cloud apparatus 120 and the data analyzing module of the terminal 100 may perform analyzing operations of data assigned thereto according to distribution results.

For example, the user of the terminal 100 may set the tier level information such that raw data of a first layer about activities of the user and activity data of a second layer are shared with the cloud apparatus 120, and activity pattern data of a third layer and activity prediction data of a fourth layer are not shared with the cloud apparatus 120. In this case, the cooperative manager 100a of the terminal 100 may distribute job data based on setting with the cooperative manager 120a of the cloud apparatus 120. When resources of the cloud apparatus 120 lack during cooperation, the cooperative manager 120a of the cloud apparatus 120 may notify the cooperative manger 100a of the terminal 100 of the lack of resources. Also, the terminal 100 may receive a notification about the lack of resources, and re-distribute jobs of the cloud apparatus 120.

Meanwhile, the cloud apparatus 120 may access the cloud apparatus 120 through the communication network 110 by using a virtual organization technology, and register resources provided by the cloud apparatus 120. Accordingly, developers may quickly develop an application through an application programming interface (API) provided by a service provider based on the cloud apparatus 120, instead of self-developing a certain application from the beginning. Here, the API may be realized in a form of a language or message used in communication between an operating system and an application program.

When the terminal 100, for example, is to obtain certain results through the data cooperation process service, such as acoustic speech recognition (ASR), the terminal 100 may provide, to the user, results requested by the user based on hierarchical information owned by the terminal 100 and hierarchical information provided by the cloud apparatus 120. Of course, the terminal 100 may check with the cloud apparatus 120 whether analysis results obtained by analyzing data corresponding to certain hierarchical information are in the cloud apparatus 120, and request the cloud apparatus 120 for the analysis results to obtain results desired by the user.

Figure 1B:
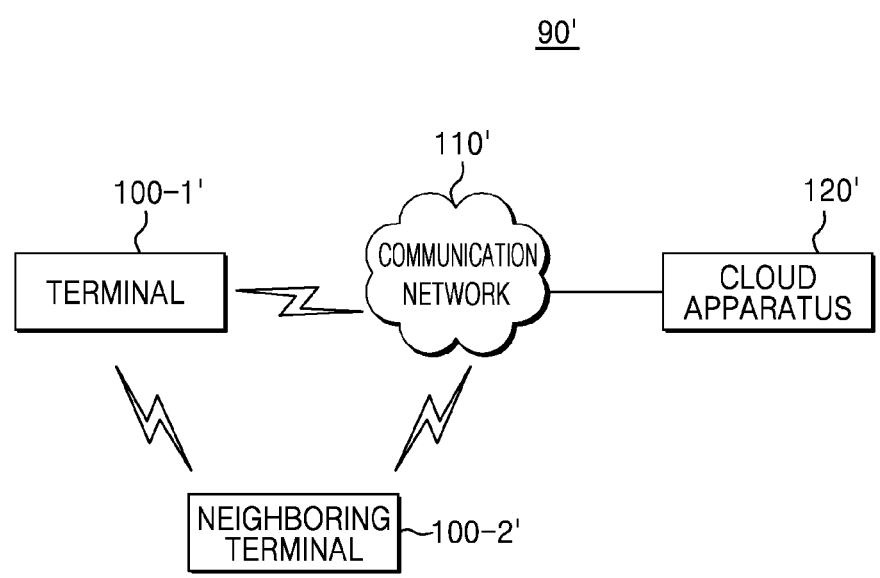
FIG. 1B is a diagram of a data cooperative process service system according to a second exemplary embodiment

FIG. 1B is a diagram of a data cooperative process service system according to a second exemplary embodiment.

As shown in FIG. 1B, a data cooperation process service system 90' according to a second exemplary embodiment includes a terminal 100-1', a neighboring terminal 100-2', a communication network 110', and the cloud apparatus 120'. A neighboring terminal may be owned by the user him/herself, a family member, or a friend. When the neighboring terminal is owned by a family member or a friend, mutual consent regarding data cooperation is used. Accordingly, sharing of data for cooperation according to display of a user data sharing restriction level is similar to a method according to sharing policies between the terminal 100-1' and the cloud apparatus 120'. When there are a plurality of neighboring terminals, adjusting of division units of cooperative data to be shared follows the same method as a dividing method to a cloud having a plurality of computing resources.

Comparing the data cooperation process service system 90' of FIG. 1B and the cloud computing system 90 of FIG. 1A, the data cooperation process service system 90' further includes the neighboring terminal 100-2'. Here, the neighboring terminal 100-2' may include, as well as a mobile phone, such as a smart phone, an access point performing, for example, Wi-Fi communication described above, and in addition, various types of terminals, such as a TV and a set-top box.

According to the above structure, the terminal 100-1' may further assign the neighboring terminal 100-2', as well as the cloud apparatus 120', as a distributed processing subject of data to be used for the data cooperation process service. Such distributed processing processes of data may be performed through the communication network 110', and via direct communication between the terminal 100-1' and the neighboring terminal 100-2'.

In the neighboring terminal 100-2', an engine, i.e., a program, for analyzing data requested by the terminal 100-1' may be included in the neighboring terminal 100-2', but when it is determined that the program is not included, the neighboring terminal 100-2' may receive the program from the terminal 100-1' or the cloud apparatus 120' to perform an analyzing operation. Here, the program denotes the cooperative manager 100a or a downloadable engine capable of performing an analyzing operation. Also, analysis results (for example, hierarchical information) obtained through the analyzing operation may be stored in an internal memory of the neighboring terminal 100-2' or provided from the neighboring terminal 100-2' to the terminal 100-1' or the cloud apparatus 120'. Here, information about where relevant hierarchical information about a certain user is stored may be shared between the terminal 100-1', the neighboring terminal 100-2', and the cloud apparatus 120' as long as privacy of an individual is not invaded. Cooperative processes of the neighboring terminal 100-2' will be described in detail later.

In addition, since details about the terminal 100-1', the communication network 110', and the cloud apparatus 120' of FIG. 1B are similar to those of the terminal 100, the communication network 10, and the cloud apparatus 120 of FIG. 1A, descriptions thereof are not provided again.

Figure 1C:
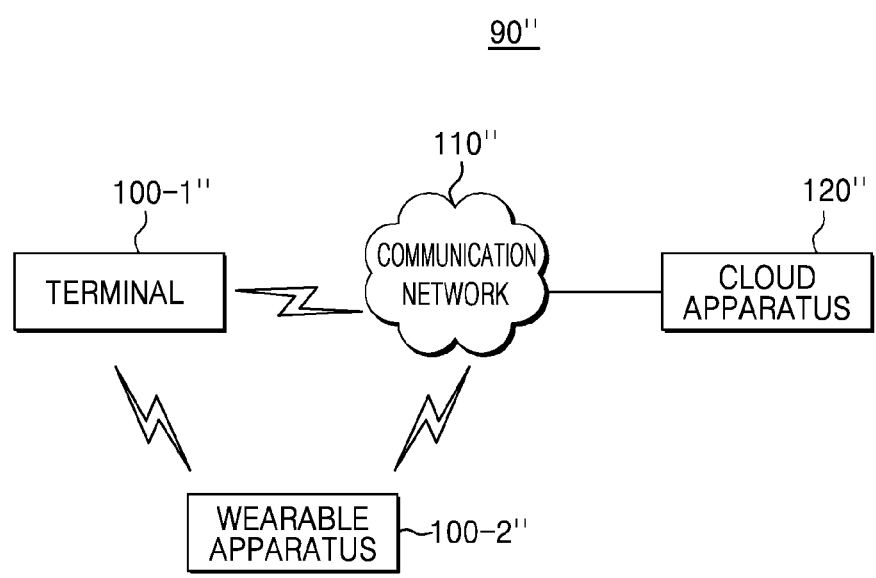
FIG. 1C is a diagram of a data cooperative process service system according to a third exemplary embodiment

FIG. 1C is a diagram of a data cooperative process service system according to a third exemplary embodiment.

Comparing a data cooperation process service system 90" of FIG. 1C and the data cooperation process service system 90' of FIG. 1B, in the exemplary embodiment shown in FIG.

1C, the neighboring terminal 100-2' of FIG. 1B is configured as a wearable apparatus 100-2". Here, the wearable apparatus 100-2" may be a smart watch having computing capability in a watch shape, such as Galaxy Gear, or smart glasses having computing capability in a glasses shape. Furthermore, the wearable apparatus 100-2" may be a wearable device in, for example, a pair of glasses, a ring, a glasses, a belt, a head mounted display (HMD), or a headphone/earphone shape, etc. capable of communication. Also, the wearable device 100-2" may be a wearable device having a biometric information measuring function, such as a pedometer, a blood pressure gauge, or a blood sugar gauge, etc. which measures biometric information.

The terminal 100-1" may further assign the wearable apparatus 100-2" as a distributed processing subject of data to be used in the data cooperation process service. Since other operations of the wearable apparatus 100-2" are similar to those of the neighboring terminal 100-2' of FIG. 1B, details thereof are not provided again.

Also, since the terminal 100-1", a communication network 110", and the cloud apparatus 120" of FIG. 1C are similar to the terminal 100, the communication network 110, and the cloud apparatus 120 of FIG. 1A, details thereof are not provided again.

Figure 1D:
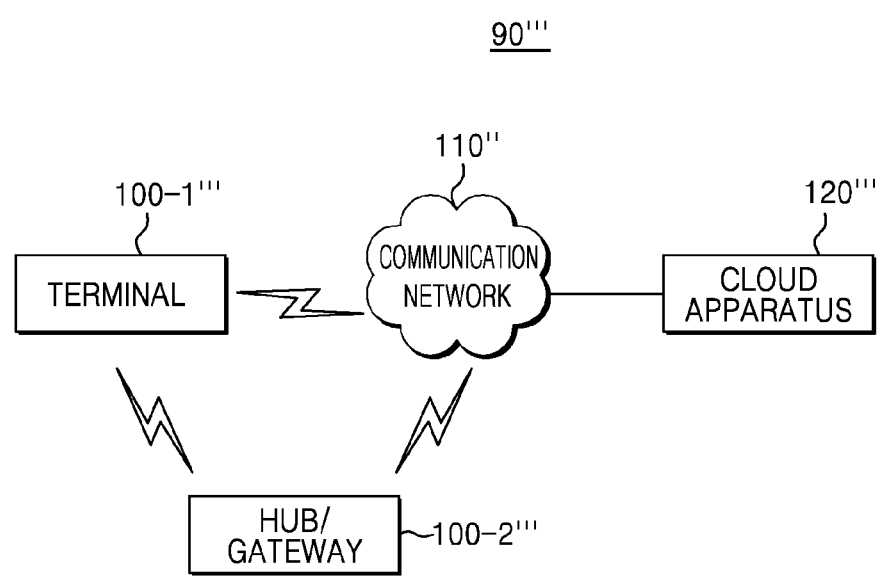
FIG. 1D is a diagram of a data cooperative process service system according to a fourth exemplary embodiment.

FIG. 1D is a diagram of a data cooperative process service system according to a fourth exemplary embodiment.

Comparing the data cooperation process service 90''' of FIG. 1D and the cloud computing system 90' of FIG. 1B, the neighboring terminal 100-2' of FIG. 1B is configured as a hub or gateway 100-2'''. Here, a hub is an apparatus providing an interface for using several hosts, such as a computer, by using one line in one network, and a gateway is an apparatus enabling, for example, communication of different networks using different protocols.

According to an exemplary embodiment of the present disclosure, the terminal 100-1''' may perform distributed processing of data to be used for the personalized data cooperation process service, with the hub or gateway 100-2''' connected to the terminal 100-1'''. Operations of the hub or gateway 100-2''' are not largely different from those of the neighboring terminal 100-2' of FIG. 1B, and thus further descriptions are not provided.

Also, since the terminal 100-1''', a communication network 100''' and the cloud apparatus 120''' of FIG. 1D are similar to the terminal 100, the communication network 110, and the cloud apparatus 120 of FIG. 1A, details thereof are not provided again. However, the communication network 110''' of FIG. 1D may be connected to the terminal 100-1''' through a base station, such as BTS or e-Node.

Figure 1E:
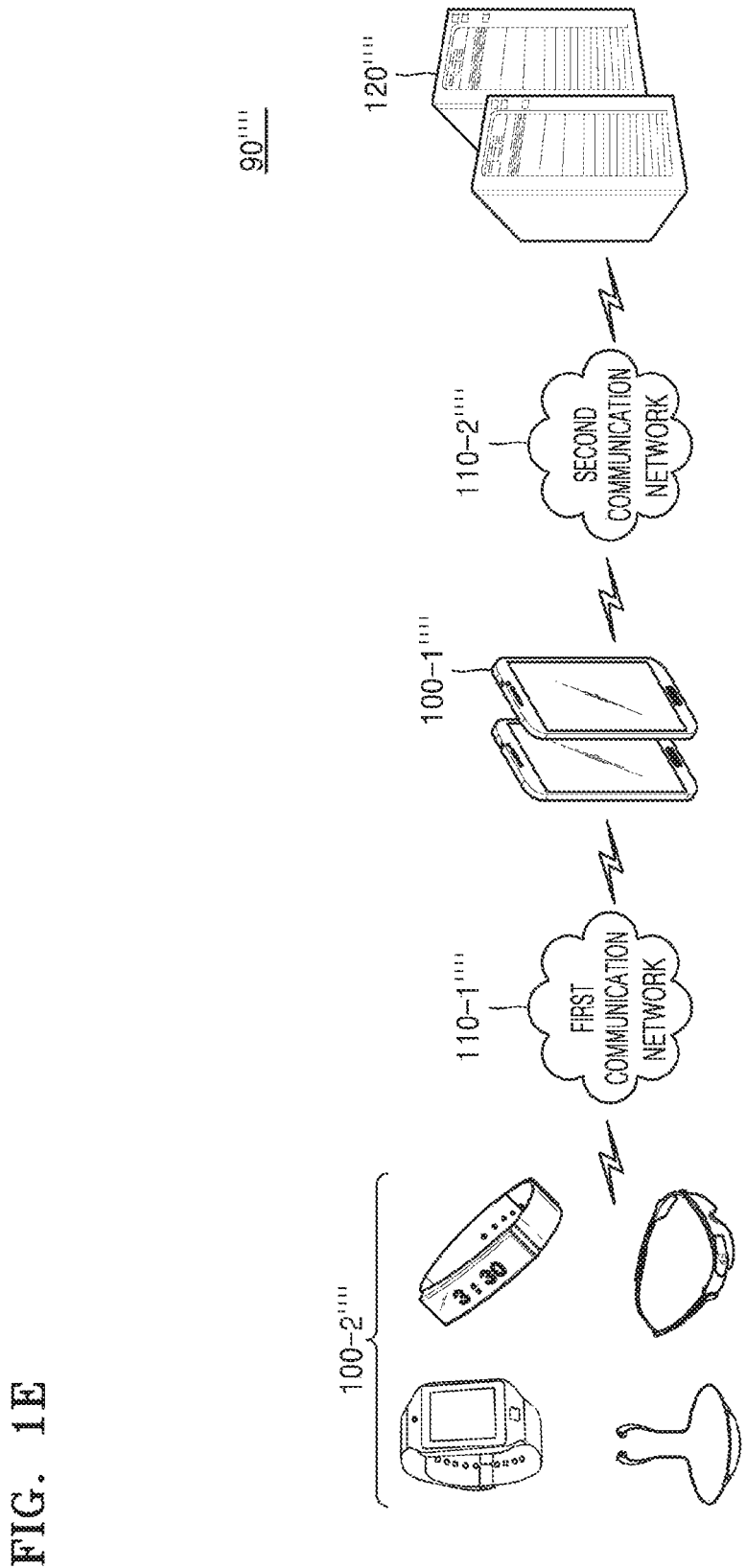
FIG. 1E is a diagram of a data cooperative process service system according to a fifth exemplary embodiment.

FIG. 1E is a diagram of a data cooperative process service system according to a fifth exemplary embodiment.

Comparing a data cooperation process service system 90'''' of FIG. 1E and the cloud computing system 90'''' of FIG. 1C, the terminal 100-1'''' of FIG. 1E is connected to a wearable apparatus 100-2'''' through a first communication network 110-1'''', and the terminal 100-1'''' is connected to the cloud apparatus 120'''' through a second communication network 110-2''''. Here, the first communication network 110-1'''' may be a local area network. The local area network may be, for example, a communication network using at least one local area communication from among wireless LAN (Wi-Fi), Bluetooth, Zigbee, Wi-Fi direct (WFD), ultra wideband (UWB), infrared data association (IrDA), Bluetooth low energy (BLE), near field communication (NFC), and ANT+, but is not limited thereto. The second communication network 110-2'''' may be the communication network 110 described above with reference to FIG. 1A, or may be a local area or remote area network.

In FIG. 1E, the terminal 100-1'''' may further assign at least one of the cloud apparatus 120'''' and the wearable apparatus 100-2'''' as a distributed processing subject of data so as to process data used for the data cooperation process service.

For example, a sensor of the wearable apparatus 100-2'''' may obtain raw data related to actions of the user or raw data related to biometric information of the user. The terminal 100-1'''' may receive raw data from the wearable apparatus 100-2'''' through the first communication network. Then, the terminal 100-1'''' may analyze the received raw data in cooperation with the cloud apparatus 120''''. Alternatively, the terminal 100-1'''' may receive processed data from the wearable apparatus 100-2'''', and analyze the processed data in cooperation with the cloud apparatus 120''''. The processed data may include, for example, activity data, activity pattern data, and activity prediction data, but is not limited thereto.

In detail, the raw data and the processed data may be classified according to layers or pre-set standards based on a security level or a process level, and displayed on a screen of the terminal 100-1'''' or wearable apparatus 100-2''''. In this case, when a job subject is determined, the terminal 100-1'''', the wearable apparatus 100-2'''', and the cloud apparatus 120'''' may cooperate with each other to analyze the biometric information of the user and provide health service suitable to the user. In the health service, an exercising or relaxing method for the user may be provided. Alternatively, an illness possibility, a progress status of an illness, etc. may be provided to the user.

When the terminal 100-1'''' or the wearable apparatus 100-2'''' transmits data related to biometric information of the user to an external apparatus or the cloud apparatus 120'''', the terminal 100-1'''' or the wearable apparatus 100-2'''' may transmit some of the data as anonymized data for privacy protection. In this case, some or all of the raw data and the processed data may be anonymized. For example, some of data may be anonymized by changing some of raw data or processed data related to biometric information to different pre-set values. For example, anonymizing may be performed by changing data, such as a name, an age, and a gender, of certain data to different values. Details about anonymizing will be described in detail later. Also, a scenario of providing a medical service of a differentiated level through cooperation between the terminal 100-1'''' and the cloud apparatus 120'''' based on the biometric information collected by the wearable apparatus 100-2'''' will be described later.

Figure 2A:
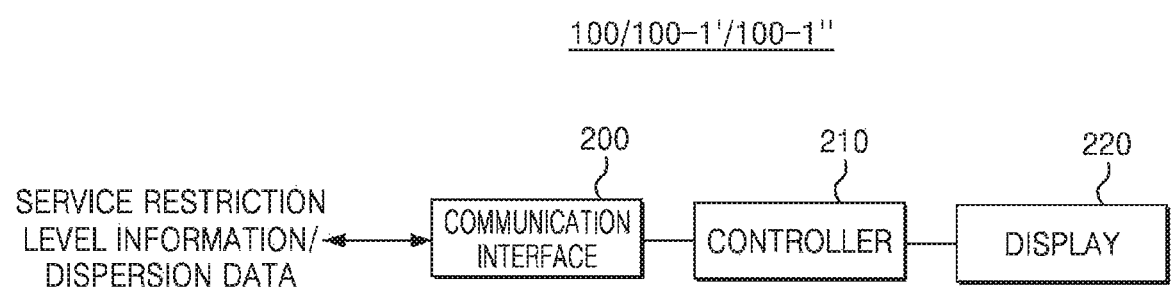
FIG. 2A is a block diagram showing an example of a detailed structure of a terminal of FIGS. 1A through 1C.

FIG. 2A is a block diagram showing an example of a detailed structure of the terminals 100, 100-1', 100-1'', 100-1''', and 100-1'''' of FIGS. 1A through 1E.

Referring to FIGS. 2A and 1A together for convenience of description, the terminal 100 according to an exemplary embodiment includes some or all of a communication interface 200, a controller 210, and a display 220.

Here, 'includes some or all' means that a component such as the communication interface 200 may be configured by being integrated in another component such as the controller 210. For example, the communication interface 200 and the controller 210 may be referred to as a data processor. Hereinafter, for thorough understanding of the disclosure, it will be described that the terminal 100 includes all of the communication interface 200, the controller 210, and the display 220.

The communication interface 200 communicates with the cloud apparatus 120 so as to provide, to the user, the data cooperation process service (for example, the personalized data cooperation process service). Accordingly, the communication interface 200 may transmit the service restriction level information regarding the data cooperation process service set by the user in the terminal 100 to the cloud apparatus 120. Also, the communication interface 200 may transmit data to be analyzed for the data cooperation process service based on information about the service restriction level to the cloud apparatus 120. During such processes, the communication interface 200 may additionally perform an operation such as converting the received data. For example, the communication interface 200 may perform a data process, such as encoding or decoding. Even if the data corresponds to one certain layer, when job distribution is performed, the terminal 100 may transmit the service restriction level information to the cloud apparatus 120, thereby facilitating data distribution. For example, when data to be processed is data corresponds to activity recognition results of a second layer, the user may set processing of the data such that 50% of the data to be processed is processed by the terminal 100 and 50% of the data to be processed is processed by the cloud apparatus 120. However, the percentages are only an example, and different percentages may be used. For example, the user may set processing of data such that 35% of data is processed by the terminal 100 and 65% of the data is processed by the cloud apparatus 120. In this case, the cloud apparatus 120 may be provided with the service restriction level information together with the data to be processed (for example, full data), and may analyze the data to be processed according to the service restriction level information. However, an exemplary embodiment is not limited thereto, and according to some exemplary embodiments, the cloud apparatus 120 may only receive the data to be processed and analyze the received data without receiving the service restriction level information. That is, the transmission of the service restriction level information may be omitted in some exemplary embodiments.

The controller 210 may control overall operations of the communication interface 200 and the display 220. For example, when the user sets the service restriction level regarding the data cooperation process service through a UI screen displayed on the display 220, the communication interface 200 may be controlled to transmit information related to the data cooperation process service and the setting to the cloud apparatus 120. Here, the service restriction level may be a level indicating a degree of privacy protection of the user, and sharing of some or all of user-related data may be restricted according to the service restriction level. The cloud apparatus 120 may derive a plurality of pieces of hierarchical information, which are hierarchized, by using the user-related data provided from the terminal 100. Also, according to the service restriction level, some or all of data to be provided to the cloud apparatus 120 may be anonymized. The user of the terminal 100 may determine hierarchical information indicating up to which tier is to be shared with the cloud apparatus 120, such that the cloud apparatus 120 is unable to share information regarding certain hierarchical information from among the plurality of pieces of hierarchical information. Accordingly, some data used to derive the certain hierarchical information may not be provided from the terminal 100 to the cloud apparatus 120.

In order to set such a service restriction level, the controller 210 may control the display 220 to display a UI screen, and at the same time, control the display 220 to additionally set various types of information. For example, in order to derive the certain hierarchical information from among the plurality of pieces of hierarchical information, the user may set various types of information, such as how far data related to corresponding hierarchical information is to be analyzed, and if an analyzing subject is determined, a percentage (%) of an analyzing level. Also, various types of information about how to perform distributed processing of data may be set according to an available capability of resources, such as CPU and battery of the terminal 100, and a network status such as the communication network 110. The various types of information set as such may be shared with the cloud apparatus 120. Other details will be described further later. An AAA and an analyzing module may perform cooperation processes according to the service restriction level set by the controller 210.

The display 220 displays various UI screens. Here, the UI screens may include screens for setting the service restriction level, a data analyzing job feasible subject, an analyzing job level, and a job distribution restriction. Also, information determined to be additionally notified to the user based on information set by the user through the UI screens may be displayed in a form of a UI screen or a popup window. For example, the user wishes not to share information regarding the certain hierarchical information from among the plurality of pieces of hierarchical information, but the display 220 may notify the user that such setting processes are wrong, or display information notifying the user that the certain hierarchical information the user wishes not to share may be externally shared consequently. Furthermore, the display 220 may display various types of information processed by the controller 210.

Figure 2B:
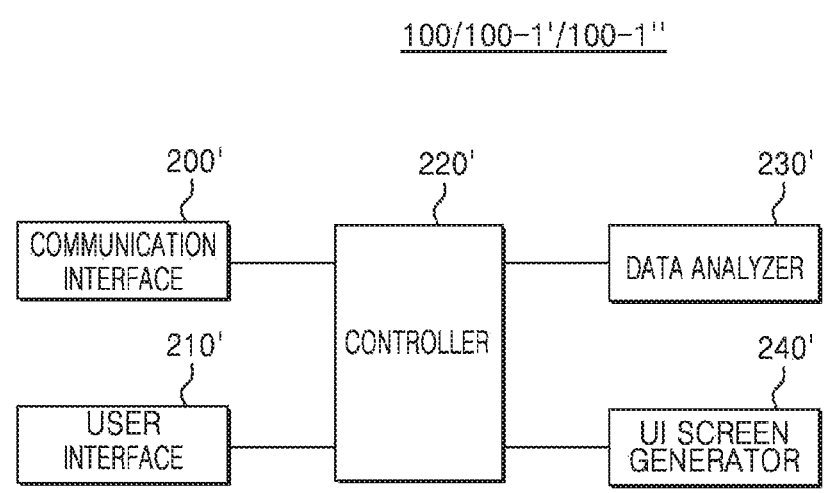
FIG. 2B is a block diagram showing another example of a detailed structure of the terminal of FIGS. 1A through 1C.

FIG. 2B is another exemplary diagram of a detailed structure of the terminal of FIGS. 1A through 1E.

For convenience of description, referring to FIGS. 2B and 1A together, the terminal 100 according to another exemplary embodiment may include some or all of a communication interface 200', a user interface 210', a controller 220', a data analyzer 230', and a UI screen generator 240'. In addition, the terminal 100 may further include an imaging unit such as a camera or video module (not shown), a voice recognizer (not shown), and a voice output module (not shown).

Here, 'include some or all' means that a component such as the user interface 210' may be omitted, or a component such as the UI screen generator 240' may be integrated with another component such as the controller 220', and for thorough understanding of the disclosure, it will be described that the terminal 100 includes all of the communication interface 200', the user interface 210', the controller 220', the data analyzer 230' and the UI screen generator 240'.

Like the communication interface 200 of FIG. 2A, the communication interface 200' may cooperate with the cloud apparatus 120 to dispersively distribute and process various types of data based on the service restriction level and an indicator linked to the service restriction level, which are set by the user in the terminal 100.

The user interface 210' may be configured as a button or buttons and a display, or may be realized as a touch screen that performs functions of the button or buttons and functions of the display together. Also, the user interface 210' may further include a user information detector including a sensor, etc. The button or buttons may receive a user command, and the user information detector may detect various types of information about the user using the terminal 100. For example, information about a location of the user may be detected. Also, various types of supported information may be displayed on the terminal 100 through the display.

The controller 220' may control overall operations of the communication interface 200', the user interface 210', the data analyzer 230', and the UI screen generator 240', which are included in the terminal 100. For example, when there is a user request through the user interface 210', the controller 220' may control the UI screen generator 240' to display a UI screen for setting the service restriction level on the user interface 210', in detail, on the display. Also, the controller 220' may provide data processed based on the set service restriction level information to the data analyzer 230' and control the data analyzer 230' to derive hierarchical information. Since other details related to the controller 220' are not largely different from the controller 220 of FIG. 2A, descriptions thereof are not provided again.

rotation information, or the like) of the terminal 100 held by the user may be obtained through a gyroscope included in the user interface 210'. As another example, a type of an application used by the user and a log history of using an application may be obtained. During such processes, the data analyzer 230' analyzes data based on the service restriction level information set by the user. When the user sets the terminal 100 to derive hierarchical information of a certain layer from among a plurality of pieces of hierarchical information, the data analyzer 230' may analyze only data related to the certain hierarchical information. Accordingly, the data analyzer 230' may execute an analyzing engine, i.e., a program, for deriving each piece of hierarchical information.

An obtainer obtaining the raw data described above and data analysis results may be organized according to Table 2 below.

TABLE 2

| Service | Raw Data Obtainer | Analyzer 1 (Activity Recognition) | Analyzer 1 (Activity Pattern Recognition) | Analyzer 3 (Activity Pattern Prediction, recommended Information Provision) |
| --- | --- | --- | --- | --- |
| Exercise Management Service | Gyroscope Sensor, GPS, etc. | Running Walking Jumping In certain place | Jogs for one hour mostly at 19:00 near riverside. | When jogging time is less than one hour, display exercise encouraging message or new replacement exercise. |
| Schedule Notification Service | GPS, Time Measurer Sensor, Calendar Monitor, etc. | In certain place Measure certain time Recognize schedule of certain date | Continuously staying at home from 14:00. | Scheduled to leave country at 6:00. Transmit notification message that checking in will be in time if leave now. |
| Content Recommendation Service | Time Measurer, Application Usage Monitor | Measure certain time Recognize using of certain application | Uses music streaming service mainly at 20:00, and enjoys listening to classic music. | Since classic music is expected to be played at 20:00, select and recommend classic music that is recently getting attention. |
| Medical Management Service | Heart Rate Sensor, Blood Sugar Sensor, Blood Pressure Sensor, Time Measurer | Pulse is fast/slow. Blood pressure is high/low. Blood sugar is high/low. | Blood pressure maintains high state temporarily in the morning. | If blood pressure is high all day, transmit danger message to protector or hospital. |

The controller 220' may include a central processing unit (CPU) and a memory. Here, the memory may include a random access memory (RAM) and/or a read only memory (ROM). The RAM is a volatile memory, and may store a program such as the AAA 100a according to an exemplary embodiment. Also, the ROM is a nonvolatile memory and may store a program for initially driving the terminal 100. Accordingly, the CPU performs booting by using a program stored in the ROM during initial driving, executes a program for automatic cooperation, which is stored in the memory, after the booting, and performs a cooperation operation for distributed processing of data based on the service restriction level information provided according to the execution of the program. The controller 220' provides data provided based on the service restriction level information to the data analyzer 230'.

The data analyzer 230' analyzes data obtained through various sensors included in the user interface 210'. For example, movement information (direction information, The UI screen generator 240' is a part that generates a UI screen, and for example, may generate various UI screens for certain functions, such as a UI screen for determining whether to share hierarchical information. Here, the various UI screens include a UI screen for setting the service restriction level and the job distribution restriction, etc. Alternatively, the UI screen generator 240' may be configured to pre-store information about a generated screen, and when a certain event is generated, provide information about a corresponding UI screen.

Furthermore, the imaging unit may include an image pickup device such as a camera or a video recorder, and may use imaging data (for example, an image file or a video file) obtained by using the image pickup device in the data cooperation process service. Also, the voice recognizer includes a microphone, and voice data may also be used in the data cooperation process service. The voice output module includes a speaker, or the like.

Figure 3A:
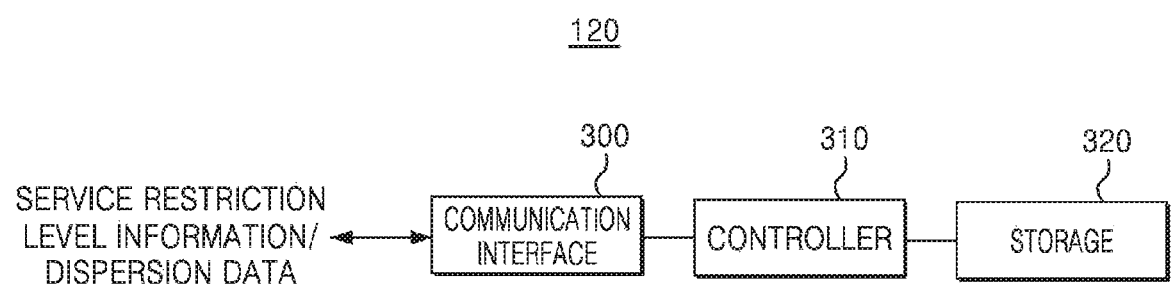
FIG. 3A is a block diagram showing an example of a detailed structure of a cloud apparatus of FIGS. 1A through 1C.

FIG. 3A is a block diagram showing an example of a detailed structure of a cloud apparatus of FIGS. 1A through 1E.

Referring to FIGS. 3A and 1A together for convenience of description, the cloud apparatus 120 according to an exemplary embodiment includes some or all of a communication interface 300, a controller 310, and a storage 320.

Here, 'includes some or all' means that a component such as the communication interface 300 may be integrated with another component such as the controller 310 to form a data processor, and for thorough understanding of the disclosure, it will be described that the cloud apparatus 120 includes all of the communication interface 300, the controller 310, and the storage 320.

The communication interface 300 performs communication with the terminal 100 so as to provide the data cooperation process service to the user. Accordingly, the communication interface 300 may receive the service restriction level information according to users, which is provided by the terminal 100, and transmit the service restriction level information to the controller 310 to be stored in the storage 320. Also, the communication interface 300 receives data provided by the terminal 100 based on the service restriction level information. Then, the communication interface 300 may perform an operation such as information conversion, or the like. Also, when certain hierarchical information is requested as an analysis result of the data received from the terminal 100, the communication interface 300 may transmit the certain hierarchical information.

The controller 310 may control overall operations of each component in the cloud apparatus 120 (for example, the communication interface 300 and the storage 320), and perform a data analyzing operation. For example, the controller 310 may store various types of information, such as the service restriction level information provided from the communication interface 300, in the storage 320. Also, when raw log data is provided from distributed data or the terminal 100, the controller 310 may perform an analyzing operation of data based on the stored service restriction level information. Here, log data may include data obtained through an online channel, such as a web or mobile channel. Accordingly, the controller 310 may store an analyzing engine, i.e., a program, in an internal memory (in detail, RAM) or in the storage 320, and execute the analyzing engine to generate hierarchical information about an arbitrary user according to data analysis. The generated hierarchical information may be then provided to the terminal 100 upon a request from the terminal 100.

The storage 320 may store various types of information used in a data analyzing process. Representatively, the storage 320 may store the service restriction level information provided by the controller 310, and output stored information under control of the controller 310. In addition, the storage 320 may store various types of information processed by the controller 310 and/or data processing results, and then output the information and/or data processing results upon a request.

Figure 3B:
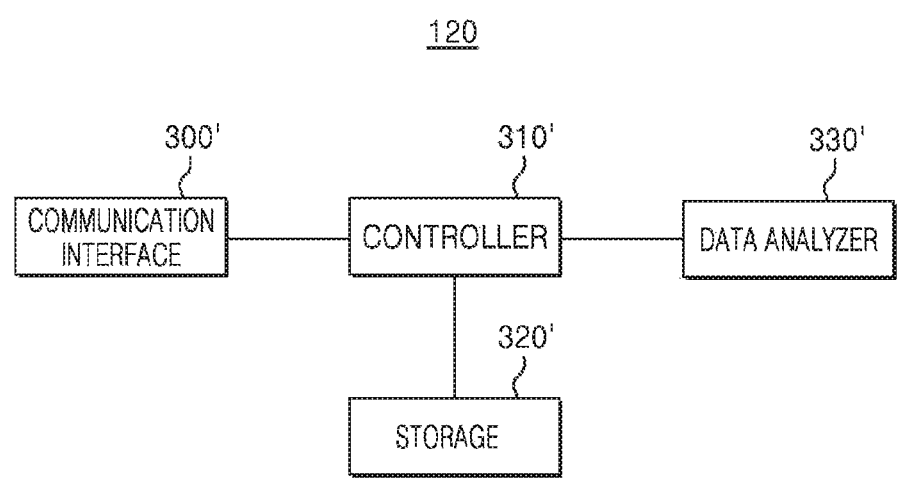
FIG. 3B is a block diagram showing another example of a detailed structure of the cloud apparatus of FIGS. 1A through 1C.

FIG. 3B is another exemplary diagram of a detailed structure of the cloud apparatus of FIGS. 1A through 1E.

Referring to FIGS. 3B and 1A together for convenience of description, the cloud apparatus 120 according to an exemplary embodiment may include some or all of a communication interface 300', a controller 310', a storage 320' and a data analyzer 330'. Here, including some or all has the same meaning as above.

Comparing the cloud apparatus 120 of FIG. 3B and the cloud apparatus 120 of FIG. 3A, the cloud apparatus 120 of FIG. 3B further includes the data analyzer 330' separated from the controller 310'.

The controller 310' may include a CPU and a volatile memory. In order to provide the personalized data cooperation process service, the CPU may invoke a program called the AAA 100a stored in the storage 320' to be stored in the volatile memory, and then execute the program. According to the execution of the program, the AAA 100a and an analyzing engine of the data analyzer 330' may interwork with each other. For example, the AAA 100a may analyze the service restriction level information provided by the communication interface 300', and provide data received from the communication interface 300' to each analyzing engine of the data analyzer 330' based on the analysis results.

The data analyzer 330' may include the analyzing engine for data analysis, and analyze provided data under control of the controller 310'. For example, even when raw log data is provided from the terminal 100, in some exemplary embodiments only data for deriving certain hierarchical information based on the service restriction level information set by the user in the terminal 100 may be analyzed. The analyzing engine is a process for performing activity detection, analyzing an activity pattern, and predicting future activities based on the activity pattern, and is schematized in FIG. 4. Each engine is hierarchized according to service restriction levels. An engine in a lower layer generates data used by an upper layer. For example, an activity recognizing engine generates activity detection results for a pattern recognizing engine to analyze repeated patterns.

In addition, since the communication interface 300', the controller 310', and the storage 320' of FIG. 3B are similar to the communication interface 300, the controller 310, and the storage 320 of FIG. 3A, details thereof are not provided again.

Figure 4:
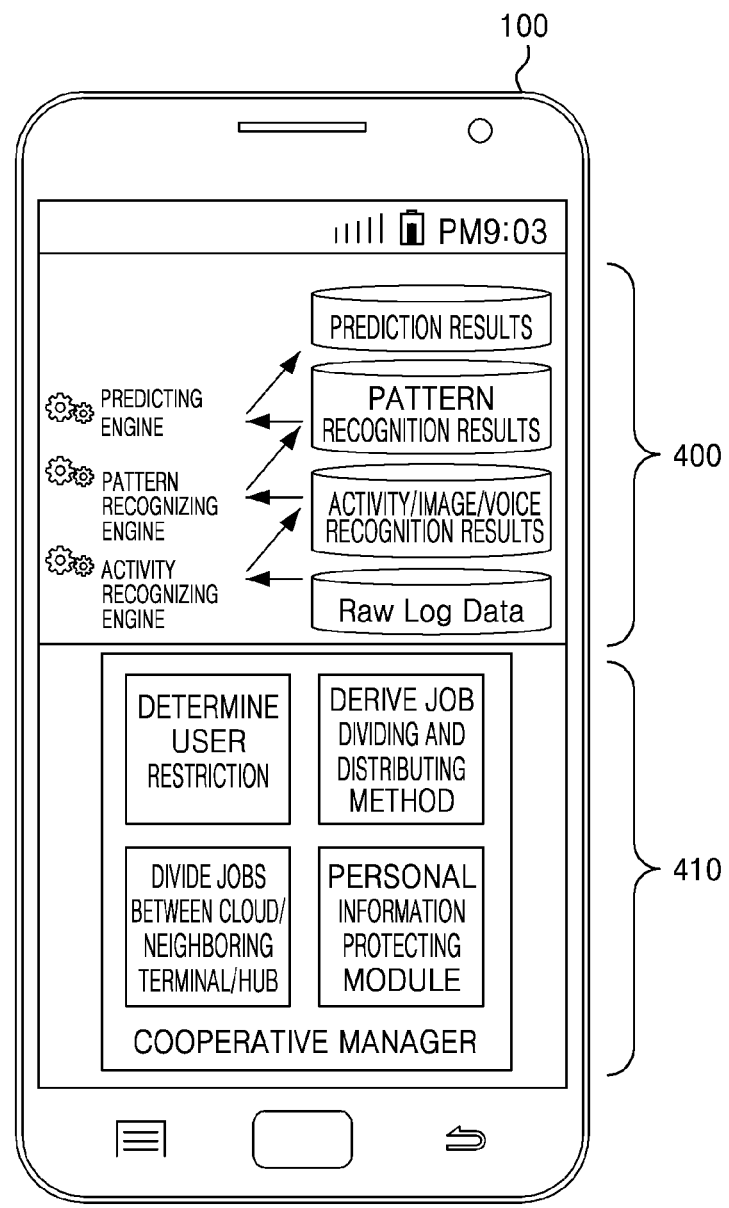
FIG. 4 is a diagram schematizing detailed functions of a controller of FIG. 2A or 2B, and a data analyzer.

FIG. 4 is a diagram schematizing detailed functions of the controller of FIG. 2A or 2B, and the data analyzer.

Referring to FIG. 4 and FIG. 2A together for convenience of description, the controller 210 according to an exemplary embodiment includes an analyzing module 400 and a memory 410, and may further include a CPU.

Here, the analyzing module 400 may be configured in a form of a chip as a part for processing some of data for the data cooperation process service. For example, the analyzing module 400 may be implemented as a CPU in combination with a ROM for storing and executing an analyzing engine, i.e., a program, such as a mask ROM, erasable and programmable ROM (EPROM), or electrically erasable and programmable ROM (EEPROM). Here, the analyzing engine may include an activity recognizing engine for activity recognition, a pattern recognizing engine for analyzing an activity pattern, and a predicting engine for deriving a prediction result regarding an activity pattern. ROM may be a type of a memory in which a program may be written and erased. The analyzing module 400 is capable of an on/offline operation, and may analyze interests of the user, analyze an activity pattern, and perform a prediction operation. In other words, data may be analyzed based on the service restriction level information set by the user to derive hierarchical information of a certain region regarding the user. Here, since the user of the terminal 100 may sandbox analysis tasks, detailed personal information may be protected from the analysis tasks through data hiding.

The memory 410 may be, for example, a volatile memory. The memory 410 may store a program related to the AAA 100a, and store data to be analyzed. Alternatively, the memory 410 may store hierarchical information according to data analysis. Furthermore, the memory 410 may store various types of information related to a state of using resources, etc., wherein such information may be shared with the cloud apparatus 120. Also, the memory 410 may store information for dynamically distributing workloads based on workload distribution determining and distribution schedule policies, and may store information for adjusting the workload distribution determining and distribution schedule policies.

Also, the cooperative manager 100a in the memory 410 may be executed under, for example, control of a CPU. For example, the cooperative manager 100a may be executed while the terminal 100 operates in order to analyze interests, the activity pattern, etc. of the user. Accordingly, the cooperative manager 100a determines restrictions of the user, derives a job dividing and distributing method, and analyzes job division performed together with the neighboring terminal 100-2' and the cloud apparatus 120' of FIG. 1B, thereby interworking with the analyzing module 400 according to results of analyzing the job division.

Figure 5:
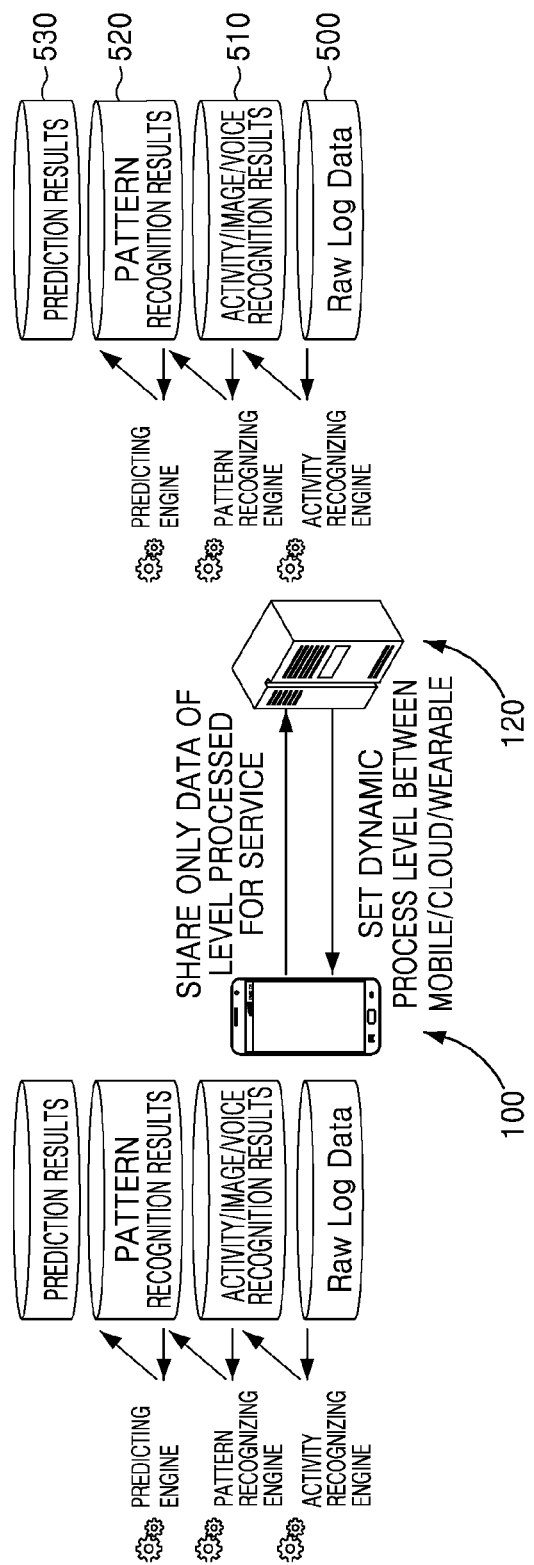
FIG. 5 is a diagram for roughly describing processes of providing a personalized service, according to an exemplary embodiment.

FIG. 5 is a diagram for roughly describing processes of providing a personalized service, according to an exemplary embodiment.

As shown in FIG. 5, the terminal 100 and the cloud apparatus 120 according to an exemplary embodiment include analyzing engines, i.e., programs, for data analysis. Here, the programs may be independently executed.

According to an exemplary embodiment, as the analyzing engines, an engine 500 for processing raw log data, an activity/image/voice recognizing engine 510 for recognizing user actions, a pattern recognizing engine 520 for analyzing a user pattern, and a predicting engine 530 for predicting user activities and setting a service response level may be included.

When the service restriction level is set in the terminal 100, the terminal 100 may share only data in a level processed based on the set service restriction level with the cloud apparatus 120 for a service. In other words, it may be considered that the terminal 100 provides only data enabling the cloud apparatus 120 to analyze data by using a certain engine.

Also, even in the cloud apparatus 120, when an internal load increases, the cloud apparatus 120 may set a dynamic process level with respect to the terminal 100. Here, the dynamic process level means that data processed in cooperation with the terminal 100 may be frequently changed according to a network status of the cloud apparatus 120.

Figure 6:
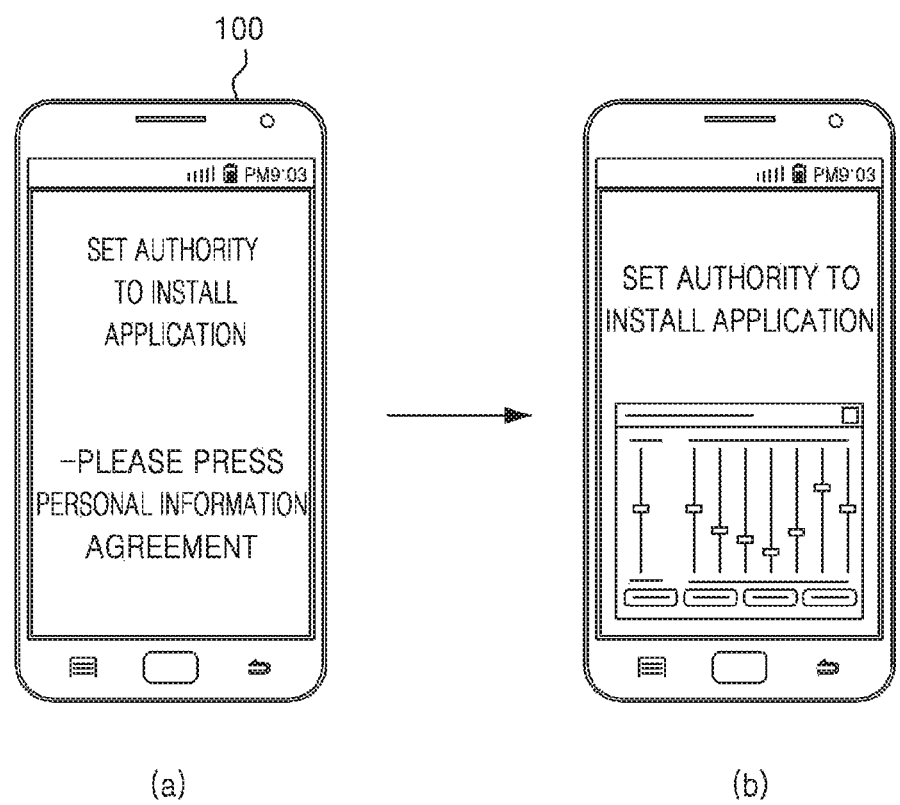
FIG. 6 is a diagram for describing processes of installing, by a terminal, an application for providing a personalized service, according to an exemplary embodiment.

FIG. 6 is a diagram for describing processes of installing, by a terminal, an application for providing a personalized service, according to an exemplary embodiment.

As shown in FIG. 6, the terminal 100 according to an exemplary embodiment may be required to install an application in order to use a service restriction level of the data cooperation process service, i.e., a personalized service. Accordingly, as shown in (a) of FIG. 6, a screen for setting authority and agreeing to acquire personal information may be displayed on a screen of the terminal 100. If the user does not agree, it is not possible to use the service.

However, when the user agrees in (a), a screen (b) of FIG. 6 may be displayed on the terminal 100. Accordingly, authority for installing the application may be set.

FIGS. 7A through 7K are diagrams illustrating information for setting various types of information for assigning a service restriction level according to exemplary embodiments.

Figure 7A:
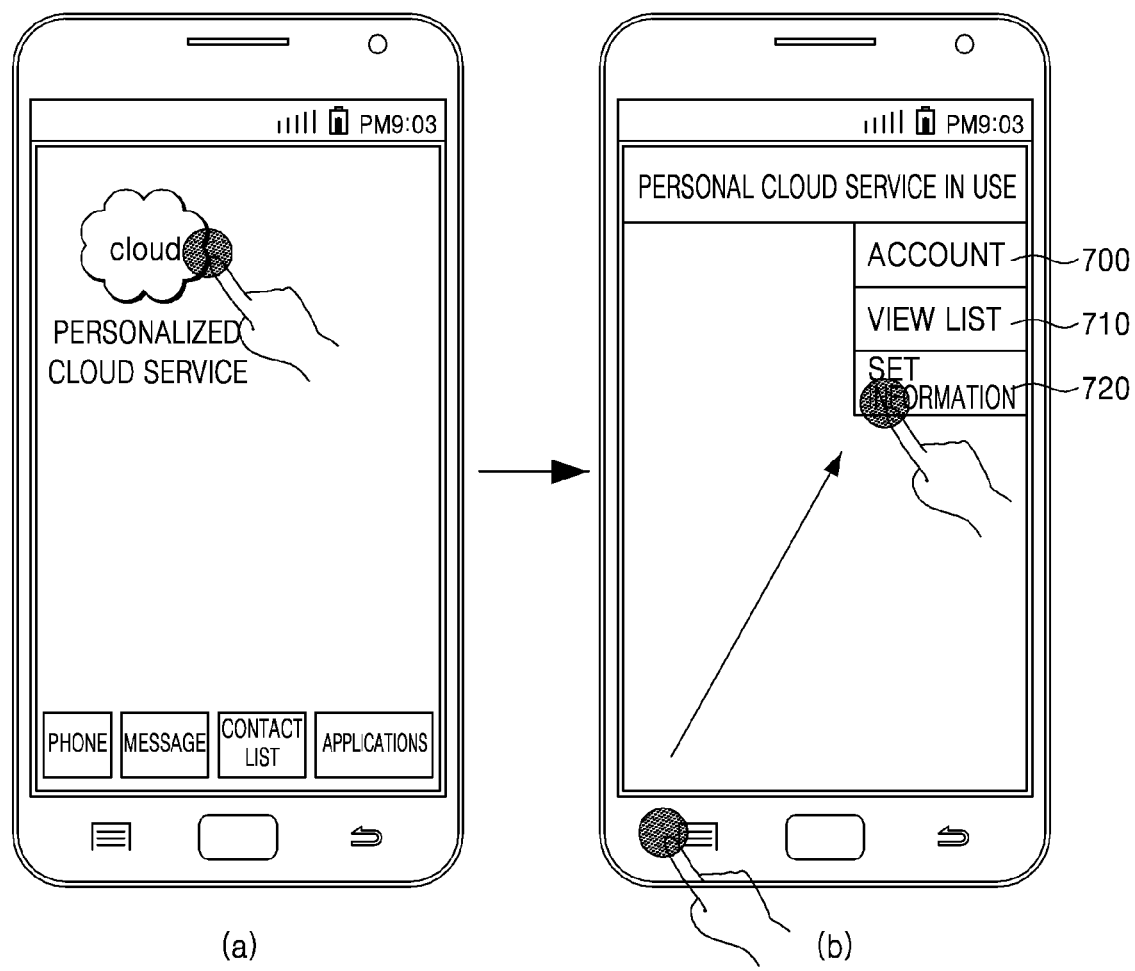
FIGS. 7A through 7K are diagrams illustrating information for setting a service restriction level according to exemplary embodiments.
Figure 7B:
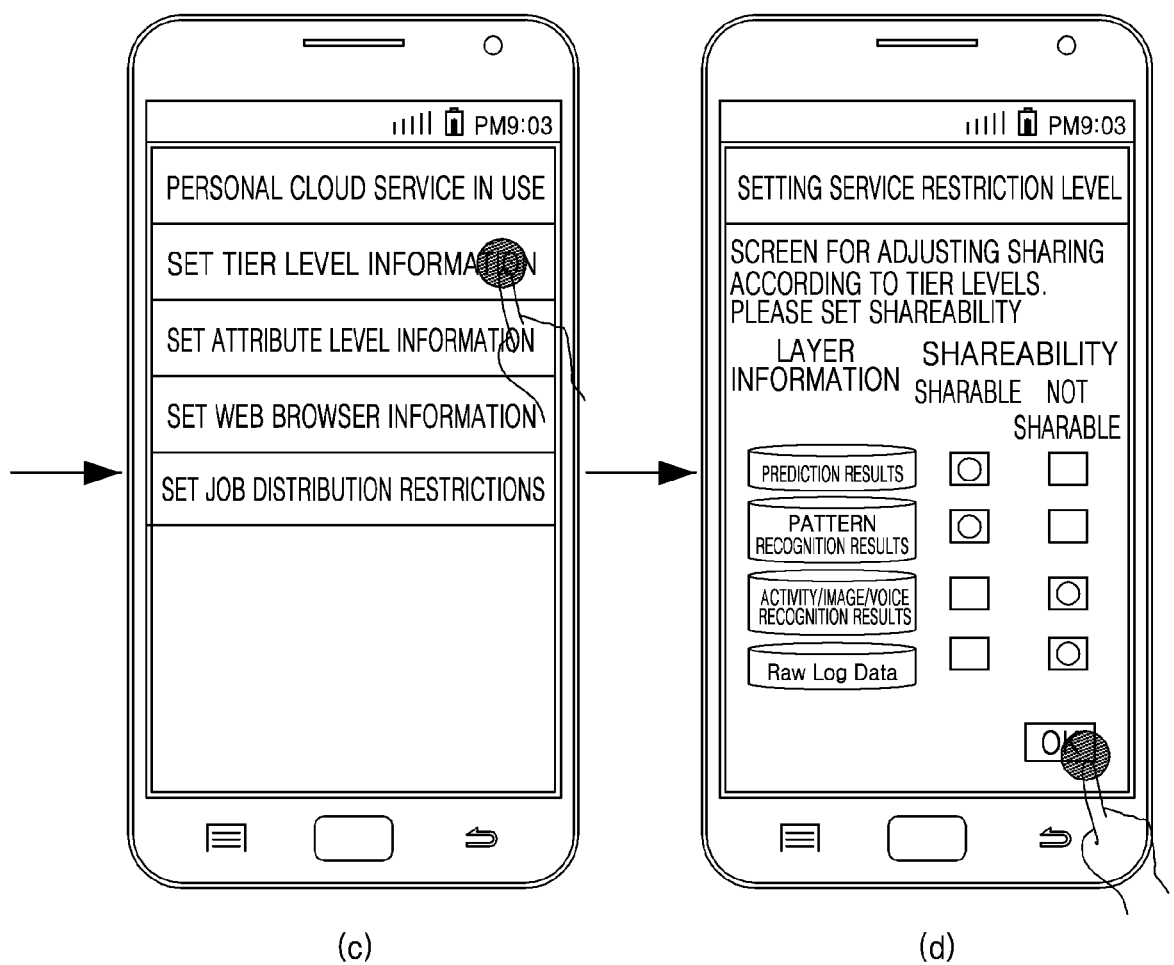
Figure 7C:
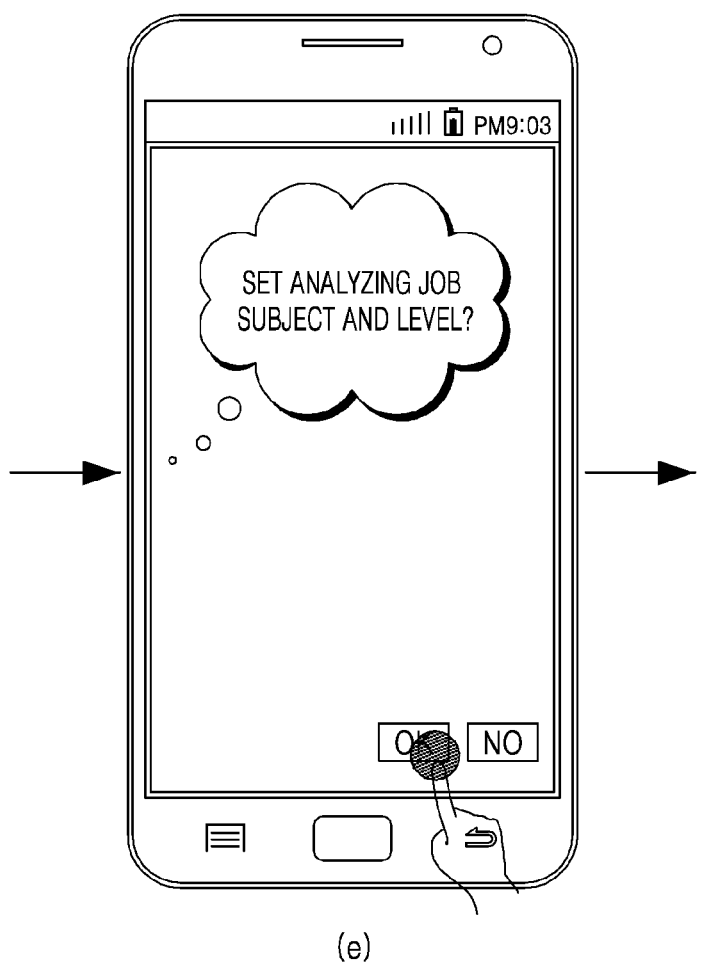
Figure 7D:
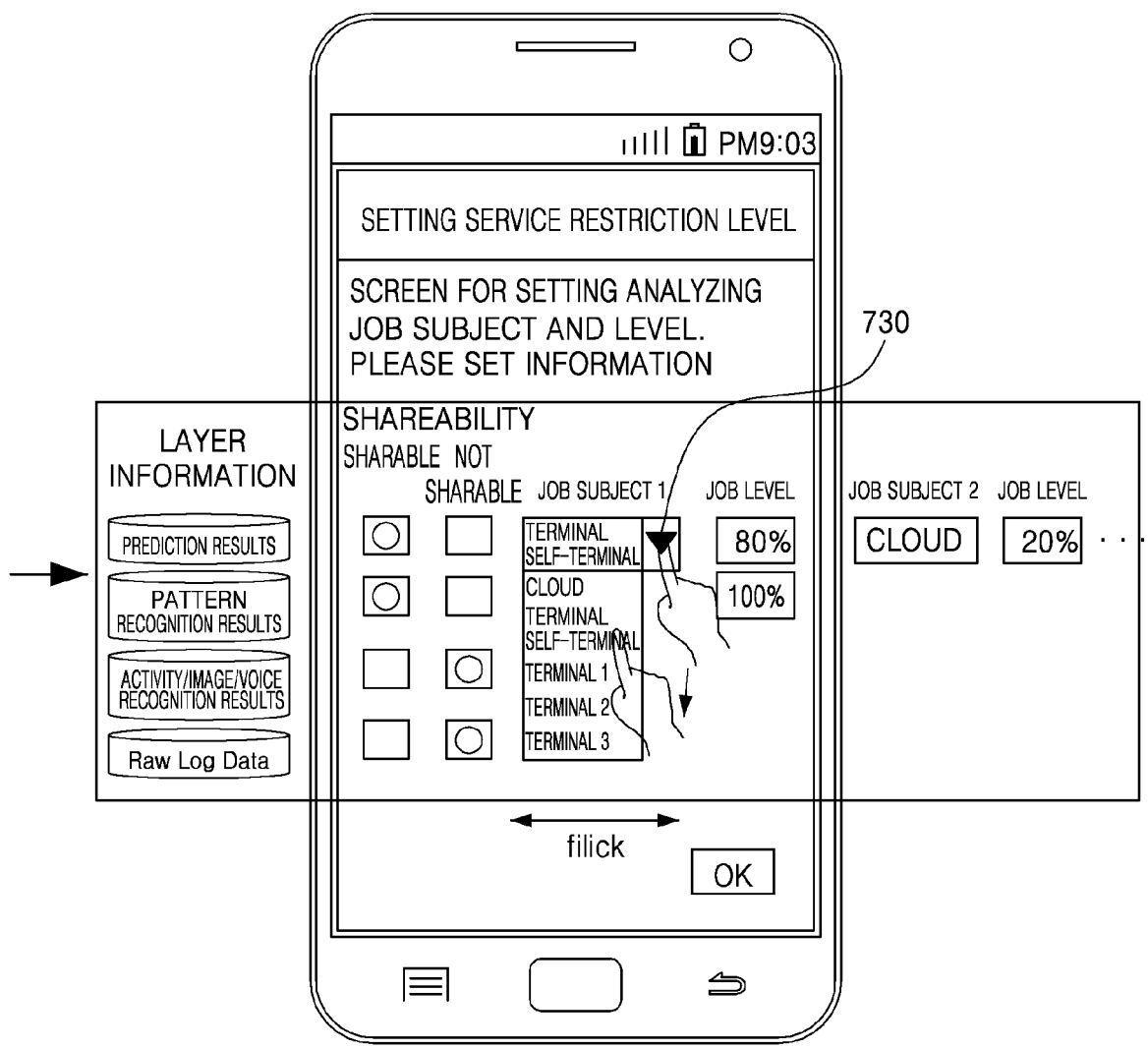
Figure 7E:
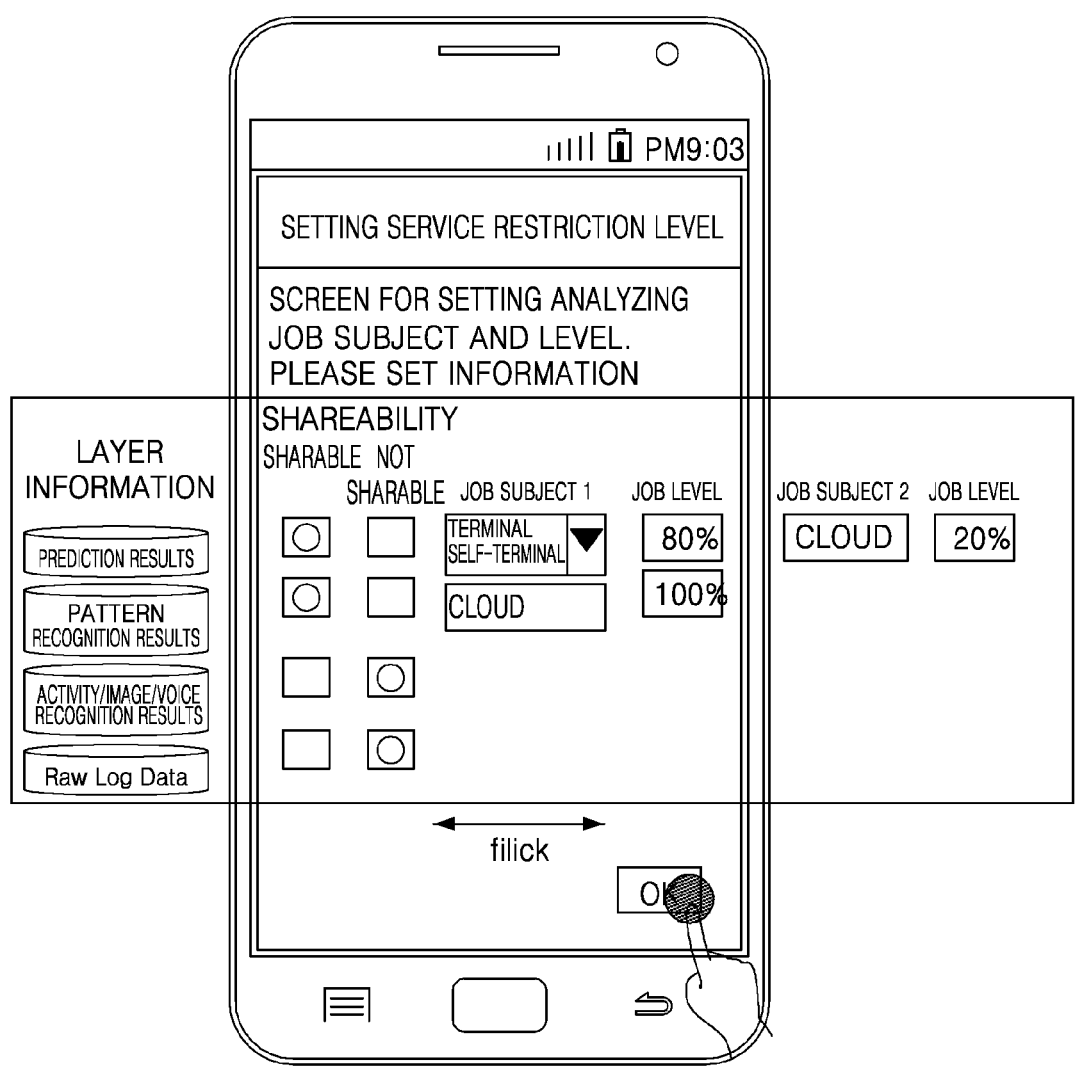
Figure 7F:
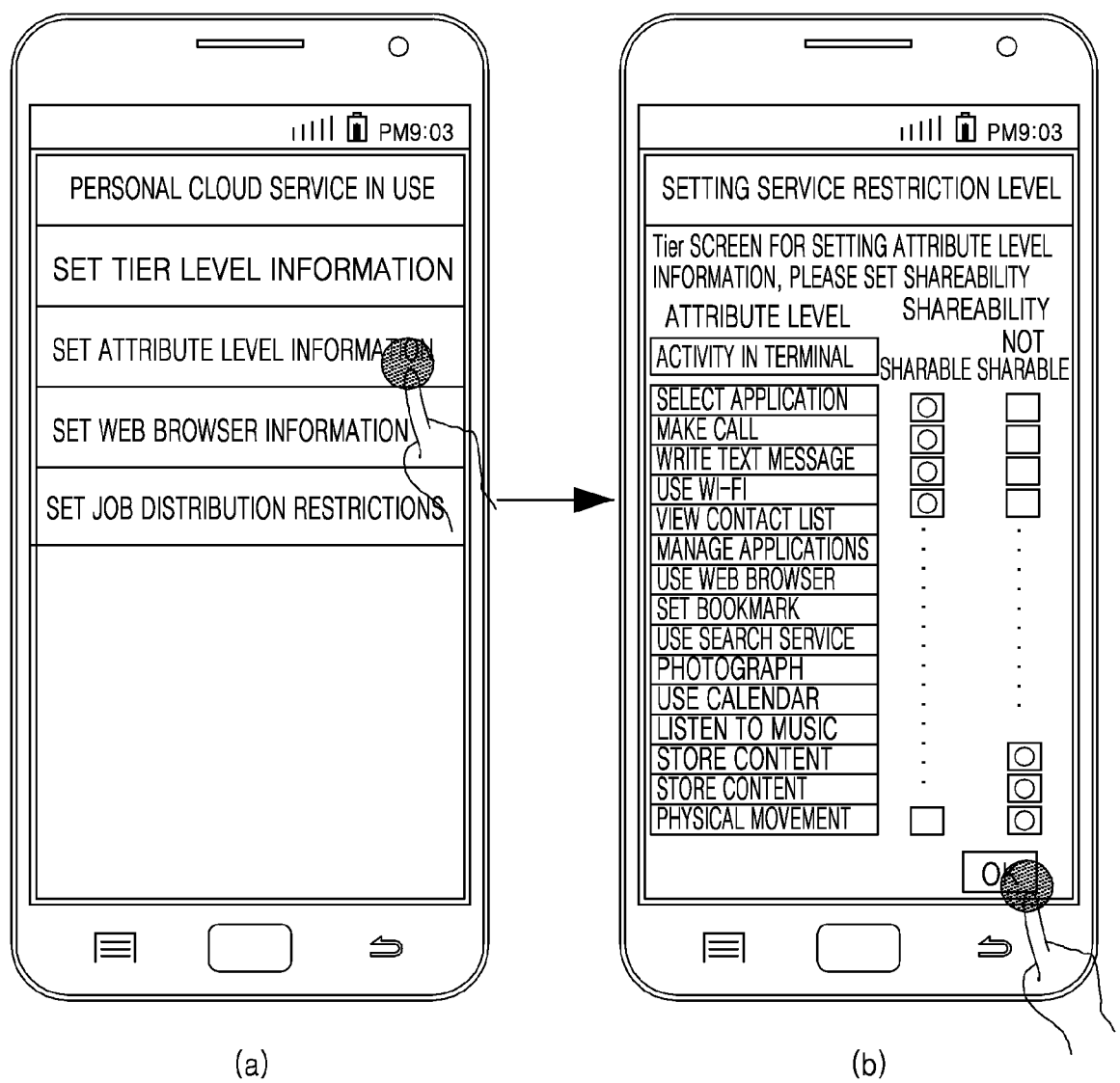
Figure 7G:
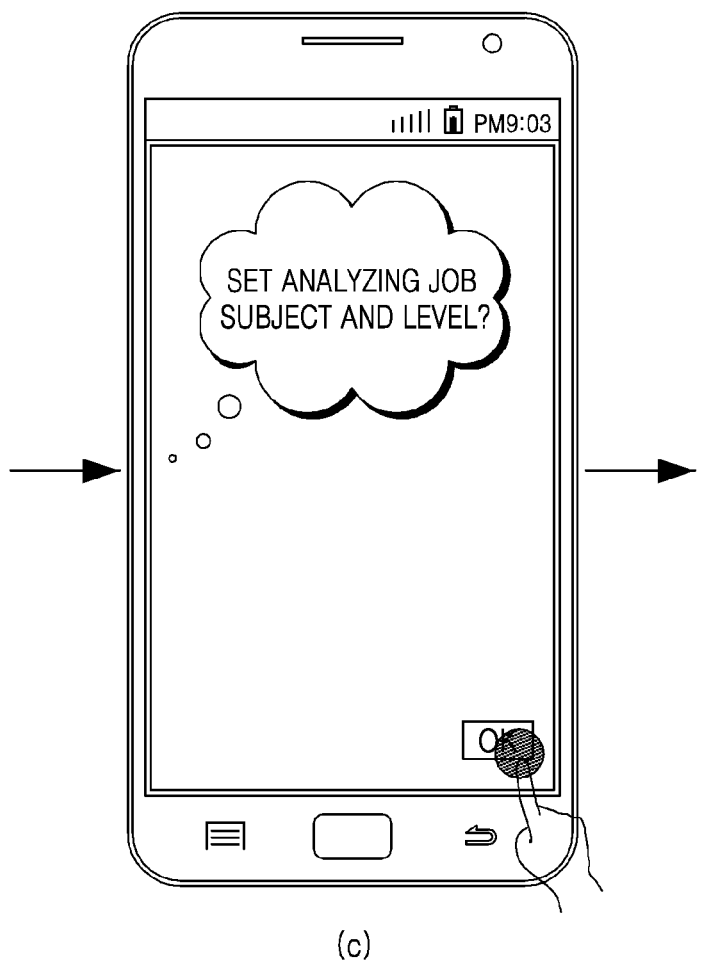
Figure 7H:
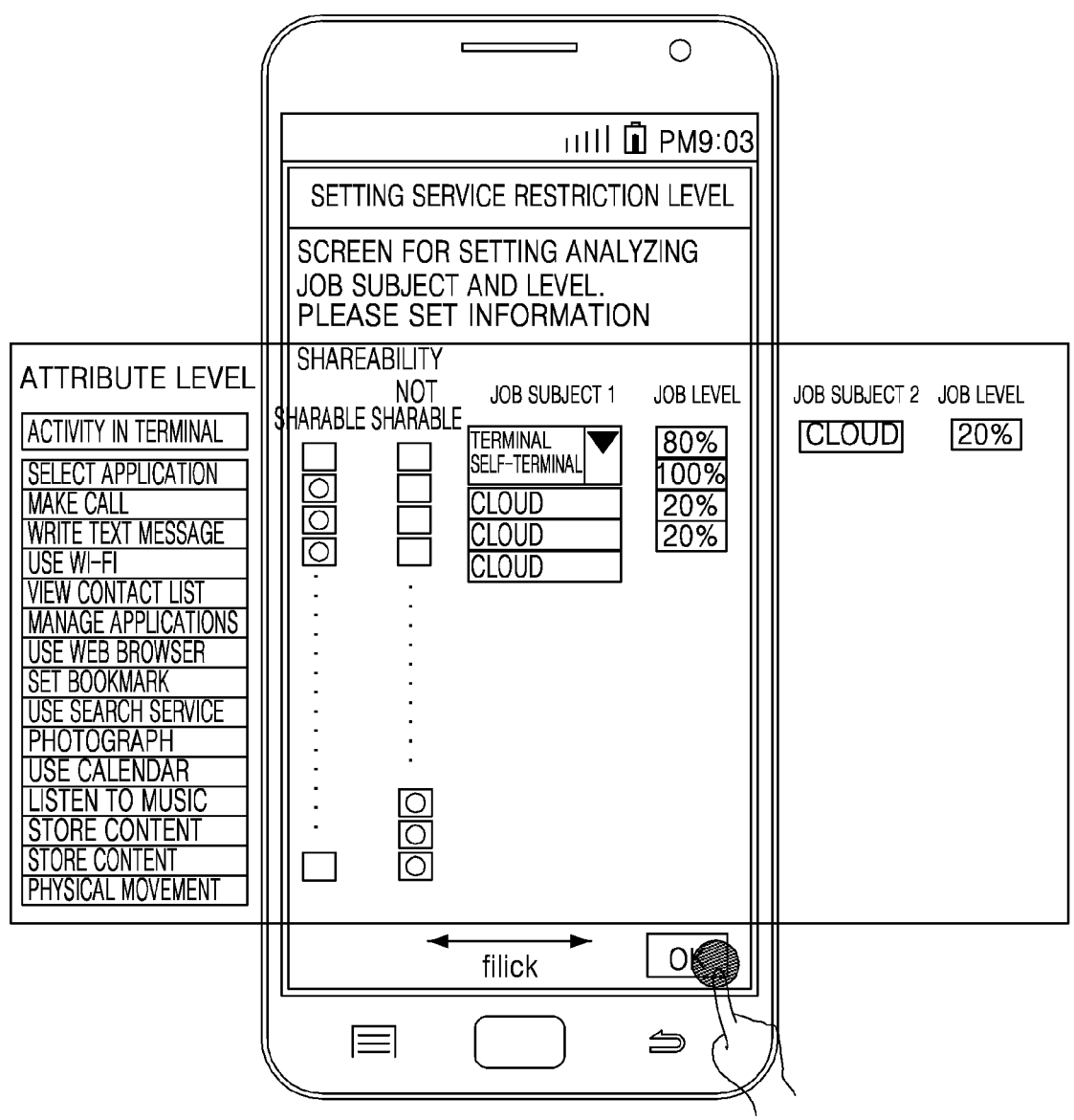
Figure 7I:
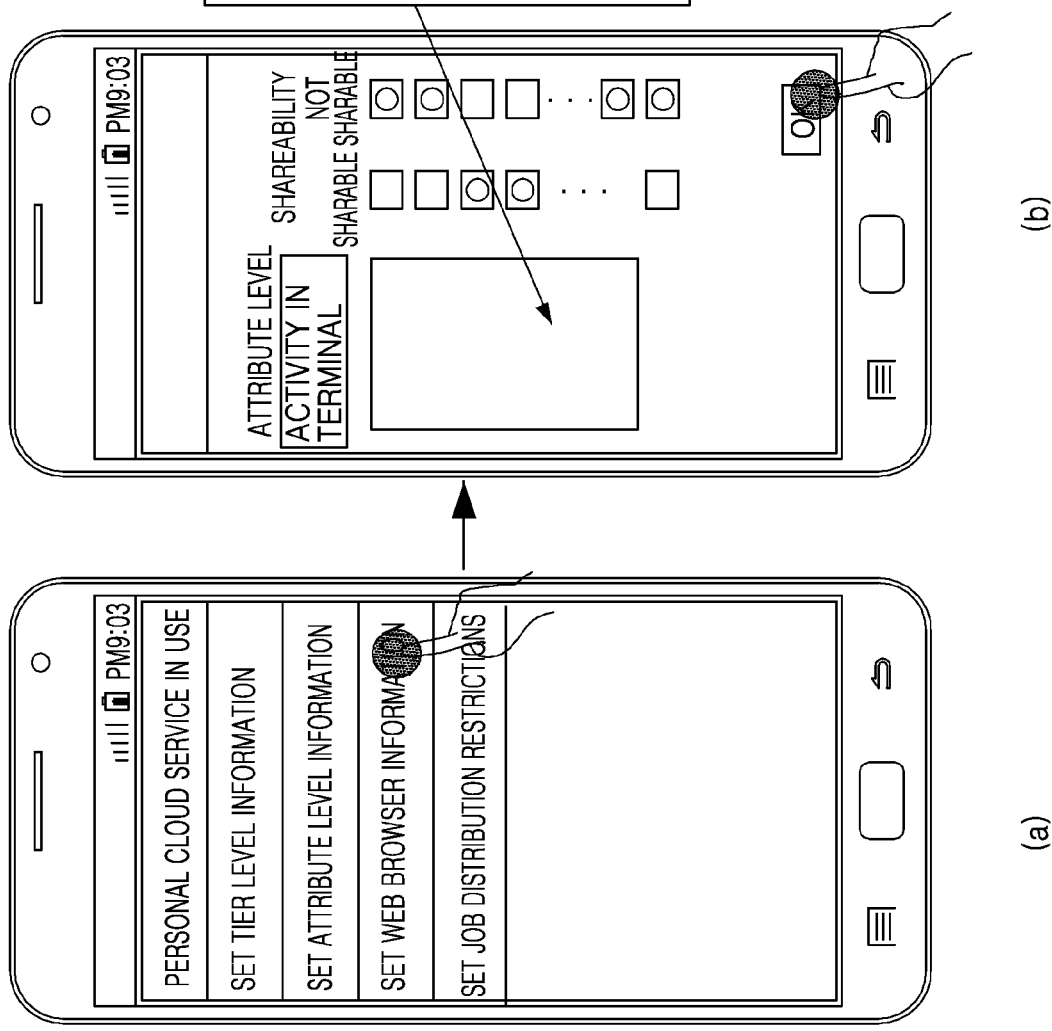
Figure 7J:
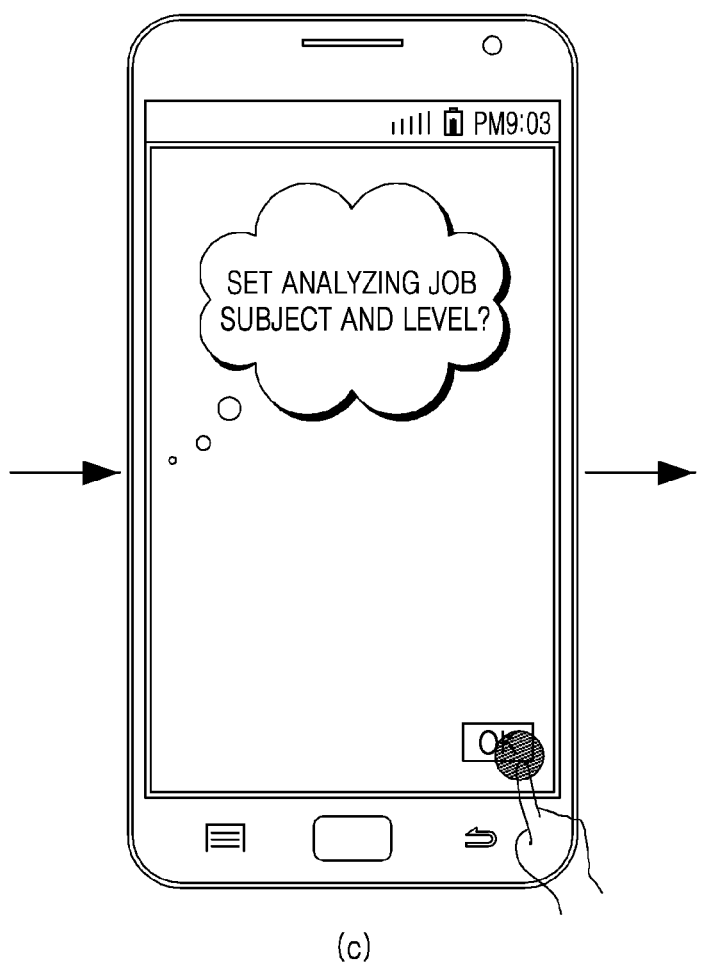
Figure 7K:
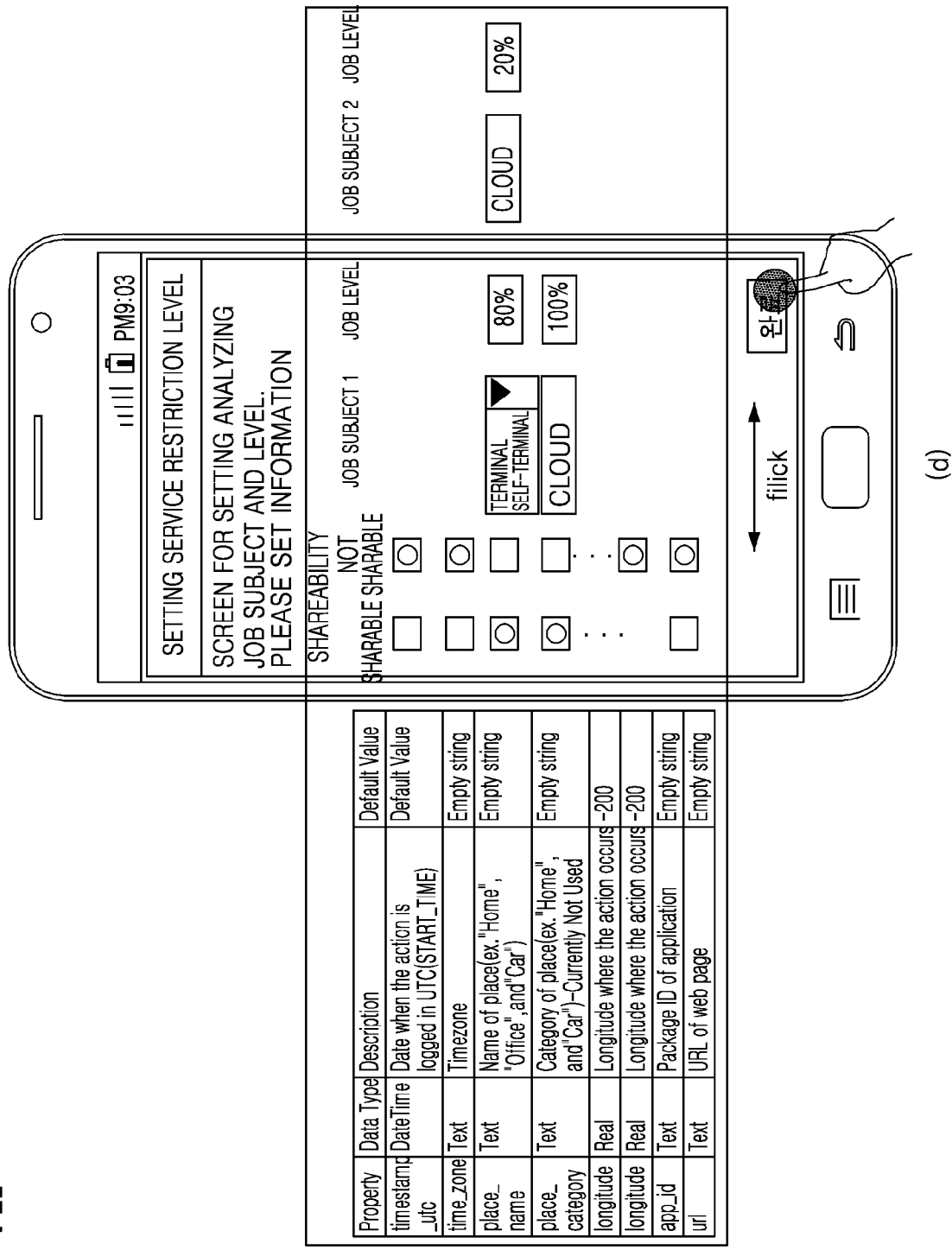

In detail, FIGS. 7A through 7E are diagrams showing processes of setting tier level information, a job subject, and a job level, FIGS. 7F through 7H are diagrams showing processes of setting attribute level information, a job subject, and a job level, and FIGS. 7I through 7K are diagrams showing processes of setting web browser information, a job subject, and a job level.

Referring to FIGS. 7A through 7E together with FIGS. 1A and 1B, the terminal 100 according to an exemplary embodiment may display a UI for setting information for analyzing and setting hierarchical privacy data. Accordingly, the terminal 100 may provide UI screens for setting various types of information as shown in FIGS. 7A through 7E.

Referring to FIGS. 7A through 7E together with FIG. 1B for convenience of description, the user of the terminal 100-1' selects an icon displayed on a wallpaper as shown in screen (a) of FIG. 7A, in order to use the personalized data cooperation service. Then, the terminal 100-1' may display a screen (b) for providing a service as shown in FIG. 7A. For example, a phrase such as "personal cloud service in use" may be displayed at the top of the screen such that the user recognizes that the service is in use. When the user, for example, selects a menu button at the bottom of the terminal 100-1' from a service screen, a popup window for setting information is displayed at the top of the screen. The popup window may generally display an account item 700 for an account, into which user information is input, or the like, a view list item 710 showing a list of apparatuses assigned by the user to use a service, and an information setting item 720 for assigning a service restriction level. Here, the view list item 710 may display, for example, which apparatus is assigned by the user as a data processing subject so as to use the present service.

In the screen (b) of FIG. 7A, when the user of the terminal 100-1' selects the information setting item 720, the terminal 100-1' may display a setting information list for setting detailed information as shown in screen (c) of FIG. 7B. According to an exemplary embodiment, the setting information list may briefly include items, etc. for setting tier level information, attribute level information, web browser information, and job distribution restrictions.

In a screen (c) of FIG. 7B, when the user of the terminal 100-1' selects an item for setting the tier level information, a screen (d) of FIG. 7B may be displayed. In the screen (d) of FIG. 7B, a phrase indicating that a service restriction level is being set may be displayed, together with a phrase indicating in detail which information is being set. The user may select which layer information is to be shared with an external apparatus and not to be shared with the external apparatus. The external apparatus may be the neighboring terminal 100-2' or the cloud apparatus 120' of FIG. 1B. Here, sharing means that the terminal 100-1' cooperates with the neighboring terminal 100-2' and the cloud apparatus 120' to process data so as to obtain layer information. Here, cooperation may be performed with respect to one piece of layer information as well. On the other hand, not sharing means that related data is processed only by the terminal 100-1' so as to obtain relevant layer information.

For example, the terminal 100-1' may determine sharing according to tiers, with respect to four tiers as shown in screen (d) of FIG. 7B. A first tier (tier 0) is related to unprocessed information itself that is collected by the terminal 100-1', and is a layer processing data about on/off of a physical sensor, usage information of an application, etc. A second tier (tier 1) is related to action analysis generated in the terminal 100-1' based on information of the first tier, and for example, is a layer processing data about walking, commutes, eating, etc. A third tier (tier 2) is related to pattern analysis of a user based on information of the second tier, and for example, is a layer processing data related to a pattern of eating, exercising, and sleeping. A fourth tier (tier 3) is related to predicting actions of the user, and for example, is a layer used to predict actions, such as leaving the office after two hours and jogging after three hours.

In a screen (d) of FIG. 7B, the user may end setting processes of the tier level information by selecting an OK button. For example, in FIG. 1B, when only the terminal 100 and the cloud apparatus 120 are assigned for a service, the terminal 100 may automatically perform distributed processing on data by cooperating with the cloud apparatus 120 after it is determined whether layer information is to be shared or not. However, the user may determine a job subject in detail, and set up to an analyzing level by considering that analysis resources of the cloud apparatus 120 have high performance. Accordingly, when whether to share the layer information is selected, the terminal 100-1' of FIG. 1B may additionally ask the user whether to set the analyzing subject and the analyzing level as shown in screen (e) of FIG. 7C.

In a screen (e) of FIG. 7C, when the user selects an OK button, a screen (f) of FIG. 7D may be shown, and the user may set in detail a job subject and a job level via left and right flicking operations or check which setting is pre-performed. For example, regarding layer information that is assigned to be not sharable, an analyzing job is performed only in a self-terminal (a terminal itself), i.e., the terminal 100-1' of FIG. 1B, and thus a separate setting job is not used. However, regarding layer information that is allowed to be shared, an apparatus for obtaining the corresponding layer information may be assigned from among a plurality of apparatuses and a percentage of a job level may be assigned.

For example, while setting a job subject, when job subjects are only the terminal 100 and the cloud apparatus 120 as shown in FIG. 1A, two job subject setting items for setting a job subject may be generated and displayed on the screen (g) as shown in FIG. 7E. Meanwhile, when the user assigned five apparatuses, for example, a self-terminal, a cloud, and terminals 1 through 3, as job subjects, five job subject setting items for setting a job subject may be displayed although not illustrated in detail. Here, the number of job subject setting items being displayed may vary according to a set job level. In other words, when an item of job subject 1 set a job level of a self-terminal to 80% and an item of job subject 2 set a job level of a cloud to 20%, the job level is 100%, and thus even when there are five settable apparatuses, a job subject setting item is no longer displayed. Also, as shown in a screen (f) of FIG. 7D, the user may select an indication button 730 to assign a job subject, and may set a certain apparatus, for example, a self-terminal, from a protruding window that protrudes downward according to the selection. The user may set a job subject via such processes, and perform separate input processes of inputting a value for a job level. Setting of units of jobs and a performing schedule of jobs are performed according to current states of resources of a given performing apparatus.

As shown in the screen (g) of FIG. 7E, when the user completed processes of setting a job subject with respect to recognition results and prediction results regarding an activity pattern selected to be sharable from among a plurality of pieces of layer information, and setting a job level, the user may check information finally input via a clicking operation. Then, when an OK button is selected, setting of the tier level information, the job subject, and the job level is completed. Also, the terminal 100-1' of FIG. 1B may again display a screen (c) of FIG. 7B.

Also, the terminal 100-1' of FIG. 1B may provide, to the user, a UI for determining a level, but not for entire personal information, and may provide a UI for setting by hierarchizing each tier information to an attribute level as shown in FIGS. 7F through 7K.

Briefly describing, in a screen (a) of FIG. 7F, the user selects a setting item for setting attribute level information. Then, a screen (b) of FIG. 7F is displayed, and the user may select a shareability in an attribute level through the screen (b). Then, when an OK button is selected, a screen for inquiring of the user whether to set an analyzing subject and level may be displayed in screen (c) as shown in FIG. 7G. If the user wishes to set the analyzing subject and the level in a screen (c) of FIG. 7G, the terminal 100-1' may display a screen (d) of FIG. 7H, and receive an input of the job subject from the user. The job level is estimated according to an available resource level of a performing apparatus.

When the user selects an OK button at the bottom of the screen after completing input processes, setting of the attribute level information is completed. Then, the terminal 100-1' may again display the screen (c) of FIG. 7B.

In detail, referring to FIG. 7F, the attribute level information according to an exemplary embodiment is variously hierarchized into an attribute level that is a terminal or activities of the terminal, and application selection, photographing, music listening, etc., as activities in the terminal. In other words, the user may determine whether to share, over a simple activity level of the user, even various user activities, such as using a web browser and photographing, using the terminal 100-1'. In other words, in the screen (d) of FIG. 7B, if the user wishes to share, for example, the activity recognition results, but in the screen (b) of FIG. 7F (b), the user wishes not to share data about a physical movement (i.e., a GPS route), the activity recognition results excluding the GPS route may be shared. For example, let's assume that a Wi-Fi module and a GPS module for recognizing activities of the user are included in the terminal 100-1'. Accordingly, when the user does not share the data about the GPS route, only data regarding the Wi-Fi module is shared.

For example, when the user shares data using only the Wi-Fi module, activity data of the user may be limited to a very restricted space, such as home or an office. However, when data using a GPS module is shared, the user's every move may be shared, and thus privacy of the user may be invaded. For example, if the user visited an urologist or a famous department store selling so-called luxury goods, information the user wants to hide may be exposed.

Also, when the user stores very private photograph or video in the terminal 100-1' and information about storage is shared with an external apparatus, corresponding content may be hacked and exposed, and thus privacy may not be protected. Accordingly, sharing of information related to storing of content in the activities in the terminal may be limited.

Moreover, when the uses a website and opened xxx.com, information about 'Internet use' may be shared, and information about which content is searched for in detail may not be shared. This may be useful in terms of protecting privacy of the user.

Since FIGS. 7I through 7K are not largely different from FIGS. 7A through 7H, the same content thereof are not provided again. However, in screen (b) of FIG. 7I, web browser information shows detailed information related to a current location, and the user may determine whether to share such detailed information and in addition, determine a job subject and a job level. The detailed information includes information about a place name related to the current location, a time slot, and latitude and longitude.

Meanwhile, layer information related to web browsing will be described in detail with reference to FIG. 7I. For example, the user may not wish to share certain web browsing information with the cloud apparatus 120 outside on a screen (b) of FIG. 7I. For example, the user may set a sharing rule such that a web browsing record at a certain area is not shared. First, let's assume that all of the web browsing record is set to be shared, and the user moved from the city of Seoul to the city of Suwon. In this case, the terminal 100-1' may collect various types of data generated according to movement of the user. For example, data about to which area the user moved, when the user moved, and where the user searched the Web is collected. Accordingly, such data is raw data corresponding to a first layer. By using the raw data, the terminal 100-1' may recognize activities of the user. In other words, activities of the user that the user moved an area at a certain time and searched the Web at a certain place are recognized. Such activities are activity recognition data of a second layer. Also, if the user was in Seoul in the morning and moved to Suwon in the afternoon through the activity recognition data, such activity pattern data may be obtained in a third tier. Moreover, when an activity pattern is analyzed that the user is generally in Suwon in the afternoon, it may be predicted that the user may move to Suwon even if, for example, the user was in an area other than Seoul in the morning.

However, when the user sets an analyzing subject of activity pattern analysis and prediction operations to the cloud apparatus 120', and sets the terminal 100-1' not to share a web browsing record in Suwon with the cloud apparatus 120', activity pattern data related to Suwon may not be transmitted to the cloud apparatus 120'. In other words, the activity pattern data is transmitted after the data related to Suwon is deleted from the activity pattern data. Accordingly, the cloud apparatus 120' is unable to obtain activity pattern and prediction information about the user generally moving to Suwon in the afternoon to conduct business as above. As such, it may be considered that the cloud apparatus 120' generates data completely different from above by limiting activity pattern and prediction to Seoul.

Meanwhile, jogging is similar to the web browsing. For example, let's assume that a route of jogging is along a coast road from home. Accordingly, raw data includes data related to a route collected by a sensor, and data related to music listened to by the user during jogging, etc. Also, as a second tier, i.e., as activity recognition results, activities that the user left home, jogged along the coast road, and listened to music may be included. Then, as pattern recognition results corresponding to a third tier, data that the user listens to music before leaving home and jogs along the coast road after leaving home is obtained. Then, as a fourth tier, since the user generally returns home at 8:00 am, it may be predicted that the user may return home after 30 minutes, 30 minutes before the arrival.

Accordingly, in this case, when the user sets not to share data related to listening to music with the cloud apparatus 120' of FIG. 1B, the cloud apparatus 120' may use only data that the user jogs along the coast road from home. Accordingly, the pattern recognition results corresponding to the third tier is data from which data related to music is deleted.

Figure 8:
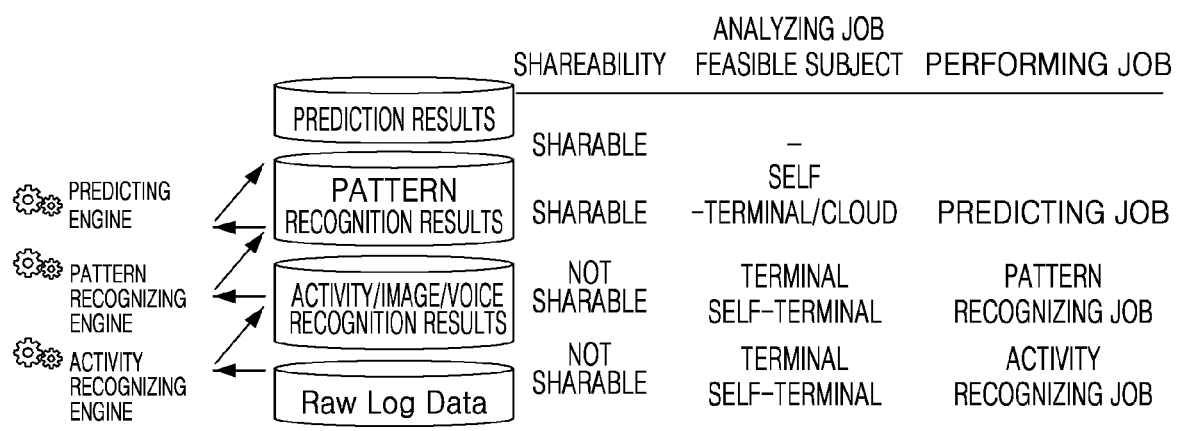
FIG. 8 is a diagram for describing processes of notifying a job performing subject for extracting data, according to an exemplary embodiment.

FIG. 8 is a diagram for describing processes of notifying a job performing subject for extracting data, according to an exemplary embodiment.

Referring to FIG. 8 and FIG. 1A together for convenience of description, the terminal 100 according to an exemplary embodiment may notify at least one of other apparatuses a subject of performing a job for extracting data belonging to an upper tier based on a sharing level set by the user in a lower tier, and thus enable the other apparatus to determine the subject. Here, the data of the upper tier is extracted based on data of the lower tier. Accordingly, as shown in the example of FIG. 8, a raw log data is used for action recognition in FIG. 8, but if the terminal 100 does not share the raw log data with the cloud apparatus 120, a subject of the action recognition has to be the terminal 100, and such information may be notified to the user.

When pattern analysis data is shared with the cloud apparatus 120, a prediction analyzing job may also be performed in the cloud apparatus 120, and such information may be notified to the user.

For example, in the screen (d) of FIG. 7B, when the user selects not sharable with respect to the raw log data, the terminal 100 may display, on the screen, a phrase such as "since raw log data is selected to be not shared, subject of action recognition is possible only in this terminal" to the user in a form of a pop-up window, thereby helping the user to select the self-terminal as the object of the action recognition. That is, if the user selects not to share raw log data, then other terminals (e.g. a neighboring terminal or a cloud apparatus) will not have the raw log data to operate on. As such, only the terminal itself, i.e. the terminal that has access to the raw log data, may perform higher tier activities.

Also, since the user selected "sharable" regarding pattern recognition from among the plurality of pieces of layer information, the terminal 100 may display, on the screen, a phrase such as "since pattern recognition is selected to be shared, analyzing subject of prediction is possible also in cloud apparatus" to the user in a form of a popup window, thereby helping the user with selection.

Figure 9:
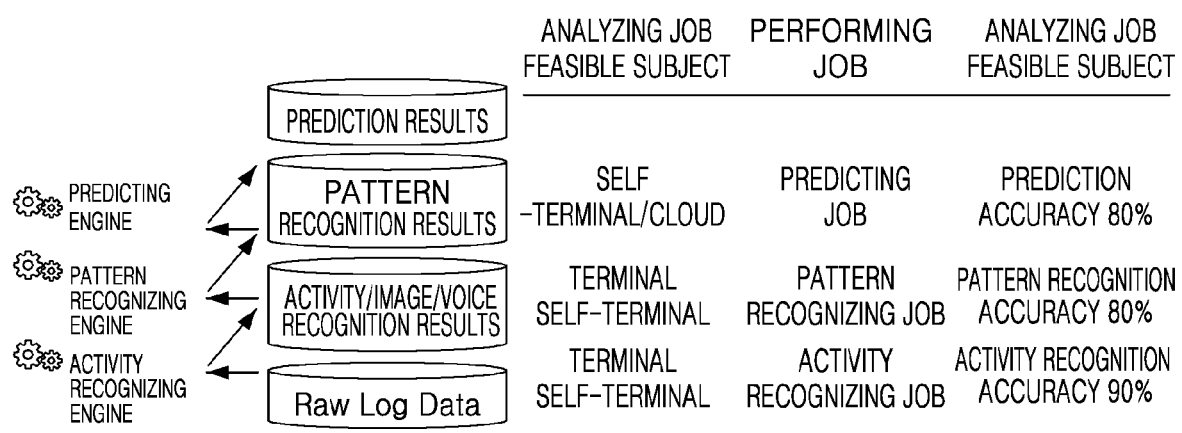
FIG. 9 is a diagram for describing processes of determining an analysis job level based on whether data is shared, according to an exemplary embodiment.

FIG. 9 is a diagram for describing processes of determining an analyzing job level based on whether data is shared, according to an exemplary embodiment.

Referring to FIG. 9 and FIG. 1A together for convenience of description, when the user allows certain data to be shared, the terminal 100 according to an exemplary embodiment may set an analyzing job level of a subject capable of an analyzing job. The analyzing job level may be set in a percentage (%). In this regard, as shown in the screen (g) of FIG. 7E, the user may check a job level regarding a job subject through the UI screen. For example, in FIG. 9, when a self-terminal, i.e., the terminal 100, uses raw log data to extract activity recognition results, accuracy of activity recognition may reach up to 90%.

Figure 10:
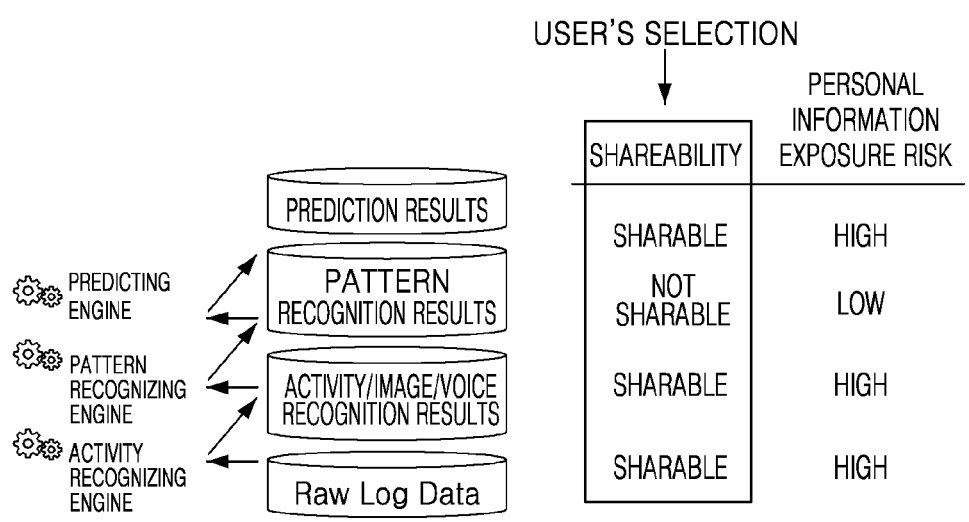
FIG. 10 is a diagram for describing processes of notifying a personal information exposure risk based on sharing.

FIG. 10 is a diagram for describing processes of notifying a personal information exposure risk based on sharing.

Referring to FIG. 10 and FIG. 1A together for convenience of description, when the terminal 100 according to an exemplary embodiment disapproves data sharing of an upper tier as shown in FIG. 10, data sharing of a lower tier may be automatically blocked in a default mode. For example, when pattern information sharing is disapproved as "not sharable", action recognition and raw data log may also be automatically disapproved as "not sharable".

As such, when user wrongly sets data sharing of a certain tier, the terminal 100 is able to notify the user that a tier set to be shared in a lower tier may be disapproved as "not sharable".

For example, in the screen (d) of FIG. 7B, the user may select "sharable," "not sharable," "sharable," and "not sharable" respectively for prediction results, pattern recognition results, activity recognition result, and raw log data of layer information. Here, when sharing of pattern information is disapproved, the terminal 100 may automatically change action recognition to "not sharable." Then, the terminal 100 may notify the user that the sharing is wrongly set via a popup window. Furthermore, the terminal 100 may notify an exposure risk degree of personal information with respect to each shareability, and the exposure risk degree may be displayed, for example, directly next to a selected item when shareability is selected.

Meanwhile, when the information of FIGS. 8 through 10 is configured in a UI screen, the information of FIGS. 8 through 10 may be separated from each other to form independent screens, or may be divided into first through third regions in one UI screen as shown in screen (g) of FIG. 7E. As such, according to an exemplary embodiment, a method of setting a UI screen is not specifically limited.

Figure 11:
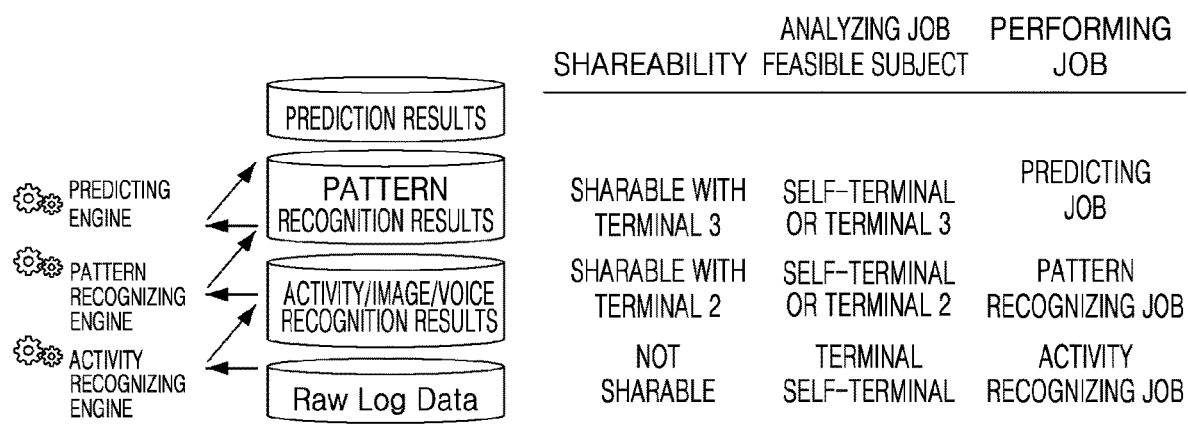
FIG. 11 is a diagram for describing that sharing is settable with a neighboring terminal.

FIG. 11 is a diagram for describing that sharing is settable with a neighboring terminal.

Referring to FIG. 11 together with FIGS. 1B and 1C for convenience of description, the terminal 100-1' or 100-1" according to an exemplary embodiment may set the neighboring terminal 100-2' or wearable apparatus 100-2" with which the terminal 100-1' or 100-1" is to perform sharing a job, with respect to a tier of allowing sharing as shown in FIG. 11.

For example, when the user sets that a terminal 2, i.e., the neighboring terminal 100-2', is sharable with respect to activity recognition, a pattern recognizing job may be processed in cooperation with the terminal 2. For example, the pattern recognizing job may be processed by the terminal 2 according to user's setting, and the terminal 2 may provide the processing results to the terminal 100-1' or 100-1".

In this regard, as described above with reference to screen (g) of FIG. 7E, when the user selects to share certain layer information, the terminal 100-1' or 100-1" may display, on the screen, setting items for setting an apparatus to be shared and how to distribute job levels, and the user may input detailed information through the screen.

Figure 12A:
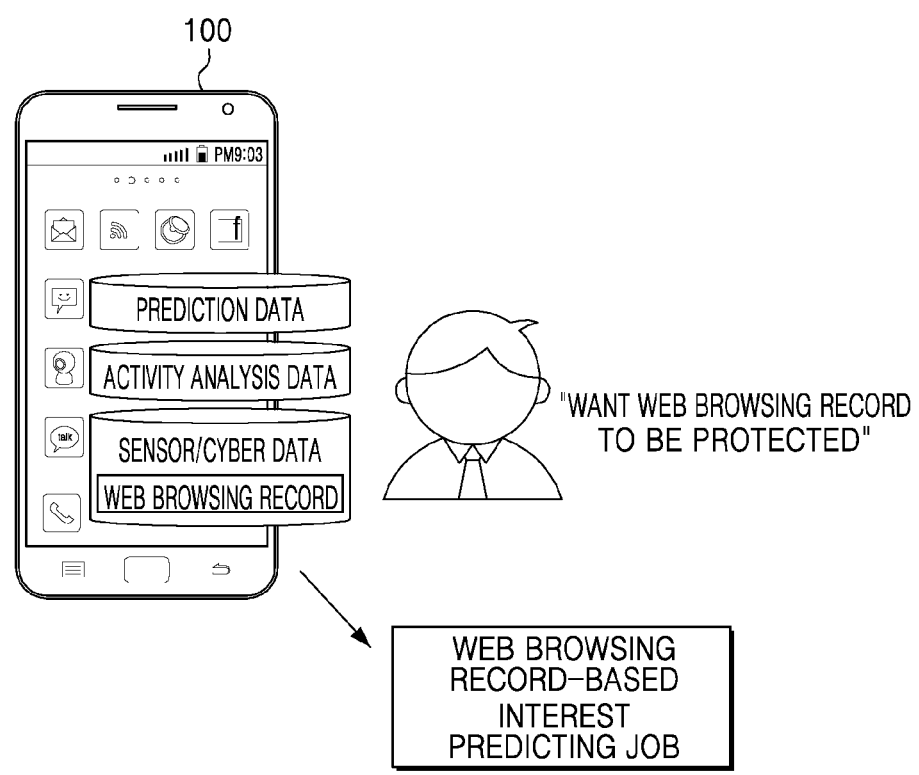
FIGS. 12A and 12B illustrate a scenario regarding a personalized data cooperative process service, according to an exemplary embodiment.
Figure 12B:
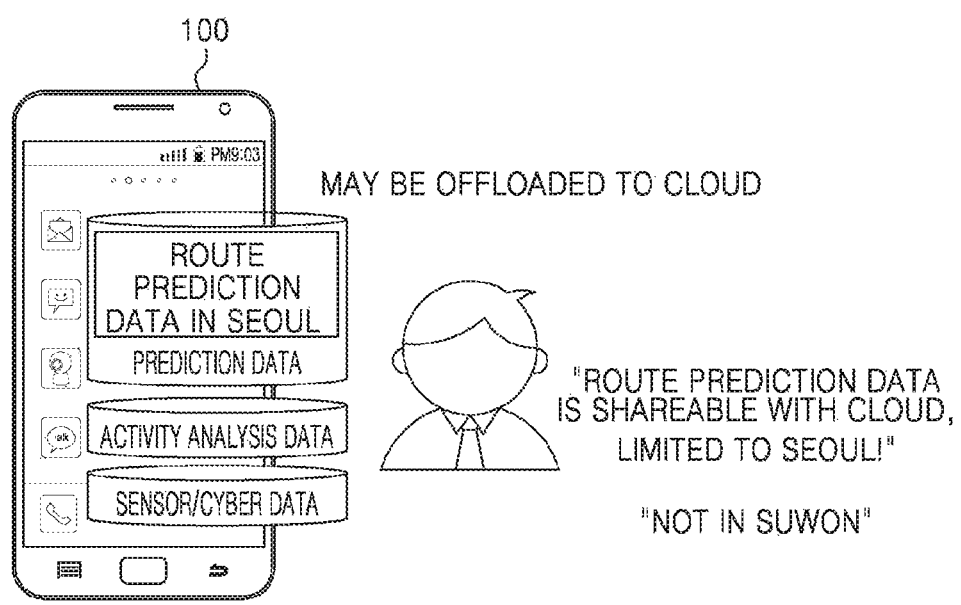

FIGS. 12A and 12B illustrate a scenario regarding a personalized data cooperative process service, according to an exemplary embodiment.

Referring to FIGS. 12A and 12B together with FIG. 1A for convenience of description, when the user of the terminal 100 sets, for example, "want web browsing record to be protected" as shown in FIG. 12A, the terminal 100 may not share a web browsing record-based interest predicting job with the cloud apparatus 120 outside. In other words, the terminal 100 may self-perform the corresponding job.

For example, while the UI screen (b) of FIG. 7I is displayed on the terminal 100, the user sets which web browser information is to be shared and not shared. For example, when the user selects "not sharable" for the entire information related to a web browser, the web browsing record of the user may be protected. Accordingly, when the terminal 100 processes raw log data related to activities of the user, data related to web browsing is not shared with the cloud apparatus 120.

On the other hand, as shown in FIG. 12B, when the user approves sharing of route prediction data only for the city of Seoul and disapproves the sharing for the city of Suwon, prediction data related to Seoul may be offloaded from the terminal 100 to the cloud apparatus 120. On the other hand, prediction data related to Suwon is not provided to the cloud apparatus 120. Accordingly, the cloud apparatus 120 derives only action prediction results of the user related to Seoul, and shares the action prediction results with the terminal 100.

In this regard, although a separate drawing is not provided, for example, when the user sets information about a place name, a time slot, and latitude and longitude related to a current location to be not sharable in the screen (b) of FIG. 7I, the terminal 100 may further provide a UI screen for setting an area as a next screen. By additionally setting the area in such a UI screen, the user may set data related to a certain area to be not shared as shown in FIG. 12B.

Figure 13:
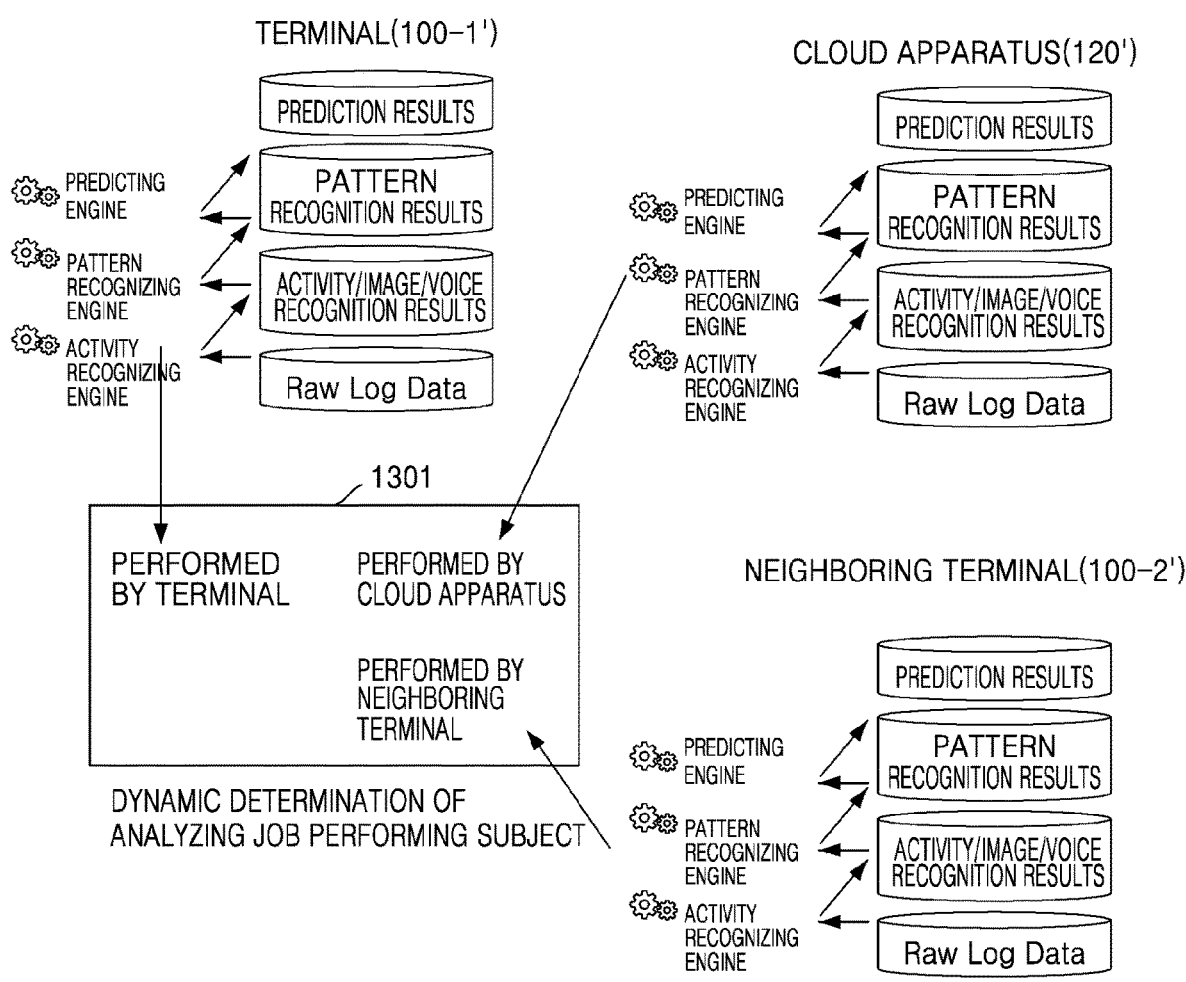
FIG. 13 is an exemplary diagram of intelligent operations performed by the system of FIG. 1B.

FIG. 13 is an exemplary diagram of intelligent operations performed by the system of FIG. 1B. Reference numeral 1301 of FIG. 13 indicates determining of an analyzing subject for performing analysis according to types of data.

Referring to FIG. 13 together with FIG. 1B, an analyzing API of the terminal 100-1' and an analyzing API of the cloud apparatus 120' may be replace each other as shown in FIG. 13. However, a level of a service provided to the user may differ based on configurations. In other words, trade-off may be possible between privacy and an operation. For example, when a usage of an application is predicted after recognizing a Wi-Fi use pattern as an example of a service, operations of FIG. 13 may be applied.

In detail, the neighboring terminal 100-2' may execute an activity recognizing engine in order to derive activity recognition results from a plurality of pieces of layer information. Accordingly, the neighboring terminal 100-2' may receive from the terminal 100-1' and may use raw log data related to Wi-Fi use. On the other hand, a pattern recognizing job may be performed by the terminal 100-1'. Accordingly, the terminal 100-1' may receive, from the neighboring terminal 100-2', and use the activity recognition results to derive pattern recognition results. Also, the derived pattern recognition results may be provided to the cloud apparatus 120' for deriving prediction results.

According to such operations, for example, since job subjects are pre-assigned during subscription to a personalized service when the user selects each piece of sharable layer information and selects the OK button in the screen (d) of FIG. 7B, dynamic determination between assigned job subjects may be possible. For example, the job subjects may be automatically determined according to CPU usage or battery usage of the terminal 100-1' and the neighboring terminal 100-2', and moreover, according to network usage, etc. of the cloud apparatus 120'.

Figure 14:
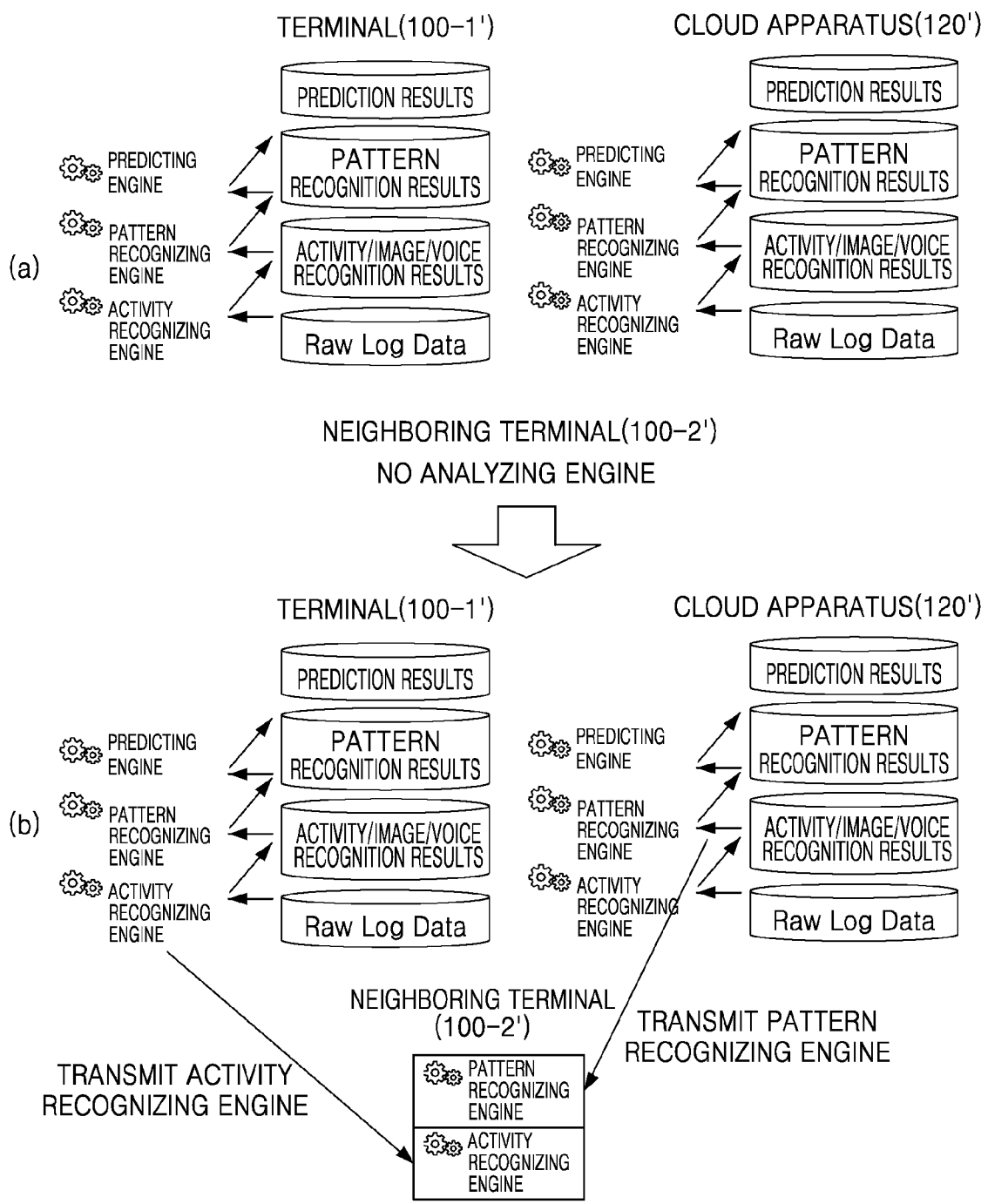
FIG. 14 is another exemplary diagram of intelligent operations performed by the system of FIG. 1B.

FIG. 14 is another exemplary diagram of intelligent operations performed by the system of FIG. 1B.

Referring to FIGS. 14 and 1B together, according to an exemplary embodiment, apparatuses in the system may perform a distributed job or may participate in reconstruction of a dynamic service function only when a part of an engine, i.e., a program, capable of substantially performing a data analyzing job is included.

However, as shown in (b) of FIG. 14, in order to prepare for job distribution, the terminal 100-1' may transmit an activity recognizing engine to the neighboring terminal 100-2'. Moreover, the neighboring terminal 100-2' may receive a pattern recognizing engine and a pattern-based predicting engine from the cloud apparatus 120'. Accordingly, the neighboring terminal 100-2' may perform operations of deriving activity recognition results and pattern recognition results given to the neighboring terminal 100-2', by using the activity recognizing engine received from the terminal 100-1' and the pattern recognizing engine received from the cloud apparatus 120, and may transmit each of the derived results to at least one of the terminal 100-1' and the cloud apparatus 120'.

Figure 15A:
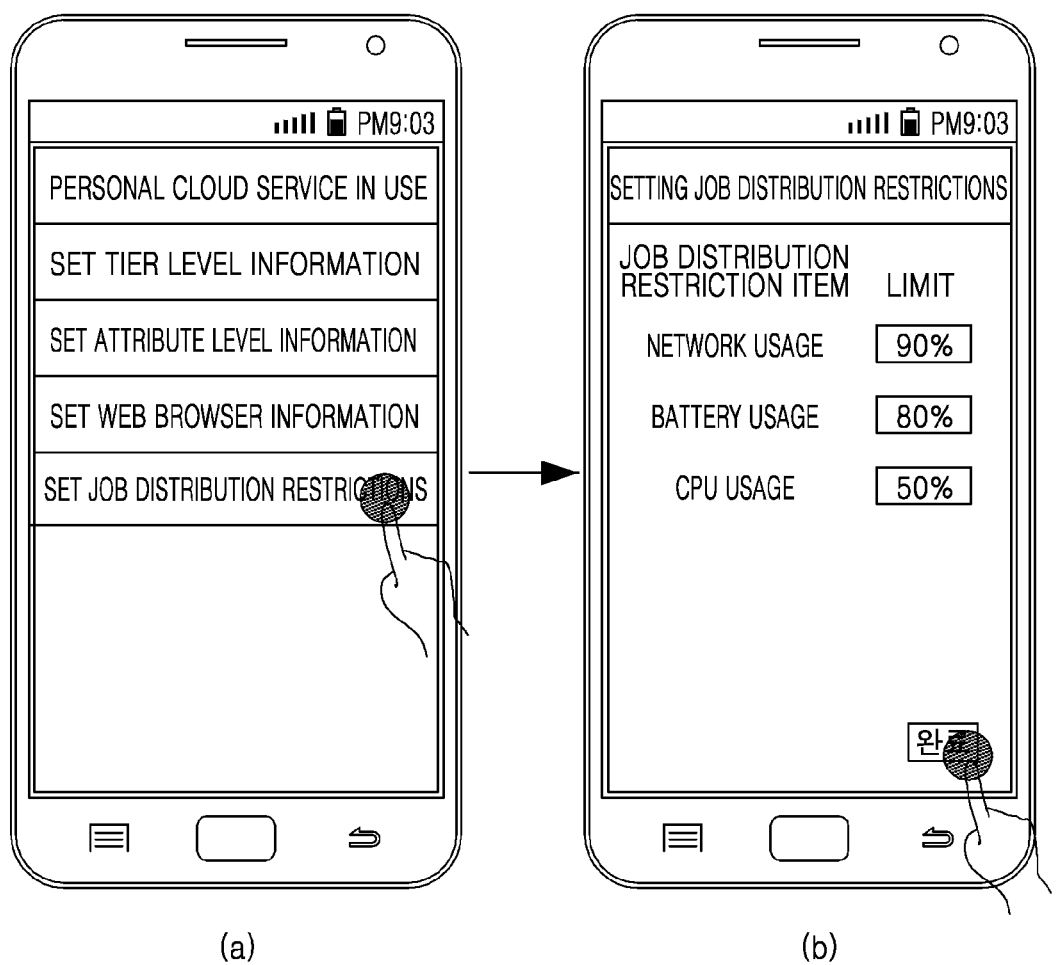
FIGS. 15A and 15B are diagrams for describing an analysis job distribution adjusting function according to situations of a service and an apparatus.
Figure 15B:
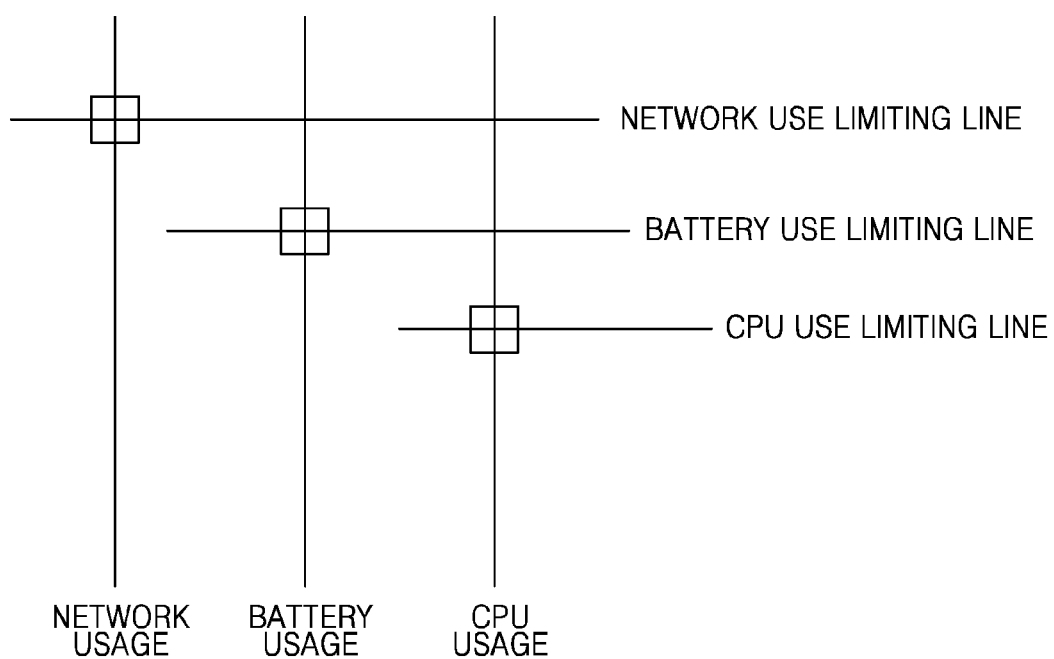

FIG. 15A is a diagram of processes of setting a job distribution restriction on a UI screen, and FIG. 15B is a diagram for describing an analyzing job distribution adjusting function according to situations of a service and an apparatus. In some exemplary embodiments, the user may elect not to personally set a limit. In this case, a cooperative manager may set a suitable limit by using mechanics, or generally, a limit used often by other users as a default.

Referring to FIGS. 15A and 15B together with FIG. 1A for convenience of description, according to an exemplary embodiment, the user of the terminal 100 may predict a limit with respect to restrictions as shown in FIG. 15B, and may set a detailed threshold value with respect to the restrictions on a job distribution restriction setting UI screen as shown in FIG. 15A.

In detail, the user of the terminal 100 selects a job distribution restriction setting item from a setting information list as shown in a screen (a) of FIG. 15A. Then, the terminal 100 displays a screen (b) of FIG. 15A. Accordingly, the user sets a limit, i.e., a threshold value, with respect to each restriction item.

For example, when the user sets CPU usage to 50%, for example, a job given to the terminal 100 of the user is performed if the CPU usage does not exceed 50% in the terminal 100 of FIG. 1A, but the given job may be performed by a sharing apparatus if the CPU usage exceeds 50%. Also, regarding battery usage, a job subject may be changed if a battery is consumed up to about 80% based on a full charge. Also, when it is determined that network bandwidth usage exceeds 90%, the terminal 100 may not change a job subject to the cloud apparatus 120. Such examples are based on an assumption that the terminal 100 and the cloud apparatus 120 have assigned each other to share each piece of layer information. Accordingly, since above descriptions may freely change based on shareability, an exemplary embodiment is not specifically limited to the above descriptions.

As described above, the user of the terminal 100 may set a network usage limiting line, a battery use limiting line, and a CPU use limiting line, i.e., threshold values. Standards of analyzing jobs between the terminal 100 and the cloud apparatus 120 may be prepared only when restrictions are set as such.

Accordingly, the job distribution restriction may be automatically determined. For example, when daily network usage is set not to exceed 10 Mbytes, resource usage restrictions related thereto may be automatically determined. In other words, since setting information regarding 10 Mbytes with respect to restrictions of network usage is stored in the terminal 100, restrictions may be determined by checking such information. Also, when there are a plurality of restrictions, for example, when a priority is set in an order of a network, a battery, and a CPU, a priority may be automatically determined based on such resource usage restrictions. In other words, since priority information regarding each restriction is also stored in the terminal 100, when a priority needs to be determined, the stored priority information may be checked. As such, the terminal 100 may automatically determine a job subject or level based on information set by the user, for example, through the screen of FIG. 15A. As shown in FIG. 15B, the restrictions may be set using a slider on the screen.

FIG. 16 illustrates a scenario related to an analyzing job distribution adjustment according to the situations of the service and the apparatus of FIG. 15A.

Referring to FIG. 16 and FIG. 1A together for convenience of description, the terminal 100 according to an exemplary embodiment consumes 50% of a CPU to analyze a jogging pattern per day, and at this time, power consumption is 100 mJ, and on the other hand, power consumption is 100 mJ when a jogging log is transmitted to the cloud apparatus 120. Such information is empirically determined, for example, via mechanical learning. Accordingly, the terminal 100 determines that activity analysis data is processable by using self-resources (i.e., its own resources), and as shown in (a) of FIG. 16, may maintain a jogging pattern analyzing module to an active state. In other words, the corresponding module may be executed.

During such processes, for example, when it is determined that the CPU is not sufficient since a search word analyzing processes have to be simultaneously performed as shown in (b) of FIG. 16, the terminal 100 may transmit search analyzing log data to the cloud apparatus 120 to offload a search analyzing job. For example, when the CPU lacks sufficient resources while simultaneously performing the search word analyzing processes by the terminal 100, the terminal 100 may transmit related data to the cloud apparatus 120 such that the search word analyzing processes are performed in the cloud apparatus 120. That is, the terminal 100 may offload the search word analyzing process to the cloud apparatus 120.

Figure 17A:
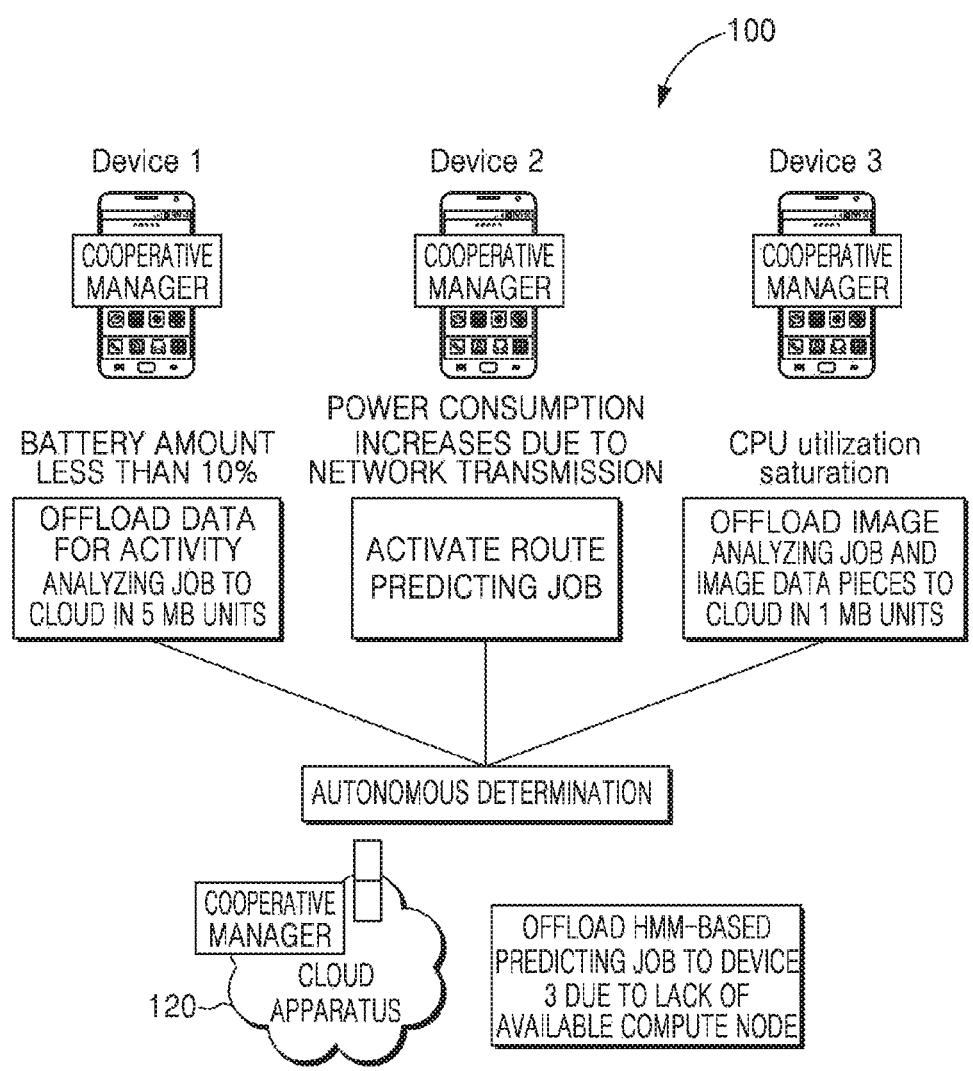
FIGS. 17A and 17B illustrate a scenario for describing job distribution processes according to changes in the situations of the service and the apparatus of FIG. 15B.
Figure 17B:
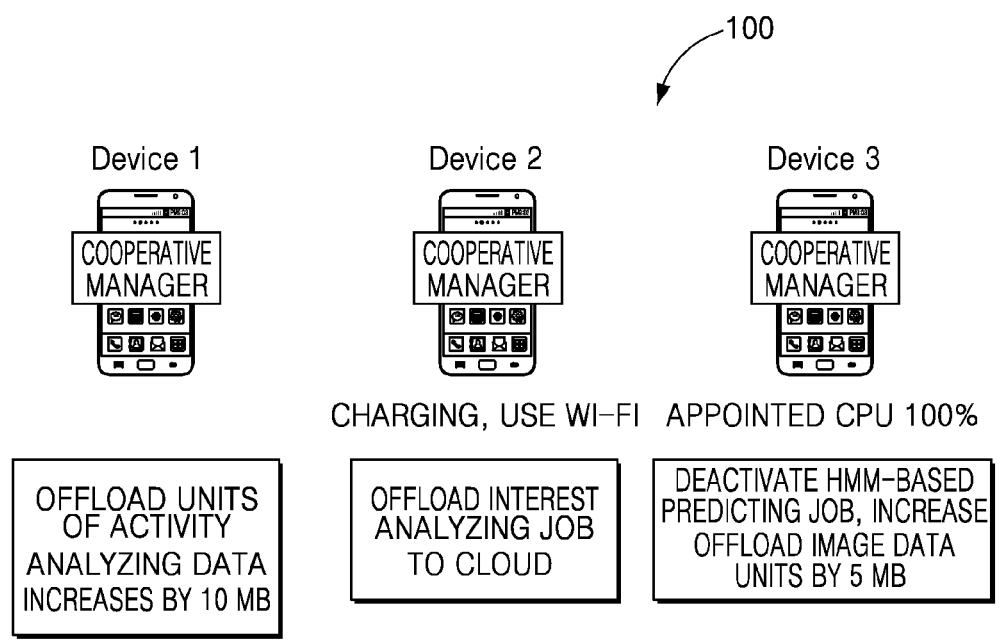

FIGS. 17A and 17B illustrate a scenario for describing job distribution processes according to changes in the situations of the service and the apparatus of FIG. 15A.

Referring to FIGS. 17A and 17B together with FIG. 1A for convenience of description, a plurality of the terminals 100 according to an exemplary embodiment may perform various operations according to operation statuses of a network and the terminals 100. For example, a terminal 1 (device 1) of FIG. 17A may automatically adjust a data transmission amount according to battery remains, and a terminal 2 (device 2) may reduce a data transmission amount offloaded to the cloud apparatus 120 when CPU utilization is in a saturated state. Also in the cloud apparatus 120, a suitable terminal 100 may be selected to perform an offloading job.

When, for example, a load of the cloud apparatus 120 is reduced during such processes, a resource utilization state of the cloud apparatus 120 at this time may be shared with the terminals 100, and in this case, the terminals 100 may increase the data transmission amount offloaded to the cloud apparatus 120 as shown in FIG. 17B.

As such, job distribution is automatically, dynamically, or adaptively performed between the terminal 100 and the cloud apparatus 120 according to changes of situations of the service and the apparatuses.

In detail, according to an exemplary embodiment, it is a principle that the cooperative manager of the terminal 100 and the cooperative manager of the cloud apparatus 120 perform distributed processing on data according to setting information set by the user with respect to data sharing in the terminal 100. This distributed processing corresponds to a cooperation operation for data distributed processing. However, during such processes, there may be a situation in which the terminal 100 is not be able to perform the data distributed processing due to lack of battery remains and/or the cloud apparatus 120 delays or has difficulty to perform the data distributed processing due to a workload for data processing, and under such a situation, the cooperative manager of the terminal 100 and the cooperative manager of the cloud apparatus 120 may perform a re-cooperation operation. The re-cooperation operation may be performed on data excluding data the user does not want to share. As such, re-performing of a data distributed processing method according to resource states that change in real-time in the terminal 100 and/or the cloud apparatus 120 may be considered that 'job distribution is automatically performed according to situation changes'.

For example, when the cloud apparatus 120 performed job redistribution regarding data analysis to be performed by itself, the cloud apparatus 120 may request the terminal 100-1' or the neighboring terminal 100-2' of FIG. 1B to perform the data analysis, and receive data and analysis results when a load is resolved.

Also, when there is anonymity setting information set by the user through the terminal 100, the terminal 100 may also provide anonymity information to the cloud apparatus 120 when battery remains lack to request the cloud apparatus 120 to generate data including the anonymity information. Then, when battery capacity is recovered, the terminal 100 may receive the data including the anonymity information from the cloud apparatus 120 and provide the data to the user. For example, anonymity changes data, such as a name, an age, an affiliation, etc. from certain data to different data. Details thereof will be described in further later. FIG. 17B shows another example in which jobs are offloaded to the cloud apparatus based on charging and use of Wi-Fi.

Figure 18:
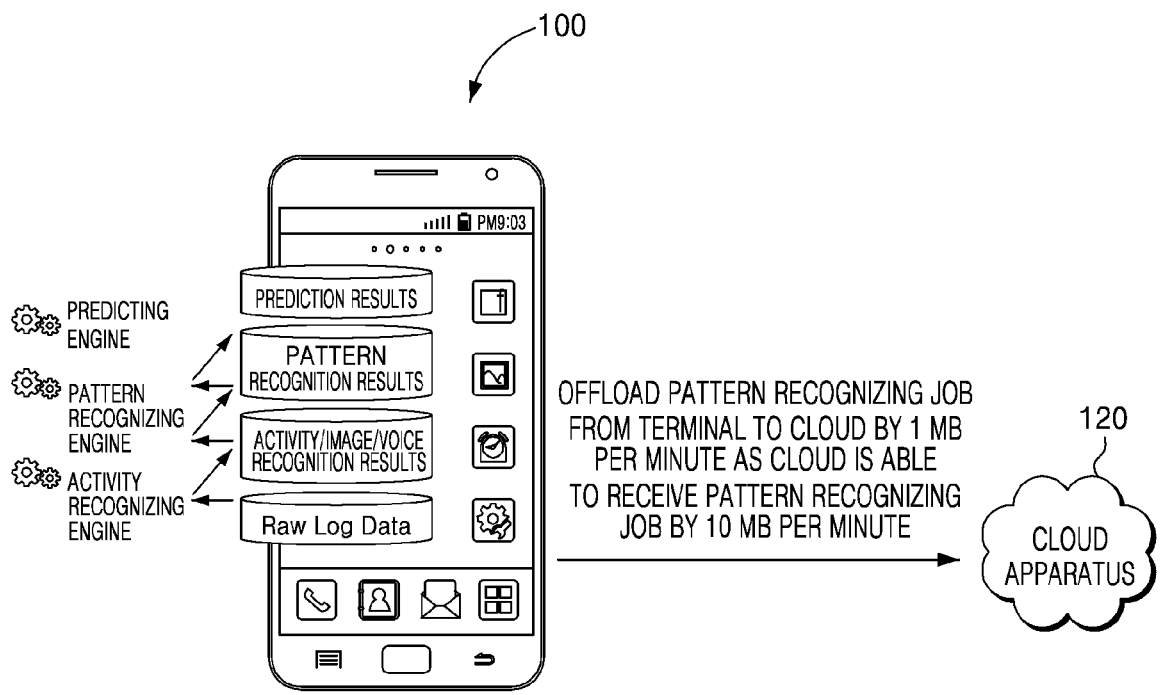
FIGS. 18 and 19 are diagrams for describing job distribution processes according to changes in the situations of the service and the apparatus of FIG. 15B.
Figure 19:
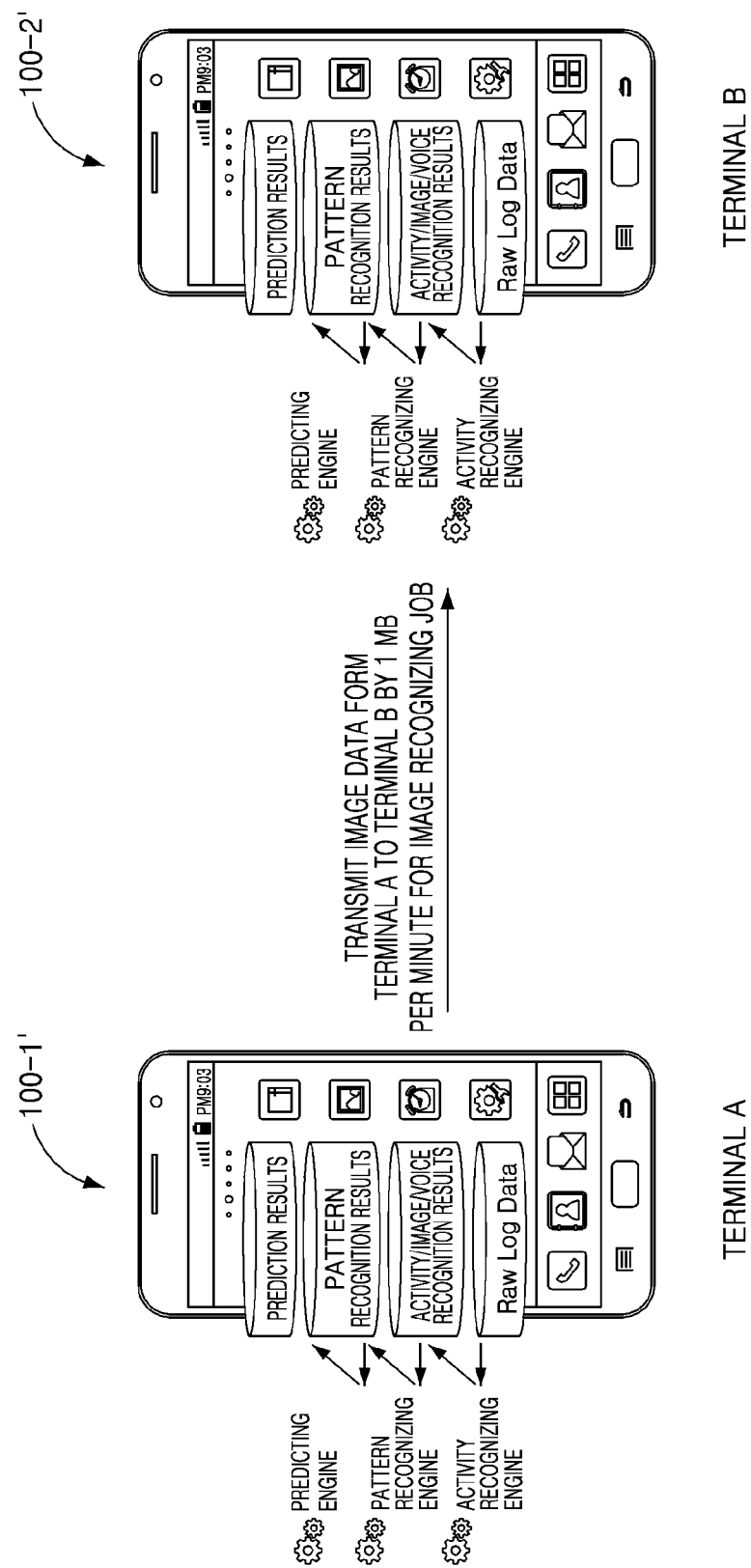

FIGS. 18 and 19 are diagrams for describing job distribution processes according to changes in the situations of the service and the apparatus of FIG. 15A.

Referring to FIG. 18 and FIG. 1A together for convenience of description, the terminal 100 according to an exemplary embodiment may determine a transmission amount of data to be offloaded according to data analyzing process capability of the cloud apparatus 120. For example, if the cloud apparatus 120 is capable of receiving and processing, for example, data related to a pattern recognizing job corresponding to 10 Mbytes per minute, the terminal 100 may transmit data corresponding to 1 Mbyte per minute.

Also, referring to FIG. 19 and FIG. 1B together, the terminal 100-1' according to an exemplary embodiment may also determine data to be offloaded according to data analyzing process capability of the neighboring terminal 100-2'. For example, when the neighboring terminal 100-2' is capable of receiving data of 1 Mbyte per minute regarding an image material for image recognizing job, the terminal 100-1' may transmit data considering such information.

With reference to FIGS. 18 and 19, before offloading data to the cloud apparatus 120 or the neighboring terminal 100-2', the terminal 100 or 100-1' may first determine data analyzing process capability of the cloud apparatus 120 or the neighboring terminal 100-2', and then offload the data within a range of a processable capability.

Figure 20:
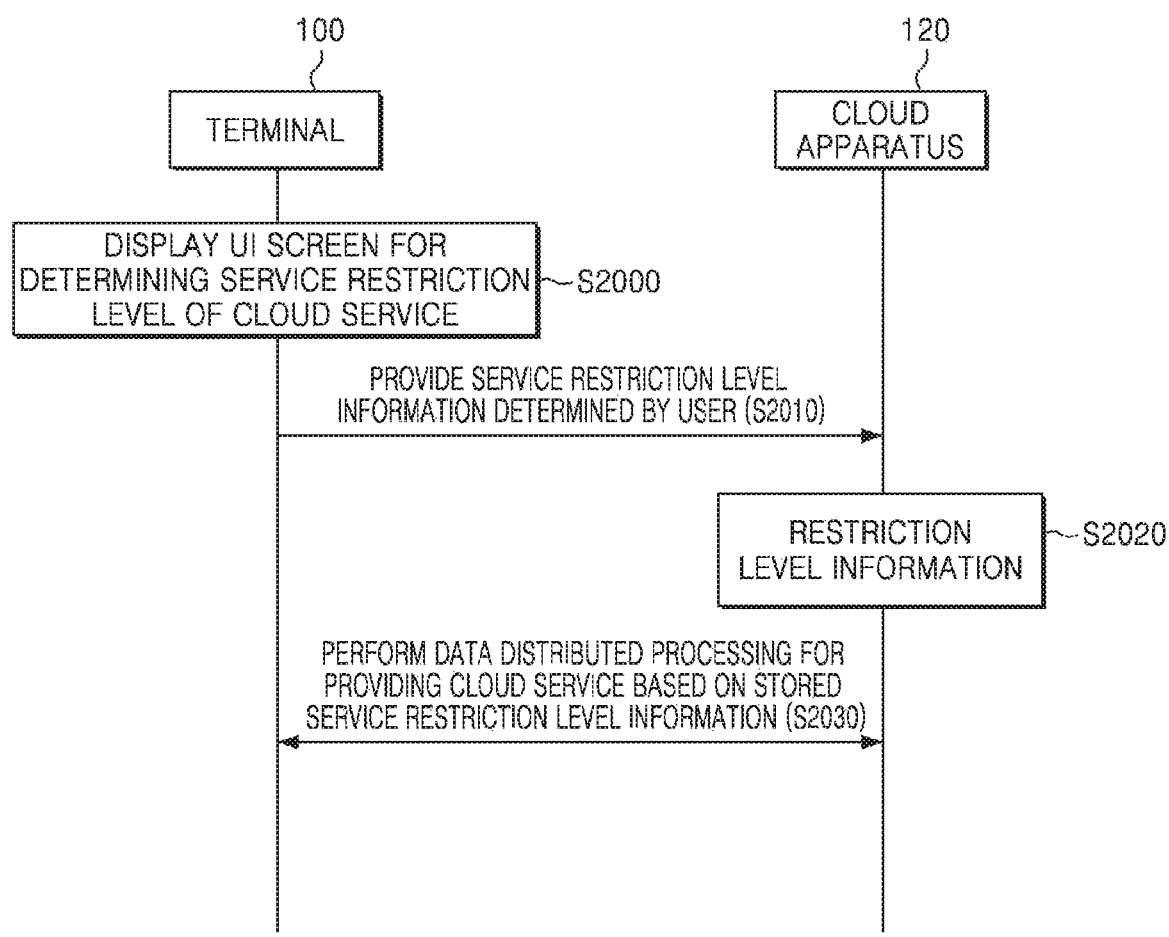
FIG. 20 is a diagram for describing processes of a data cooperative process service, according to a first exemplary embodiment.

FIG. 20 is a diagram for describing processes of a data cooperative process service, according to a first exemplary embodiment. Hereinafter, the data cooperative process service is described as a cloud service.

Referring to FIG. 20 and FIG. 1A together for convenience of description, the terminal 100 according to a first exemplary embodiment may display a UI screen for setting a service restriction level of the cloud service, in operation S2000. Alternatively or additionally, the terminal 100 may display a UI screen for setting a cooperation level of the cloud service.

Then, when the user sets the service restriction level through the UI screen, service restriction level information may be provided to the cloud apparatus 120 accordingly, in operation S2010. However, a point of time the service restriction level information is provided is not limited thereto, and the service restriction level information may be provided to the cloud apparatus 120 during distributed processing of data.

The cloud apparatus 120 stores the received service restriction level information according to users, in operation S2020. Substantially, since the cloud apparatus 120 is able to store the service restriction level information of a plurality of users according to users, service restriction levels per user may differ according to users.

When information about the service restriction levels of users are shared between the terminal 100 and the cloud apparatus 120, the terminal 100 and the cloud apparatus 120 performs distributed processing on data base don the service restriction level information determined by the user, in operation S2030.

During such a process, the terminal 100 may determine a percentage (%) of a distributed processing level, and in addition, may set various types of information described above, such that data processing is dynamically and adaptively processed.

Then, when the user of the terminal 100 desires analysis results according to data analysis, i.e., hierarchical information such as user prediction, so as to use a certain cloud service, the cloud apparatus 120 transmits information for the analysis results to the terminal 100, and the terminal 100 may provide the data cooperation process service desired by the user by using self-stored hierarchical information and the hierarchical information provided by the cloud apparatus 120.

Figure 21:
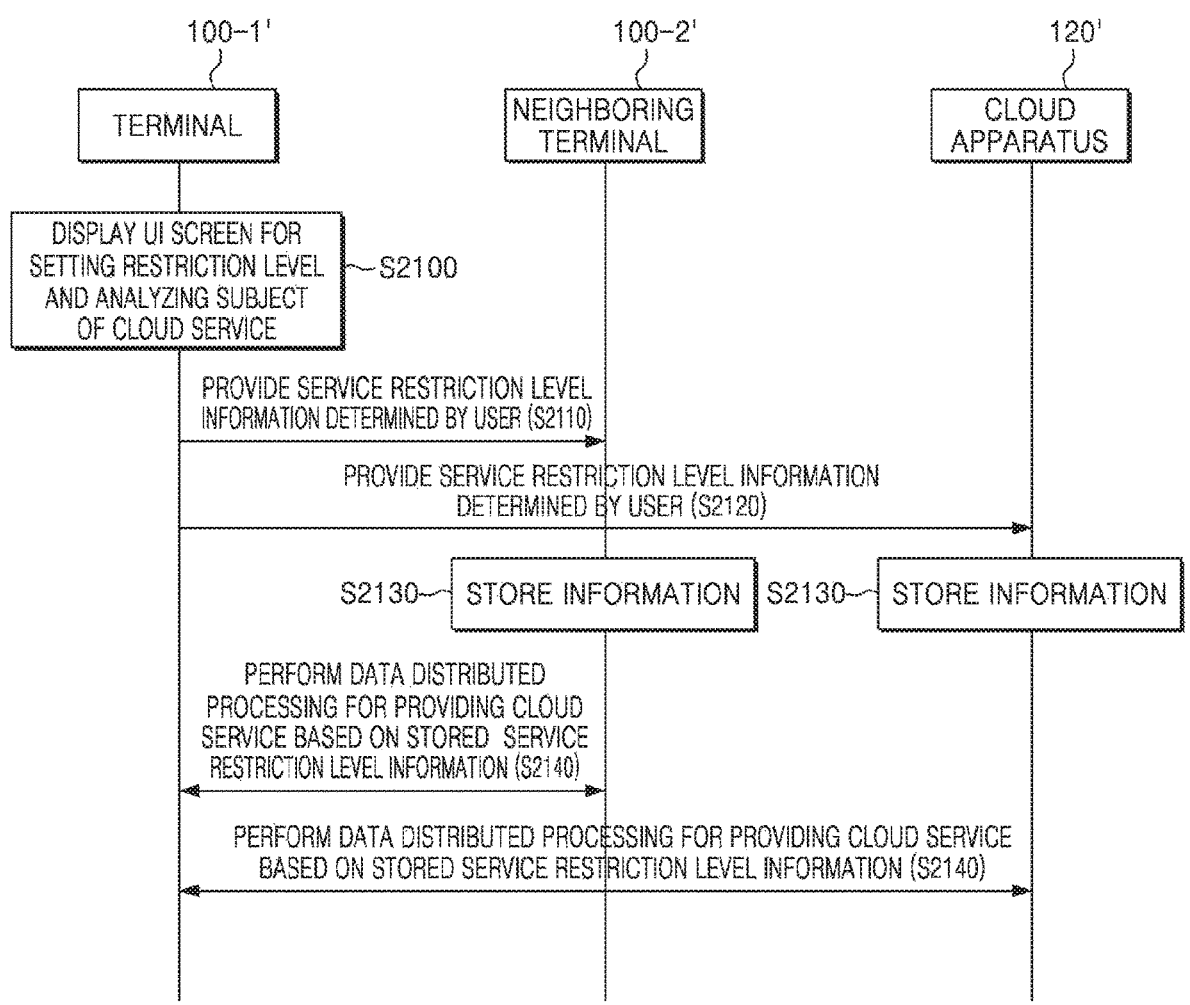
FIG. 21 is a diagram for describing processes of a data cooperative process service, according to a second exemplary embodiment.

FIG. 21 is a diagram for describing processes of a data cooperative process service, according to a second exemplary embodiment.

Referring to FIG. 21 and FIG. 1B together for convenience of description, the terminal 100-1' according to a second exemplary embodiment displays a UI screen for setting a service restriction level and a data analyzing object of a cloud service, in operation S2100.

Then, when the user sets the service restriction level and the analyzing subject through the UI screen, service restriction level information and information about the analyzing subject are provided to the neighboring terminal 100-2' and the cloud apparatus 120' accordingly, in operations S2110 and S2120, respectively. It should be noted that FIG. 21 shows operation S2110 as being performed first; however, this is only an example and operation S2120 may be performed before operation S2110.

Then, the neighboring terminal 100-2' and the cloud apparatus 120' each stores the received service restriction level information and the received information about the analyzing subject, in operation S2130.

Then, the neighboring terminal 100-2' and the cloud apparatus 120' perform, together with the terminal 100-1', data distributed processing based on the stored service restriction level information, in operation S2140. When data to be processed is transmitted as big data, the neighboring terminal 100-2' and the cloud apparatus 120' may detect and analyze certain data from the data to be processed based on the service restriction level information. However, the data to be processed may be split and provided to the neighboring terminal 100-2' and the cloud apparatus 120' according to a load of a network. Moreover, operation S2140 is shown between the terminal 100-1' and the neighboring terminal 100-2', and between the terminal 100-1' and the cloud apparatus 120'. However, in some exemplary embodiments, data may be split and distributed between the neighboring terminal 100-2' and the cloud apparatus 120' as well.

Even when data is split and provided, if the terminal 100-1' is set up to an analyzable level, the terminal 100-1', the neighboring terminal 100-2', and the cloud apparatus 120' may perform distributed processing of data and an analyzing job by additionally considering information about the analyzable level. Any one of various methods may be applied in relation to distribution and transmission of data.

Figure 22:
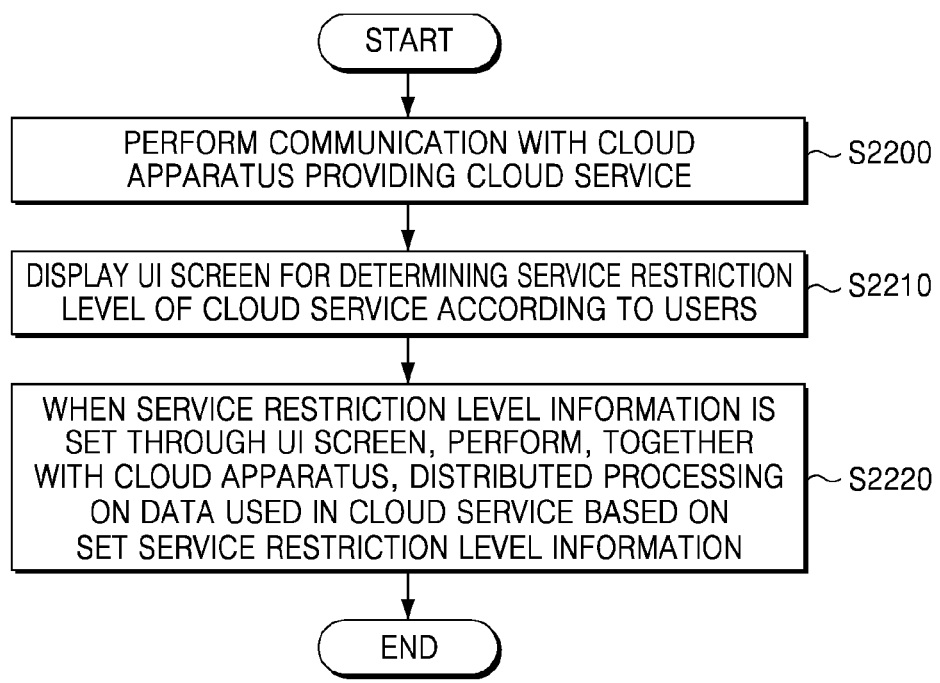
FIG. 22 is a flowchart of processes of driving a terminal, according to an exemplary embodiment.

FIG. 22 is a flowchart of processes of driving a terminal, according to an exemplary embodiment.

Referring to FIG. 22 together with FIGS. 1A and 1B for convenience of description, the terminal 100 according to an exemplary embodiment performs communication with the cloud apparatus 120 providing a cloud service, in operation S2200. For example, when the terminal 100 requests for using the cloud service, the cloud apparatus 120 may respond in this regard.

Then, the terminal 100 displays a UI screen for determining a service restriction level of the cloud service according to users, in operation S2210.

When the neighboring terminal 100-2' exists as shown in FIG. 1B while the terminal 100 determines the service restriction level, various types of information, such as an analyzing subject, may be set. Since details thereof have been sufficiently described above, descriptions thereof are not provided again.

When the service restriction level is set through the UI screen, the terminal 100 analyzes data used in the cloud service by performing, together with the cloud apparatus 120, distributed processing on the data based on the set service restriction level, in operation S2220.

When an analyzing subject is determined with respect to the neighboring terminal 100-2' during such processes, the data may be analyzed as the neighboring terminal 100-2' also performs the distributed processing.

Figure 23:
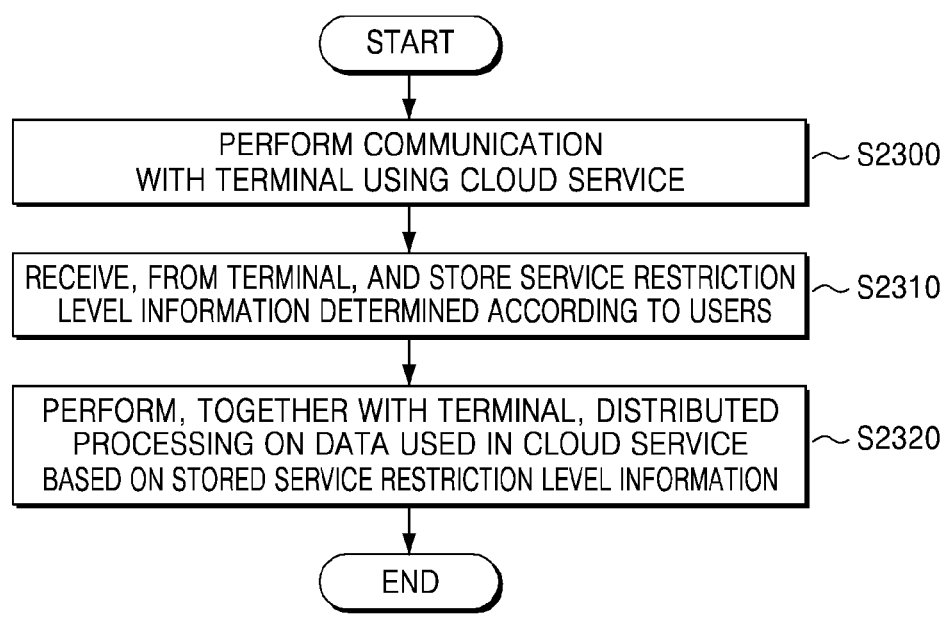
FIG. 23 is a flowchart of processes of driving a cloud apparatus according to an exemplary embodiment.

FIG. 23 is a flowchart of processes of driving a cloud apparatus according to an exemplary embodiment.

Referring to FIGS. 23 and 1A together for convenience of description, the cloud apparatus 120 according to an exemplary embodiment performs communication with the terminal 100 using a cloud service, in operation S2300.

Then, the cloud apparatus 120 receives, from the terminal 100, and stores service restriction level information determined according to users, in operation S2310.

During such processes, although not illustrated, the cloud apparatus 120 may store the service restriction level information, and if the neighboring terminal 100-2' exists as shown in FIG. 1B, may set various types of information about an analyzing subject, an analyzable level, etc.

Also, the cloud apparatus 120 performs, together with the terminal 100, distributed processing on data used in the cloud service based on the stored service restriction level information, in operation S2320. Here, the cloud apparatus 120 may derive data analysis results through distributed processing processes.

Then, if the data analysis results are to be provided while providing the cloud service to the terminal 100, the cloud apparatus 120 may provide the corresponding results.

Figure 24:
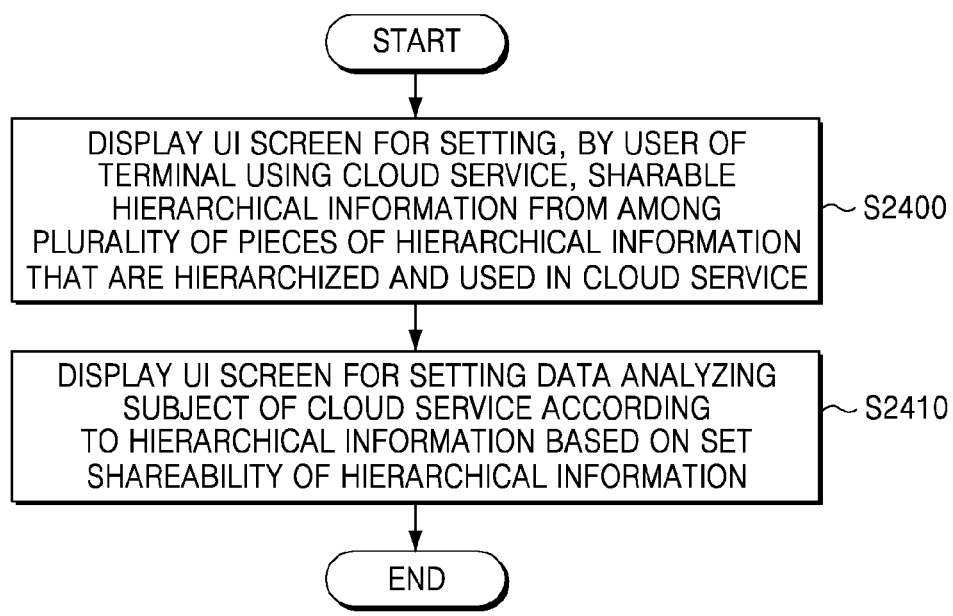
FIG. 24 is a flowchart of a screen display method of a terminal, according to an exemplary embodiment

FIG. 24 is a flowchart of a screen display method of a terminal, according to an exemplary embodiment.

Referring to FIGS. 24 and 1A together for convenience of description, the terminal 100 according to an exemplary embodiment displays a UI screen for setting, by the user of the terminal 100 using a cloud service, sharable hierarchical information from among a plurality of pieces of hierarchical information that are hierarchized and used in the cloud service, in operation S2400.

Then, the terminal 100 may display a UI screen for setting a data analyzing subject of the cloud service according to hierarchical information based on the set shareability of the hierarchical information, in operation S2410.

Also, when the data analyzing subject is set, the terminal 100 may set an analyzing level, and in addition, may display various types of information notifying risks according to shareability of the user. Since details thereof have been sufficiently described above, descriptions thereof are not provided again.

FIGS. 25A and 25B are diagrams for describing processes of anonymizing some of data while transmitting the data from a terminal to a cloud apparatus or to a neighboring terminal.

Referring to FIGS. 25A and 25B together with FIG. 1A for convenience of description, while transmitting data to, for example, the cloud apparatus 120, based on set shareability of hierarchical information, the terminal 100 according to an exemplary embodiment may additionally anonymize some of the data to be transmitted for privacy protection. Here, anonymizing means that some of data, such as a text, an image, voice, or video, is changed to or composed to different content within a range of preserving characteristics of a target object.

For example, when text or voice such as screen (a) in FIG. 25A is transmitted to the cloud apparatus 120 according to sharing of hierarchical information, an overall meaning may be transmitted intact while targets of some of the data, such as "Samsung Electronics", "Hanban Yoon general manager", and "38 years old", containing information about a name, an age, and an affiliation, which may be feared for invasion of privacy, may be generalized to "company", "a Yoon", and "late 30s", as shown in the screen (b) of FIG. 25A. In other words, corresponding terms may be changed to other terms and then transmitted. In other words, regarding voice, like text, voice corresponding to "Hanban Yoon general manager" may be cut and voice of "a Yoon" may be inserted thereto.

Also, in case of an image or a video as in screen (a) of FIG. 25B, a facial region may be hidden by an emoticon image or a face image of a caricature as shown in screen (b) of FIG. 25B and then transmitted. In detail, as shown in the screen (a) of FIG. 25B, an individual object may be recognized from the image, and an additional image may replace a part of the recognized individual object, in detail, a face, as shown in the screen (b) of FIG. 25B. In this case, such anonymization may be applied by being applied to all raw data within a range such that characteristics of a nature of an object are not listed.

Based on the above description, the terminal 100 according to an exemplary embodiment may perform processes of analyzing (or determining) whether anonymization of data to be transmitted is additionally used according to shareability of hierarchical information, and in addition, may additionally perform processes of amending some of the data according to analysis results. Such operations may be performed by, for example, the controller 220' and the data analyzer 230' in view of FIG. 2B.

Figure 26A:
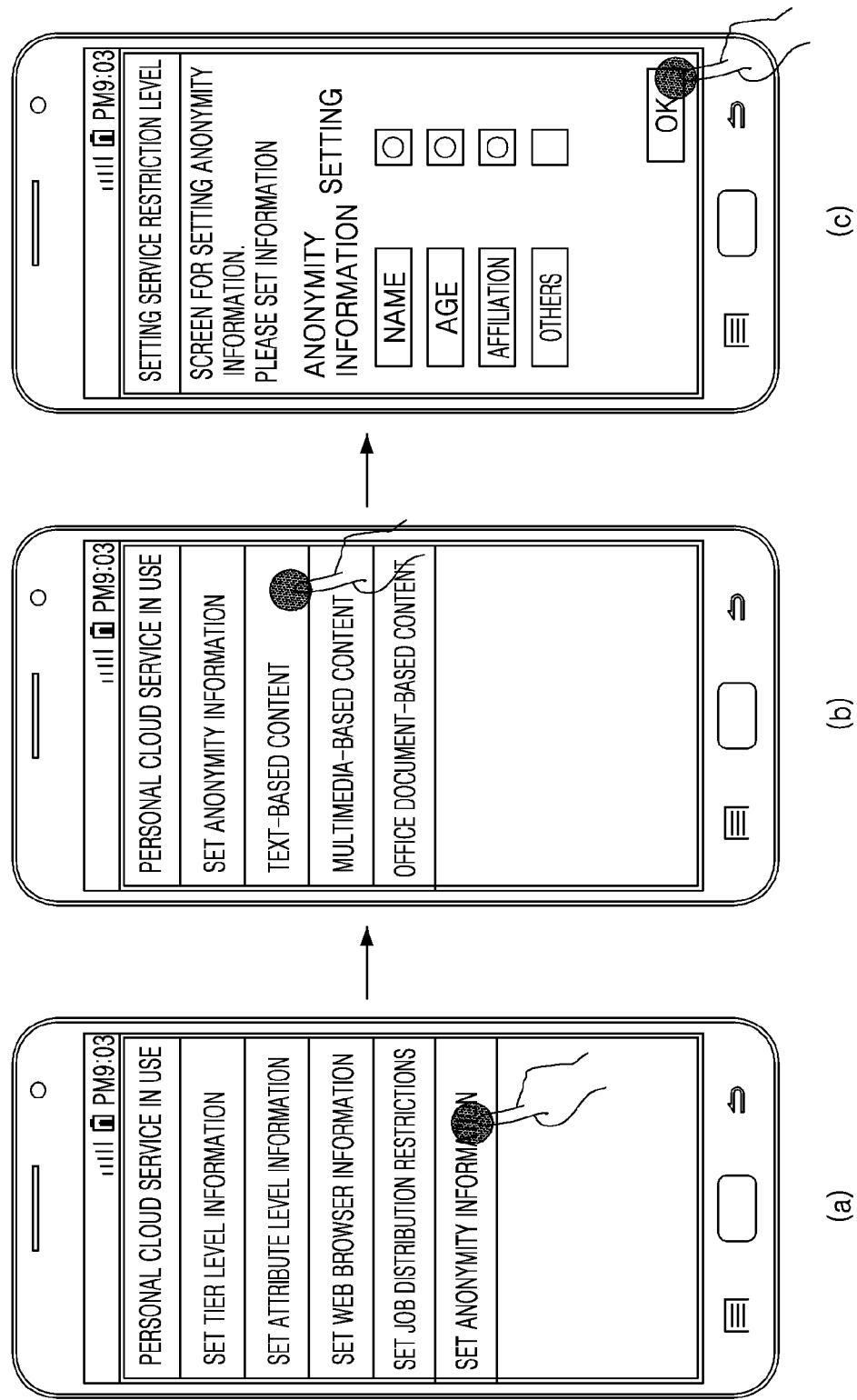
Figure 26B:
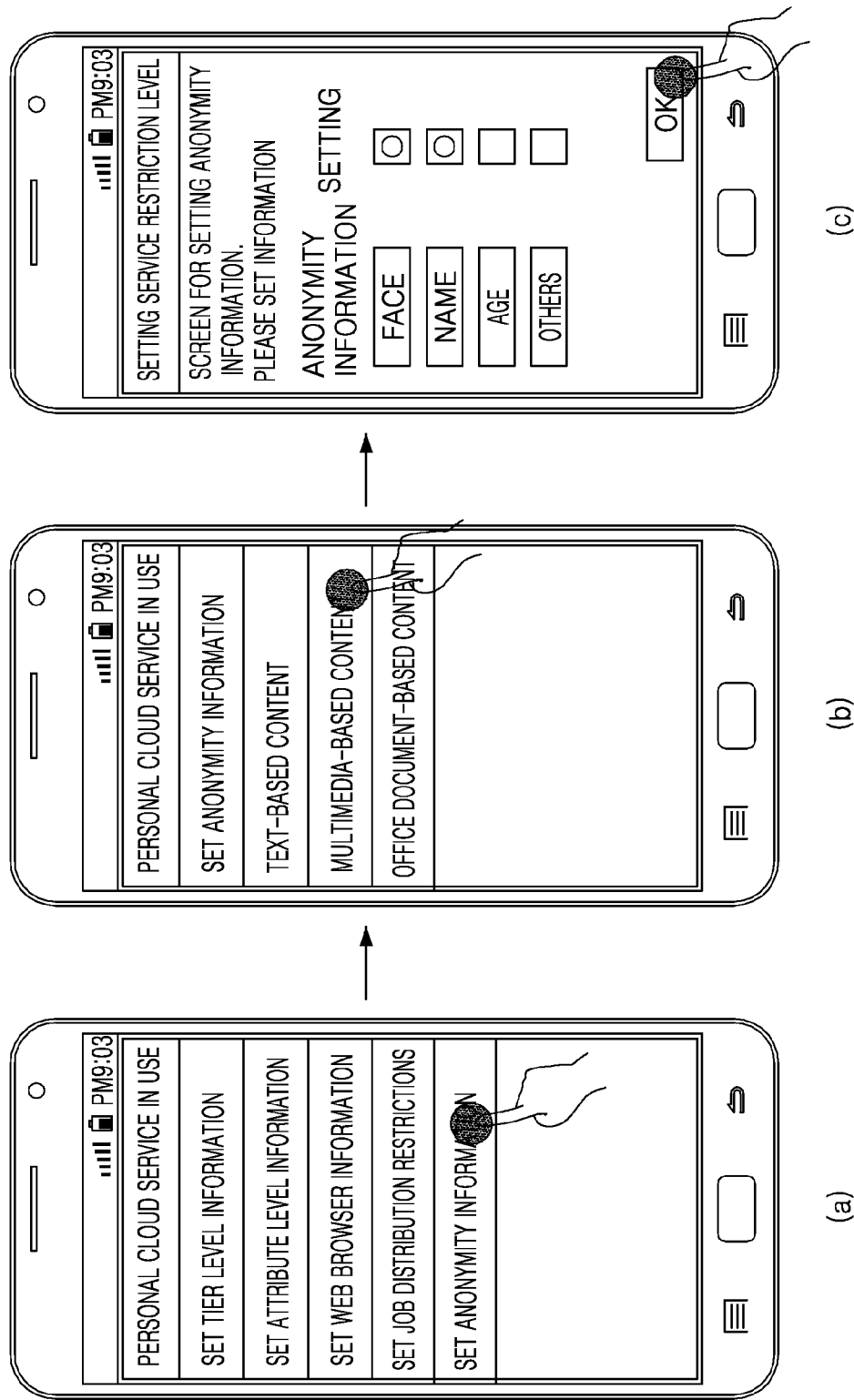
Figure 26C:
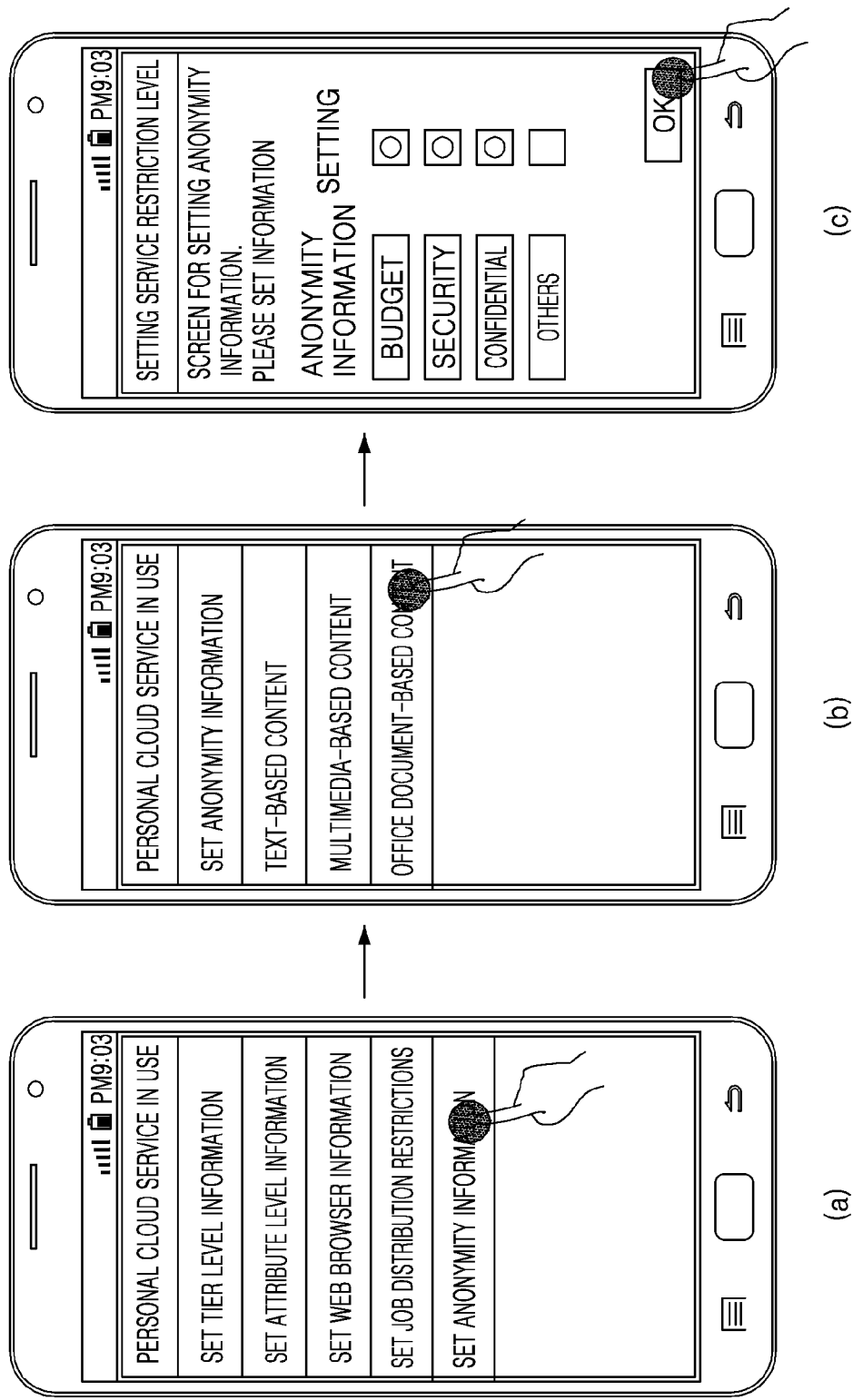

In detail, referring to FIGS. 26A through 26C, for example, the user may set a data type for anonymization and detailed anonymity information in screens (a) to (c) of FIG. 26A. In other words, an anonymity information setting item may be selected from information setting items as shown in screen (a) of FIG. 26A, then text-based content, such as an email, a message, and a chatting service, may be selected from a screen (b) of FIG. 26A, and then anonymization of a name, an age, and an affiliation may be set in detail as shown in a screen (c) of FIG. 26A.

When the setting is completed as such, the terminal 100 stores setting information related to the anonymization therein. Then, when the user performs a data distributing job, it is analyzed whether information related to the anonymization exists before transmitting corresponding data to, for example, the cloud apparatus 120. When it is determined that data related to anonymity information exists based on analysis results, the data may be changed to another data assigned by the user or may be changed, by the terminal 100, to a default, and then the changed data may be transmitted. Here, the default may mean that the terminal 100 automatically changes data according to an anonymity policy. Since details thereof have been sufficiently described above with reference to FIG. 25A, descriptions thereof are not provided again.

Also, as shown in screens (a) to (c) of FIG. 26B, the user may set anonymization of a face in case of, for example, an image, in multimedia content, such as a voice message, a video call, a video, and a photograph, and may set anonymization of a name in voice as well as a face in a video. At this time as well, when the terminal 100 distributes data after the user sets data job distribution, the terminal 100 changes related data to another data and then transmit the related data based on information set therein. Such a changing method may be performed by changing the related data to data assigned by the user, or by automatically changing, by the terminal 100, the related data.

In addition, as shown in screens (a) to (c) of FIG. 26C, the user may set anonymization of an office document, such as Word, PPT, or Excel. For example, when information such as security, a budget, confidential, etc. is checked in a document, various types of information in the document with the corresponding information may be anonymized according to security policies. Here, the security policies may include an affiliation, an age, and a name as described above, and a face if the document is a photograph. Since such security policies may vary, an exemplary embodiment is not specifically limited.

Figure 27:
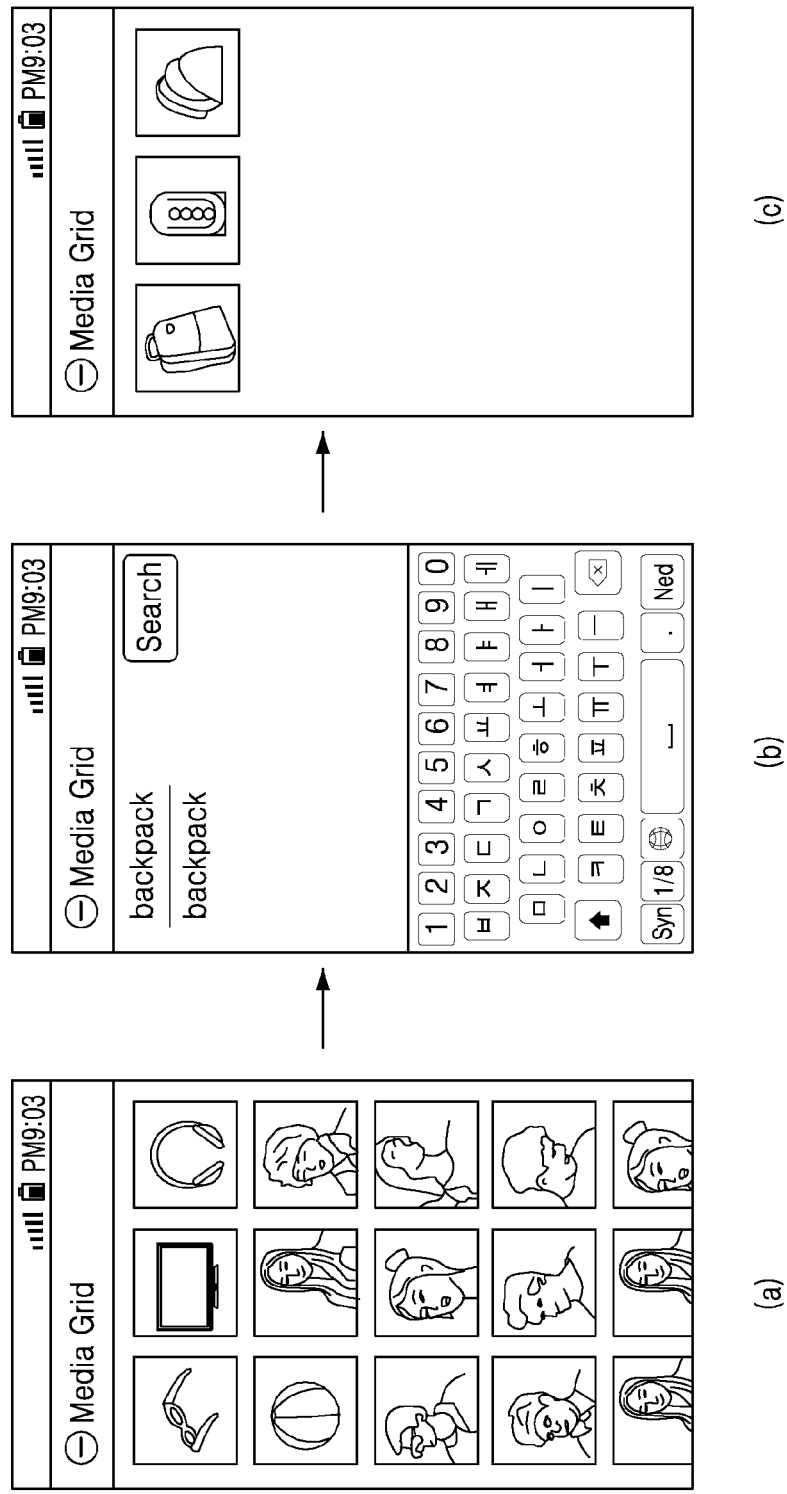
FIG. 27 is a diagram illustrating a related art method of classifying photographs based on text.

FIG. 27 is a diagram illustrating a related art method of classifying photographs based on text. However, FIG. 27 is also used to describe operations of automatically classifying photographs according to a service restriction level set during an image recognizing job according to an exemplary embodiment.

Referring to FIG. 27 together with FIG. 1A and screen (d) of FIG. 7B for convenience of description, the user of the terminal 100 according to an exemplary embodiment may set image recognizing results to be not shared with the cloud apparatus 120 as shown in the screen (d) of FIG. 7B. In detail, the terminal 100 may additionally set a personal photograph of the user to be not shared with the cloud apparatus 120, from among various photographs as shown in screen (a) of FIG. 27.

In this case, while storing photographs shot by the terminal 100 or photographs provided from an external device in an internal gallery folder, the terminal 100 may automatically distinguish personal photographs of the user by analyzing the photographs via an image recognizing engine. Accordingly, the personal photographs and other photographs may be classified and stored. For example, when face recognition is used, information about feature points of a face of the user may be stored, and when the stored information and information of a recognized photograph match each other upon comparing, the recognized photograph may be determined as a personal photograph of the user and automatically classified.

For example, as shown in screens (a) to (c) of FIG. 27, a related art image classifying method is very inconvenient. In other words, many photographs stored in a gallery folder as shown in screen (a) of FIG. 27 may be searched based on text as shown in screen (b) of FIG. 27, thereby classifying the photographed according to image categories as shown in screen (c) of FIG. 27.

However, in an exemplary embodiment, when hierarchical information related to image recognition is performed only in the terminal 100 and moreover, category information is additionally settable only in personal photographs and the terminal 100, classifying jobs of photographs together with privacy protection of an individual may be very easy.

If it is OK to provide remaining photographs other than personal photographs to the cloud apparatus 120, the terminal 100 may provide the corresponding photographs to the cloud apparatus 120.

FIG. 28 is a diagram for describing which recognition level a user is to perform by using a terminal for image recognition.

Referring to FIG. 28, in order to perform image recognition, in detail, an image scan operation, the terminal 100 of FIG. 1A may access the cloud apparatus 120 or the gateway 100-2''' of FIG. 1D to receive and use a related program (or an application).

Accordingly, as shown in screen (a) of FIG. 28, the terminal 100 may use a program desired by the user, for example, 'image-net.sqlite3', from among various image recognition-related programs. If the user selects a 'Select a Different Model' button from a screen (a) of FIG. 28 to view other models, the terminal 100 may display a list of downloadable programs as shown in screen (b) of FIG. 28.

Figure 29:
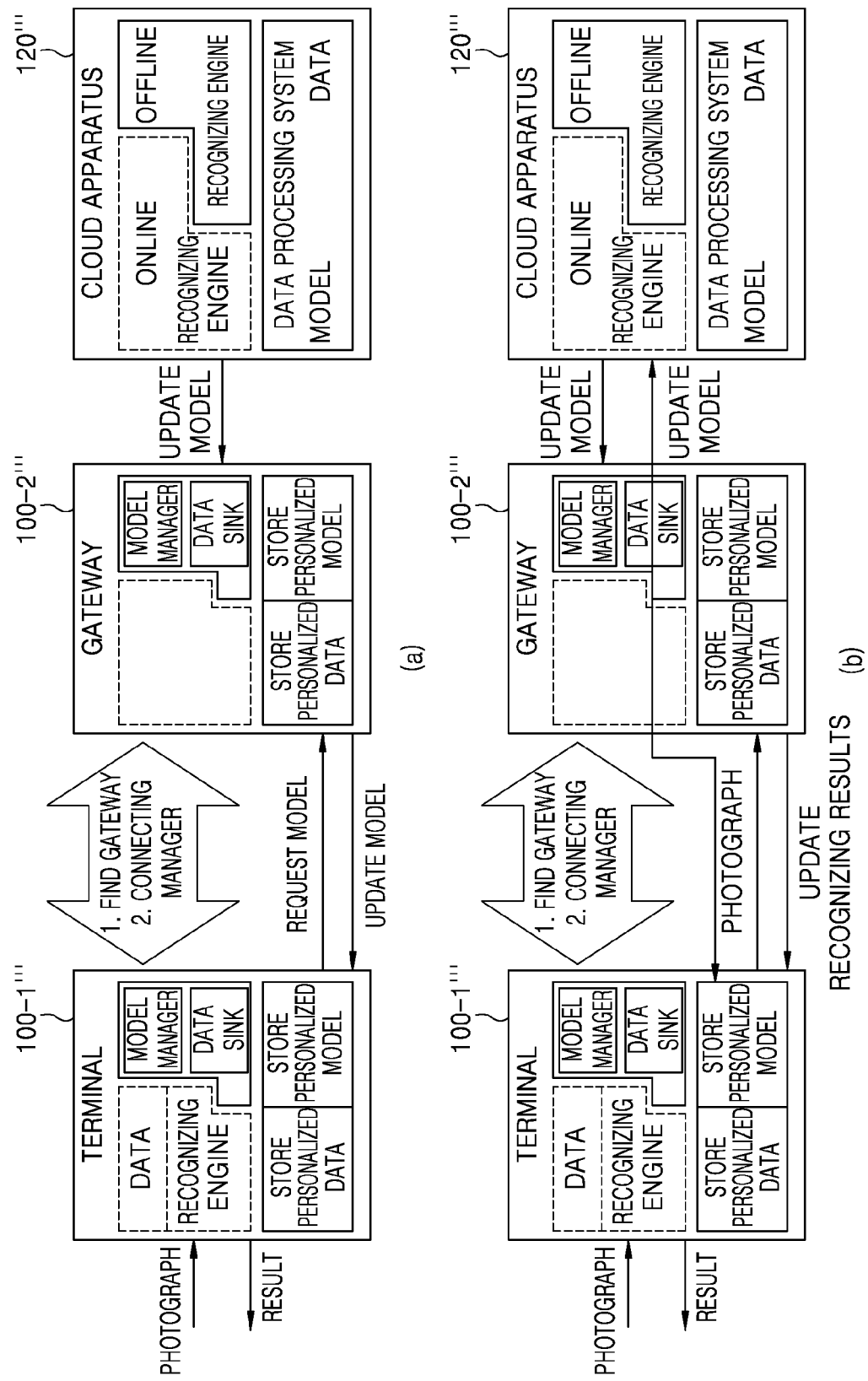
FIG. 29 is a diagram for describing image process operations using a recognizing engine and a personalized model.

FIG. 29 is a diagram for describing image process operations using a recognizing engine and a personalized model.

Referring to FIG. 29 together with FIG. 1D for convenience of description, when the terminal 100-1''' according to an exemplary embodiment is assigned only as a job subject for image analysis as shown in configuration (a) of FIG. 29, the terminal 100-1''' may download, from an external device, such as the cloud apparatus 120''' or the gateway 100-2''', and store an image recognizing model for determining context, i.e., a status, mostly viewed by the user in the terminal 100-1''' and analyzing the context, and then perform context analysis by using the image recognizing model. Here, the image recognizing model may mean a program, such as 'image-net.sqlite3' of screen (a) of FIG. 28.

For example, when the accessible gateway 100-2''' is found, the terminal 100-1''' accesses the gateway 100-2''' to request for a model, and then receives and stores the requested model therein. Then, the requested mode is used for image recognition.

Meanwhile, as shown in configuration (b) of FIG. 29, when the image recognizing job is performed in cooperation with the gateway 100-2''', the terminal 100-1''' transmits photographs to the gateway 100-2''', and receives, from the gateway 100-2''' and stores results on recognition.

A model manager shown in the configurations (a) and (b) of FIG. 29 performs a control function of trying to access the gateway 100-2''', and a data sink performs an operation for synchronization between two apparatuses, wherein the model manager and the data sink may both be configured as software modules. Also, personalized data and model may be stored in a memory.

FIG. 30 is a diagram illustrating an example of the terminal 100 according to an exemplary embodiment distributing and processing data for a health care service, with the cloud apparatus 120.

Referring to FIG. 30, the terminal 100 may obtain raw data for the health care service. The terminal 100 may receive sensing information sensed by a wearable device 100-3 from the wearable device 100-3 on the user. The wearable device 100-3 may generate sensing information about a location and movement of the wearable device 100-3, and sensing information about pulses and a temperature of the user, through sensors in the wearable device 100-3, according to pre-set periods or as a certain event is generated. Also, the wearable device 100-3 may transmit the sensing information to the terminal 100 according to a pre-set period or as a certain event is generated. Also, the terminal 100 may generate sensing information about a location and movement of the terminal 100, and sensing information about pulses and a temperature of the user, by using sensors in the terminal 100. Also, the terminal 100 may obtain time information about when the sensing information is generated.

Also, while transmitting some or all of raw data to a cloud apparatus 120-1, the terminal 100 may request the cloud apparatus 120-1 to analyze the transmitted raw data. The cloud apparatus 120-1 analyzes the raw data to generate activity data, and transmits the generated activity data to the terminal 100. The terminal 100 may transmit anonymized raw data to the cloud apparatus 120-1, and the cloud apparatus 120-1 may analyze the anonymized raw data to generate anonymized activity data. Also, the cloud apparatus 120-1 may provide the anonymized activity data to the terminal 100.

Also, while transmitting some or all of the activity data to a cloud apparatus 120-2, the terminal 100 may request the cloud apparatus 100-2 to analyze the transmitted activity data. The terminal 100 may anonymize some of the activity data to be transmitted to the cloud apparatus 120-2, and transmit the anonymized activity data to the cloud apparatus 120-2. For example, when activity data of the user includes "riverside of Hangang", "Sunday", "9:00 to 10:00", and "jogging", the activity data may be anonymized by replacing location-related activity data "riverside of Hangang" from among the activity data to a pre-set variable "x". Also, the cloud apparatus 120-2 may generate activity pattern data of the user based on the anonymized activity data. In this case, the cloud apparatus 120-2 may generate the activity pattern data of the user base don a plurality of pieces of the anonymized activity data. Also, the activity pattern data generated by the cloud apparatus 120-2 may include an anonymized value. For example, the cloud apparatus 120-2 may generate activity pattern data such as "jogging on Sunday from 9:00 to 10:00 at x". Also, the terminal 100 may receive the activity pattern data generated by the cloud apparatus 120-2 from the cloud apparatus 120-2, and interprets "x" included in the activity pattern data to "riverside of Hangang", thereby generating activity pattern data such as "the user jogs on Sunday from 9:00 to 10:00 at the riverside of Hangang".

Also, while transmitting some of all of the activity pattern data to a cloud apparatus 120-3, the terminal 100 may request the cloud apparatus 120-3 to generate activity prediction data. The terminal 100 may anonymize some of the activity pattern data to be transmitted to the cloud apparatus 120-3, and transmit the anonymized activity data to the cloud apparatus 120-3. For example, when the activity pattern data of the user includes information "jogs on Sunday from 9:00 to 10:00 at the riverside of Hangang", the terminal 100 may anonymize the activity pattern data to "jogs on Sunday from 9:00 to 10:00 at x". Also, the terminal 100 may provide the anonymized activity pattern data to the cloud apparatus 120-3.

In this case, the terminal 100 may obtain information related to activities of the user in real-time and provide the information to the cloud apparatus 120-3. In this case, the information related to the activities of the user may be raw data obtained in relation to the activities of the user or activity data analyzed from the raw data. The terminal 100 may anonymize some or all of the information related to the activities of the user obtained in real-time, and provide the anonymized information to the cloud apparatus 120-3.

Also, the cloud apparatus 120-3 may generate notification information about the activities of the user by comparing the information related to the activities of the user transmitted from the terminal 100 and the activity pattern data of the user. For example, the cloud apparatus 120-3 may determine that the user is standing at the riverside of Hangang at 9:30 am Sunday, and a temperature of the user is below a pre-set value, based on the information related to the activities of the user transmitted from the terminal 100. Also, the cloud apparatus 120-3 may compare such determination results and the activity pattern data to generate notification information notifying that there is something wrong with user's physical condition, and transmit the notification information to the terminal 100.

In this case, the terminal 100 may transmit the notification information to the pre-set neighboring terminal. The neighboring terminal that is to receive the notification information may be pre-set by the user. However, exemplary embodiments are not limited thereto, and in some exemplary embodiments, the cloud apparatus 120-3 may transmit the notification information to the pre-set neighboring terminal.

Meanwhile, descriptions that all components forming an exemplary embodiment are combined into one component or are combined to operate do not mean that the present disclosure is necessarily limited to such an exemplary embodiment. In other words, the components may be selectively provided in more than one component to operate, within the range of the present disclosure. Also, the components may each be realized as one piece of independent hardware, but some or all of the components may be selectively combined to be realized as a computer program having a program module performing some or all functions combined in one or more pieces of hardware. Codes and code segments of the computer program may be easily inferred by one of ordinary skill in the art. Such a computer program may be stored in non-transitory computer readable media, and may be read and executed by a computer, thereby realizing an exemplary embodiment of the present disclosure.

Here, a non-transitory readable recording medium is not a medium that stores data for a short period of time, such as a register, a cache, or a memory, but is a medium that stores data semi-permanently and is readable by a device. In detail, above-described programs may be stored in and provided by a non-transitory readable recording medium, such as a CD, a DVD, a hard disk, a Blue-ray disk, a USB, a memory card, or a ROM.

While one or more exemplary embodiments have been described with reference to the figures, it will be understood by those of ordinary skill in the art that various changes in form and details may be made therein without departing from the spirit and scope as defined by the following claims.

The invention claimed is:

1. A terminal providing a data cooperative process service with a plurality of external apparatuses, the terminal comprising:
   communication interface hardware, and/or code executed by a central processing unit (CPU), configured to communicate with the plurality of external apparatuses over a network;
   a display; and
   a controller configured to:
      obtain data used to predict activities of a user, the data being in a hierarchy having a plurality of tiers in which data of a higher tier is derived from data of a lower tier, each tier having a corresponding restriction level indicating whether the tier is sharable with the plurality of external apparatuses,
      control the display to display at least one user interface (UI) for setting the restriction level,
      for each tier that is sharable, set, based on input information received from the at least one UI, at least one subject apparatus from among the terminal and the plurality of external apparatuses for obtaining and analyzing the data of the tier, and a percentage level and attribute level information of the data of the tier to be analyzed by each of the set at least one subject apparatus for the tier, the attribute level information being hierarchized into an attribute level that is activities in the terminal and includes information on whether to share the attribute level with the plurality of external apparatuses,
      determine a portion of the data to be anonymized based on the restriction levels, the set subject apparatuses, and the set percentage levels, and the set attribute level information,
      distribute the portion of the data to the set subject apparatuses of the sharable tiers according to the percentage levels and the set attribute level information through the communication interface hardware and/or code,
      receive first activity prediction data from the subject apparatuses to which the portion of data was distributed, the first activity prediction data based on an analysis of the distributed portion of the data, and
      analyze a remaining portion of the data and the received first activity prediction data to generate second activity prediction data; and
   wherein the display displays notification information related to the activities of the user based on the second activity prediction data,
   wherein the data includes raw data of the user obtained from the terminal, activity data of the user indicating actions of the user recognized from the raw data, activity pattern data of the user indicating a pattern of the actions of the user derived from the activity data, and activity prediction data of the user derived from the activity pattern data, and
   wherein the raw data, the activity data, the activity pattern data and the activity prediction data respectively correspond to different tiers of the hierarchy.

2. The terminal of claim 1, wherein the controller determines whether a program for analyzing data is installed in the plurality of external apparatuses and, when it is determined that a program for analyzing the data is not installed in an external apparatus, the controller transmits the program for analyzing the data to the external apparatus.

3. The terminal of claim 1, wherein the display further displays a user interface (UI) screen for setting conditions with respect to an operation status of the terminal and a network status of the network, and
   the controller analyzes the remaining portion of the data and the received first activity prediction data based on the conditions set through the UI screen.

4. The terminal of claim 1, wherein the display displays a UI screen comprising at least one of a first region indicating a data analyzable subject for generating data belonging to the higher tier based on a share setting of data belonging to the lower tier, a second region indicating an analysis operable level of the data analyzable subject, and a third region indicating an exposure risk of data belonging to another tier, different from the higher tier and the lower tier, based on the share setting of the data belonging to the lower tier.

5. A cloud apparatus comprising:
   a communication interface hardware, and/or code executed by a central processing unit (CPU), configured to communicate with a terminal;
   a storage configured to receive and store data used to predict activities of a user using the terminal, the data being in a hierarchy having a plurality of tiers in which data of a higher tier is derived from data of a lower tier, each tier having a corresponding restriction level indicating whether the tier is sharable with a plurality of external apparatuses, wherein for each tier that is sharable, at least one subject apparatus among the terminal, the cloud apparatus, and the plurality of external apparatuses is set based on input information received from the terminal, the at least one subject apparatus being for obtaining and analyzing the data of the tier, and a percentage level and attribute level information of the data of the tier to be analyzed by each of the set at least one subject apparatus is set for the tier, the attribute level information being hierarchized into an attribute level that is activities in the terminal and includes information on whether to share the attribute level with the plurality of external apparatuses, and a portion of the data that is received based on the restriction levels, the set subject apparatuses and the set percentage levels and the set attribute level information, and is anonymized; and
   a controller configured to analyze the received portion of the data to generate activity prediction data that predicts the activities of the user, receive a request for an analysis result of the received portion of the data, and in response to the request, transmit the activity prediction data to the terminal through the communication interface hardware and/or code,
   wherein the data includes raw data of the user obtained from the terminal, activity data of the user indicating actions of the user recognized from the raw data, activity pattern data of the user indicating a pattern of the actions of the user derived from the activity data, and the activity prediction data of the user derived from the activity pattern data, and
   wherein the raw data, the activity data, the activity pattern data and the activity prediction data respectively correspond to different tiers of the hierarchy.

6. A method performed by a terminal of providing a data cooperative process service with a plurality of external apparatuses, the method comprising:
   obtaining data used to predict activities of a user, the data being in a hierarchy having a plurality of tiers in which data of a higher tier is derived from data of a lower tier, each tier having a corresponding restriction level indicating whether the tier is sharable with the plurality of external apparatuses;

control a display of the terminal to display at least one user interface (UI) for setting the restriction level;

for each tier that is sharable, setting, based on input information received from the at least one UI, at least one subject apparatus from among the terminal and the plurality of external apparatuses for obtaining and analyzing the data of the tier, and a percentage level and attribute level information of the data of the tier to be analyzed by each of the set at least one subject apparatus for the tier, the attribute level information being hierarchized into an attribute level that is activities in the terminal and includes information on whether to share the attribute level with the plurality of external apparatuses;

determining a portion of the data to be anonymized based on the restriction levels, the set subject apparatuses, and the percentage levels, and the set attribute level information;

distribute the portion of the data to the set subject apparatuses of the sharable tiers according to the percentage levels and the set attribute level information;

receiving first activity prediction data from the subject apparatuses to which the portion of the data was distributed, the first activity prediction data being based on an analysis of the distributed portion of the data;

analyzing a remaining portion of the data and the received first activity prediction data to generate second activity prediction data; and displaying, on the display, notification information related to the activities of the user based on the second activity prediction data, wherein the data includes raw data of the user obtained from the terminal, activity data of the user indicating actions of the user recognized from the raw data, activity pattern data of the user indicating a pattern of the actions of the user derived from the activity data, and activity prediction data of the user derived from the activity pattern data, and wherein the raw data, the activity data, the activity pattern data and the activity prediction data respectively correspond to different tiers of the hierarchy.

7. The method of claim 6, further comprising, when it is determined that a program for analyzing the data is not installed in an external apparatus, transmitting the program for analyzing the data to the external apparatus.

8. A method performed by an external apparatus of providing a data cooperative process service with a terminal, the method comprising:

receiving, from the terminal, a portion of data used to predict activities of a user, the data being in a hierarchy having a plurality of tiers in which data of a higher tier is derived from data of a lower tier, each tier having a corresponding restriction level indicating whether the tier is sharable with the external apparatus, wherein for each tier that is sharable, at least one subject apparatus among the terminal and the external apparatus is set based on input information received from the terminal, the at least one subject apparatus being for obtaining and analyzing the data of the tier, and a percentage level and attribute level information of the data of the tier to be analyzed by each of the set at least one subject apparatus of the tier is set based on the input information received from the terminal, the attribute level information being hierarchized into an attribute level that is activities in the terminal and includes information on whether to share the attribute level with the external apparatus, and the portion of the data that is received based on the restriction levels, the set subject apparatuses, the set percentage levels, and the set attribute level information, and is anonymized;

analyzing the received portion of the data to generate activity prediction data that predicts the activities of the user by using the received data;

receiving a request for an analysis result of the received portion of the data; and in response to the request, transmitting the generated activity prediction data to the terminal, wherein the data includes raw data of the user obtained from the terminal, activity data of the user indicating actions of the user recognized from the raw data, activity pattern data of the user indicating a pattern of the actions of the user derived from the activity data, and the activity prediction data of the user derived from the activity pattern data, and wherein the raw data, the activity data, the activity pattern data and the activity prediction data respectively correspond to different tiers of the hierarchy.

9. A system comprising:
a cloud apparatus; and
a terminal comprising:
  a communication interface hardware, and/or code executed by a central processing unit (CPU), configured to communicate with the cloud apparatus over a network;
  a display; and
  a controller configured to:
    obtain data used to predict activities of a user, the data being in a hierarchy having a plurality of tiers in which data of a higher tier is derived from data of a lower tier, each tier having a corresponding restriction level indicating whether the tier is sharable with a plurality of external apparatuses,
    control the display to display at least one user interface (UI) for setting the restriction level;
    for each tier that is sharable, set, based on input information received from the at least one UI, at least one subject apparatus among the terminal, the cloud apparatus and the plurality of external apparatuses for obtaining and analyzing the data of the tier and a percentage level and attribute level information of the data of the tier to be analyzed by each of the set at least one subject apparatus for the tier, the attribute level information being hierarchized into an attribute level that is activities in the terminal and includes information on whether to share the attribute level with the plurality of external apparatuses,
    determine a portion of the data to be anonymized based on the restriction levels, the set subject apparatuses, and the percentage levels and the set attribute level information, and
    distribute the portion of the data to the subject apparatuses of the sharable tiers according to the percentage levels and the set attribute level information,
    receive first activity prediction data from the set subject apparatuses to which the portion of the data was distributed, and
    analyze a remaining portion of the data and the received first activity prediction data to generate second activity prediction data; and wherein the display displays notification information related to activity prediction data of the activities of the user based on the second activity prediction data, wherein the cloud apparatus receives the portion of the data distributed from the terminal, analyzes the portion of the data to generate the first activity prediction data that predicts the activities of the user, and transmits the first activity prediction data to the terminal, wherein the data includes raw data of the user obtained from the terminal, activity data of the user indicating actions of the user recognized from the raw data, activity pattern data of the user indicating a pattern of the actions of the user derived from the activity data, and the activity prediction data of the user derived from the activity pattern data, and wherein the raw data, the activity data, the activity pattern data and the activity prediction data respectively correspond to different tiers of the hierarchy.

10. A terminal-cloud distribution system comprising:

a terminal comprising:
- a display; and
- a controller configured to obtain data used to predict activities of a user, classify the data into a hierarchy having a plurality of tiers in which data of a higher tier of the hierarchy is generated from data of a lower tier of the hierarchy, set a restriction level for each tier of the data that indicate whether the tier is sharable, control the display to display at least one user interface (UI) for setting the restriction level, and for each tier that is sharable, set, based on input information received from the at least one UI, at least one subject apparatus among the terminal and a cloud apparatus for obtaining the data of the tier and a percentage level and attribute level information of the data of the tier to be analyzed by the set at least one subject apparatus for the tier, the attribute level information being hierarchized into an attribute level that is activities in the terminal and includes information on whether to share the attribute level with the cloud apparatus, and determine a portion of the data to be anonymized based on the restriction levels, the set subject apparatuses, the percentage levels, and the set attribute level information; and
- a communication interface hardware, and/or code executed by the controller; and
- a first cooperative manager hardware and/or code executed by the controller, configured to, in cooperation with a second cooperative manager hardware and/or code of the cloud apparatus, distribute the portion of the data to the subject apparatuses of the sharable tiers according to the percentage levels and the attribute level information; and the cloud apparatus comprising:
- a controller configured to process data according to the plurality of tiers of the hierarchy; and
- a communication interface hardware, and/or code executed by the controller, configured to communicate with the communication interface hardware and/or code of the terminal over a network; and
- the second cooperative manager hardware and/or code executed by the controller, configured to, in cooperation with the first cooperative manager hardware and/or code of the terminal, distribute the portion of the data to the subject apparatuses of the sharable tiers wherein the controller of the cloud apparatus analyzes the portion of the data distributed from the terminal to the cloud apparatus to generate first activity prediction data that predicts the activities of the user, and the second cooperative manager hardware transmits the first activity prediction data to the terminal, the controller of the terminal receives the first activity prediction data and analyzes the distributed data from the cloud apparatus and the first activity prediction data to generate second activity prediction data, and the display of the terminal displays the second activity prediction data, wherein the data includes raw data of the user obtained from the terminal, activity data of the user indicating actions of the user recognized from the raw data, activity pattern data of the user indicating a pattern of the actions of the user derived from the activity data, and activity prediction data of the user derived from the activity pattern data, and wherein the raw data, the activity data, the activity pattern data and the activity prediction data respectively correspond to different tiers of the hierarchy.

11. The terminal of claim 1, wherein the restriction level for each tier is set by the user of the terminal.

12. The system of claim 9, wherein the restriction levels are set for each tier by the user of the terminal.

13. The terminal of claim 1,
wherein the activity data indicates whether the user is eating, sleeping, walking, or exercising,
wherein the activity pattern data indicates an order of eating, sleeping, walking or exercising, and
wherein the activity prediction data is generated by analyzing the activity data or the activity pattern data of the user for a time period.

* * * * *